(12) United States Patent
Jiang

(10) Patent No.: US 8,478,277 B2
(45) Date of Patent: *Jul. 2, 2013

(54) NETWORK-BASED SYSTEM FOR REROUTING PHONE CALLS FROM PHONE NETWORKS TO VOIP CLIENTS FOR ROAMERS AND SUBSCRIBERS WHO DO NOT ANSWER

(75) Inventor: John Yue Jun Jiang, Danville, CA (US)

(73) Assignee: Roamware Inc., San Jose, CA (US)

( * ) Notice: Subject to any disclaimer, the term of this patent is extended or adjusted under 35 U.S.C. 154(b) by 1698 days.

This patent is subject to a terminal disclaimer.

(21) Appl. No.: 11/592,333

(22) Filed: Nov. 3, 2006

(65) Prior Publication Data

US 2007/0167167 A1 Jul. 19, 2007

Related U.S. Application Data

(63) Continuation-in-part of application No. 11/064,200, filed on Feb. 23, 2005, now Pat. No. 7,379,436, and application No. 11/592,333, and a continuation-in-part of application No. 10/778,970, filed on Feb. 13, 2004, and application No. 11/592,333, and a continuation-in-part of application No. 11/503,301, filed on Aug. 14, 2006, now Pat. No. 7,512,098.

(60) Provisional application No. 60/733,439, filed on Nov. 3, 2005, provisional application No. 60/547,389, filed on Feb. 23, 2004, provisional application No. 60/448,000, filed on Feb. 18, 2003.

(51) Int. Cl.
*H04W 40/00* (2009.01)

(52) U.S. Cl.
USPC ...... 455/445; 455/435.1; 455/453; 455/432.1; 455/433; 455/428; 455/435.2

(58) Field of Classification Search
USPC .................. 455/435.1, 445, 453, 432.1, 433, 455/435.2, 428
See application file for complete search history.

(56) References Cited

U.S. PATENT DOCUMENTS 5,353,328 A 10/1994 Jokimies
5,586,166 A 12/1996 Turban
(Continued)

FOREIGN PATENT DOCUMENTS

CA 2281041 A1 2/2001
EP 0899 974 A2 3/1999
(Continued)

OTHER PUBLICATIONS

Salman A. Baset, et al., "An Analysis of the Skype Peer-to-Peer Internet Telephony Protocol", Department of Computer Science, Sep. 15, 2004, 12 pages.

(Continued)

*Primary Examiner* — Kamran Afshar
*Assistant Examiner* — Khalid Shaheed
(74) *Attorney, Agent, or Firm* — Arent Fox LLP

(57) ABSTRACT

A system, method, computer product and service are provided which, when a subscriber's VoIP client is online and the subscriber's non-VoIP wireless or fixed line number is called, will automatically route the call over IP to the subscriber's VoIP client. This routing may be performed by the subscriber's wireless or fixed line home operator and can be conditioned to depend on whether the non-VoIP number is roaming or not answering.

58 Claims, 34 Drawing Sheets

U.S. PATENT DOCUMENTS

| | | | |
|---|---|---|---|
| 5,742,910 A | 4/1998 | Gallant et al. | |
| 5,764,730 A | 6/1998 | Rabe et al. | |
| 5,818,824 A | 10/1998 | Lu et al. | |
| 5,854,982 A | 12/1998 | Chambers et al. | |
| 5,901,359 A | 5/1999 | Malmstrom | |
| 5,903,832 A | 5/1999 | Seppanen et al. | |
| 5,930,701 A | 7/1999 | Skog | |
| 5,940,490 A | 8/1999 | Foster et al. | |
| 5,943,620 A | 8/1999 | Boltz et al. | |
| 5,953,653 A | 9/1999 | Josenhans et al. | |
| 5,987,318 A | 11/1999 | Alperovich et al. | |
| 5,987,323 A | 11/1999 | Huotori | |
| 5,987,325 A | 11/1999 | Tayloe | |
| 6,014,561 A | 1/2000 | Mölne | |
| 6,052,604 A | 4/2000 | Bishop et al. | |
| 6,058,309 A | 5/2000 | Huang et al. | |
| 6,075,855 A | 6/2000 | Christiansen et al. | |
| 6,085,084 A | 7/2000 | Christmas | |
| 6,138,005 A | 10/2000 | Park | |
| 6,138,009 A | 10/2000 | Birgerson | |
| 6,148,197 A | 11/2000 | Bridges et al. | |
| 6,163,701 A | 12/2000 | Saleh et al. | |
| 6,185,295 B1 | 2/2001 | Frederiksen et al. | |
| 6,185,436 B1 | 2/2001 | Vu | |
| 6,192,255 B1 | 2/2001 | Lewis et al. | |
| 6,195,532 B1 | 2/2001 | Bamburak et al. | |
| 6,208,864 B1 | 3/2001 | Agrawal et al. | |
| 6,212,372 B1 | 4/2001 | Julin | |
| 6,356,755 B1 | 3/2002 | Valentine et al. | |
| 6,356,756 B1 | 3/2002 | Koster | |
| 6,456,845 B1 | 9/2002 | Drum et al. | |
| 6,456,859 B1 | 9/2002 | Desblancs et al. | |
| 6,463,298 B1 | 10/2002 | Sorenson et al. | |
| 6,466,786 B1 | 10/2002 | Wallenius | |
| 6,505,050 B1 | 1/2003 | Brudos et al. | |
| 6,515,974 B1 | 2/2003 | Inoue et al. | |
| 6,574,481 B1 | 6/2003 | Rathnasapathy et al. | |
| 6,603,761 B1 | 8/2003 | Wang et al. | |
| 6,603,968 B2 | 8/2003 | Anvekar et al. | |
| 6,611,516 B1 | 8/2003 | Pirkola et al. | |
| 6,628,934 B2 | 9/2003 | Rosenberg et al. | |
| 6,636,502 B1 | 10/2003 | Lager et al. | |
| 6,671,523 B1 | 12/2003 | Niepel et al. | |
| 6,684,073 B1 | 1/2004 | Joss et al. | |
| 6,693,586 B1 | 2/2004 | Walters et al. | |
| 6,738,622 B1 | 5/2004 | Stadelmann et al. | |
| 6,738,636 B2 | 5/2004 | Lielbridis | |
| 6,764,003 B1 | 7/2004 | Martshitsch et al. | |
| 6,782,264 B2 | 8/2004 | Anderson | |
| 6,795,444 B1 * | 9/2004 | Vo et al. | 370/401 |
| 6,856,818 B1 | 2/2005 | Ford | |
| 6,876,860 B1 | 4/2005 | Berg et al. | |
| 6,920,487 B2 | 7/2005 | Sofer et al. | |
| 6,925,299 B1 | 8/2005 | Sofer et al. | |
| 6,961,559 B1 | 11/2005 | Chow et al. | |
| 6,963,543 B2 | 11/2005 | Diep et al. | |
| 6,968,383 B1 | 11/2005 | Heutschi et al. | |
| 6,975,852 B1 | 12/2005 | Sofer et al. | |
| 6,978,156 B1 | 12/2005 | Papadopoulos et al. | |
| 6,982,985 B1 * | 1/2006 | Bohacek et al. | 370/410 |
| 7,020,479 B2 | 3/2006 | Martschitsch | |
| 7,136,651 B2 * | 11/2006 | Kalavade | 455/445 |
| 7,139,570 B2 | 11/2006 | Elkarat et al. | |
| 7,184,764 B2 | 2/2007 | Raviv et al. | |
| 7,231,431 B2 | 6/2007 | Sofer et al. | |
| 2002/0009199 A1 | 1/2002 | Ala-Laurila et al. | |
| 2002/0012351 A1 | 1/2002 | Sofer et al. | |
| 2002/0037708 A1 | 3/2002 | McCann et al. | |
| 2002/0087631 A1 | 7/2002 | Sharma | |
| 2002/0101858 A1 | 8/2002 | Stuart et al. | |
| 2002/0101859 A1 | 8/2002 | Maclean | |
| 2002/0160763 A1 | 10/2002 | Mittal et al. | |
| 2002/0187780 A1 | 12/2002 | Souissi | |
| 2002/0191575 A1 | 12/2002 | Kalavade et al. | |
| 2002/0196775 A1 | 12/2002 | Huotori | |
| 2003/0017843 A1 | 1/2003 | Noblins | |
| 2003/0050047 A1 | 3/2003 | Ala-Luukko | |
| 2003/0051041 A1 | 3/2003 | Kalavade et al. | |
| 2003/0064723 A1 | 4/2003 | Thakker | |
| 2003/0069922 A1 | 4/2003 | Arunachalam | |
| 2003/0129991 A1 | 7/2003 | Allison et al. | |
| 2003/0133421 A1 | 7/2003 | Sundar et al. | |
| 2003/0139180 A1 | 7/2003 | McIntosh et al. | |
| 2003/0208560 A1 | 11/2003 | Inoue | |
| 2003/0224795 A1 | 12/2003 | Wilhoite et al. | |
| 2003/0229791 A1 | 12/2003 | De Jong | |
| 2004/0019539 A1 | 1/2004 | Raman et al. | |
| 2004/0030750 A1 * | 2/2004 | Moore et al. | 709/204 |
| 2004/0053610 A1 | 3/2004 | Kim | |
| 2004/0081086 A1 * | 4/2004 | Hippelainen et al. | 370/227 |
| 2004/0082346 A1 | 4/2004 | Skytt et al. | |
| 2004/0087305 A1 | 5/2004 | Jiang | |
| 2004/0120552 A1 | 6/2004 | Borngraber et al. | |
| 2004/0131023 A1 | 7/2004 | Auterinen | |
| 2004/0132449 A1 | 7/2004 | Kowarch | |
| 2004/0148400 A1 | 7/2004 | Mostafa | |
| 2004/0196858 A1 | 10/2004 | Tsai et al. | |
| 2004/0224680 A1 | 11/2004 | Jiang | |
| 2004/0229601 A1 | 11/2004 | Zabawskyj et al. | |
| 2004/0236836 A1 | 11/2004 | Appleman | |
| 2004/0266426 A1 | 12/2004 | Marsh et al. | |
| 2005/0002834 A1 | 1/2005 | Coulombe | |
| 2005/0047378 A1 | 3/2005 | Wuschke et al. | |
| 2005/0064883 A1 | 3/2005 | Heck et al. | |
| 2005/0070278 A1 | 3/2005 | Jiang | |
| 2005/0186939 A1 | 8/2005 | Barnea et al. | |
| 2005/0186960 A1 * | 8/2005 | Jiang | 455/435.1 |
| 2005/0186979 A1 | 8/2005 | McCann et al. | |
| 2005/0192007 A1 | 9/2005 | Kumar et al. | |
| 2005/0192036 A1 | 9/2005 | Jiang | |
| 2005/0215250 A1 | 9/2005 | Chava et al. | |
| 2005/0232282 A1 | 10/2005 | Silver et al. | |
| 2005/0250493 A1 | 11/2005 | Elkarat et al. | |
| 2006/0003775 A1 | 1/2006 | Bull et al. | |
| 2006/0009204 A1 | 1/2006 | Ophir | |
| 2006/0025129 A1 | 2/2006 | Wolfman et al. | |
| 2006/0052113 A1 | 3/2006 | Ophir et al. | |
| 2006/0068778 A1 | 3/2006 | Della-Torre | |
| 2006/0068786 A1 | 3/2006 | Florence | |
| 2006/0079225 A1 | 4/2006 | Wolfman et al. | |
| 2006/0079236 A1 | 4/2006 | Del Pino et al. | |
| 2006/0148459 A1 | 7/2006 | Wolfman et al. | |
| 2006/0205404 A1 | 9/2006 | Gonen et al. | |
| 2006/0211420 A1 | 9/2006 | Ophir et al. | |
| 2007/0021118 A1 | 1/2007 | Ophir et al. | |
| 2007/0049269 A1 | 3/2007 | Ophir et al. | |
| 2007/0054665 A1 | 3/2007 | Elkarat et al. | |
| 2007/0072587 A1 | 3/2007 | Della-Torre et al. | |
| 2007/0178885 A1 | 8/2007 | Lev et al. | |
| 2007/0232300 A1 | 10/2007 | Wolfman | |
| 2007/0259663 A1 | 11/2007 | Weintraub et al. | |
| 2008/0020760 A1 | 1/2008 | Elkarat et al. | |

FOREIGN PATENT DOCUMENTS

| | | |
|---|---|---|
| GB | 2322998 | 9/1998 |
| WO | WO 98/26621 A2 | 6/1998 |
| WO | WO 98/26626 A2 | 6/1998 |
| WO | WO 00/18156 A1 | 3/2000 |
| WO | WO 00/51375 A | 8/2000 |
| WO | WO 00/79761 A | 12/2000 |
| WO | WO 00/79825 A | 12/2000 |
| WO | WO 01/22750 | 3/2001 |
| WO | WO 01/65884 | 9/2001 |
| WO | WO 02/41641 A2 | 5/2002 |
| WO | WO 02/019667 | 7/2002 |
| WO | WO 03/019960 A1 | 3/2003 |
| WO | WO 03/043367 A | 5/2003 |
| WO | WO 03/065660 A | 8/2003 |
| WO | WO 2004/081802 | 9/2004 |
| WO | WO 2004/075598 | 9/2005 |
| WO | WO 2005/079393 A2 | 9/2005 |
| WO | WO 2005/101857 | 10/2005 |
| WO | WO 2008/012815 | 1/2008 |

OTHER PUBLICATIONS

Digital cellular telecommunications system (Phase 2+); Specification of the SIM Application Toolkit for the Subscriber Identity Module-Mobile Equipment (SIM-ME) Interface (GSM 11,14 version 8.3.0 Release 1999) STSI TS 101 267 V8.3.0, XX, XX, Aug. 2000, pp. 1-69 and pp. 114-115 (XP-002222021).
"Digital Cellular Telecommunications system (Phase 2+); Universal Mobile Telecommunications system (UMTS); General Packet Radio Service (GPRS) Service description; Stage 2 (3GPP TS 23.060 Version 5.4.0 Release 5)" ETSI TS 123 060 V5.4.0, Dec. 2002, pp. 1-207 (XP-014007573).
Ala-Laurila, et al., "Wireless LAN Access Network Architecture for Mobile Operators," IEEE Communications Magazine, Nov. 2001, pp. 82-89 (XP-001107810).
Brunen, M. Roaming im Zugangsnetz Mit OWLAN uberall zu Hause sein, Net-Zeitschrift Fuer Kommunikationsmangement, Huthig Verlag, Heilderberg, 2002, pp. 39-42 (XP-001122438).
GSM Association Permanent Reference Document: IR.33, PRD IR.33 "GPRS Roaming Guidelines," version 3.2.0, Apr. 3, 2003, pp. 1-20 (XP-002298278).
Ostrowski, F., "Roaming und Handover zwischen UMTS und Funk-LA," NTZ (Nachrichtentechnische zeitschrift), 2002, pp. 24-26 (XP-001132263).
Telenor (origin GSMA), "Inter-PLMN Backbone Guidelines," S3z000005 3GPP TSG SA WG3 Security—S3#15bis, Ad-Hoc Meeting Nov. 8, 2000, pp. 1-30 (XP-002298276).
"Universal Mobile Telecommunications system (UMTS) NAS Functions Related to Mobile Station MS in Idle Mode" ETSI TS 123 122 V3.1.0, Jan. 2000, pp. 1-33.
"Digital Cellular Telecommunications System (Phase 2+) GSM; Univeral Mobile Telecommunications System (UMTS); Mobile Radio Interface Layer 3 Specification; Core Network Protocols, Stage 3" ETSI TS 124 008 V3.2.1, Jan. 2000, pp. 62-69 and 376.
Salman A. Baset et al., "An analysis of the Skype Peer-to-Peer Internet Telephony Protocol", Department of Computer Science, Sep. 15, 2004, 12 pages.
Salkintzis, et al., "WLAN-GPRS Integration for Next-Generation Mobile Data Networks," IEEE Wireless Communications, Oct. 2002, pp. 112-123 (XP-001132263).
Michael Mouly, "The GSM System for Mobile Communications", pp. 103-104. Cell and Sys, 1992.
GSM 378 on CAMEL Digital Cellular telecommunications system (Phase 2+);Customized Applications for Mobile network Enhanced Logic (CAMEL) Phase 2; Stage 2 (GSM 03.78 version 6.7.0 Release 1997).
GSM978 on CAMEL Application protocol Digital cellular telecommunications system (Phase 2+); Customized Applications for Mobile network Enhanced Logic (CAMEL); CAMEL Application Part (CAP) specification (GSM 09.78 version 7.1.0 Release 1998).
GSM 902 on MAP Specification Digital Cellular Telecommunications (Phase 2+); Mobile Application Part (MAP) Specification (3GPP TS 09.02 version 7.9.0 Release 1998).
Q760-Q769 on ISUP Signaling, Function and Procedure.
Q.761 (Functional description of the ISDN User Part of CCITT Signaling System No. 7).
Q762 (General Functions of CCITT Signaling System No. 7 ISDN User Part Messages and parameters).
Q 763 (Formats and codes of CCITT Signaling System No. 7 ISDN User Part Message and parameters).
Q 764 (1999), Signaling System No. 7—ISDN User Part signaling procedures.
Q 730 (1999), ISDN User Part supplementary services.
Q 711 (1996), Functional description of signaling connection control part.
Q 712 (1996), Definition and function of signaling connection control part messages.
Q713 (1996), Signaling connection control part formats and codes.
Q 714 (1996), Signal connection control part procedures.
Q 716 (1993), Signaling Connection Control Part (SCCP) performance.
GSM 340 on SMS Digital cellular telecommunications system (Phase 2+); Technical realization of the Short Message Service (SMS); (GSM 03.40 version 7.4.0 Release 1998).
SMPP Forum: SMPP Protocol Document Version:—Oct. 12, 1999 Issue 1.2.
Universal Mobile Telecommunications System (UMTS); Multimedia Messaging Service (MMS), Functional description; Stage 2 (3GPP TS 23.140 version 4.2.0 Release 4).
GSM 379 on CAMEL Digital cellular telecommunications system (Phase 2+); Customized Applications for Mobile network Enhanced Logic (CAMEL); CAMEL Application Part (CAP) specification (GSM 09.78 version 7.1.0 Release 1998).
Technical Specification3$^{rd}$ Generation Partnership Project; Technical Specification Group Services and System Aspects; Service accessibility (Release 1999).
Signaling procedure and the Mobile Application Part (MAP) (Release 1999).
Q1214-Q1218 on Intelligent Networks IMS architectures, 3GPP, and 3GPP2.
GMS 408 on radio interface layer 3; Digital cellular telecommunications system (Phase 2+); Mobile radio interface layer 3 specification (GSM 04.08 version 7.4.2 Release 1998).
GSM 322 network selection Digital cellular telecommunications system (Phase 2+); functions related to Mobile Station (MS) in idle mode and group receive mode (GSM 03.22 version 8.3.0 Release 1999).
GSM 23122 network selection 3GPP TS 23.122 V3.9.0 (Dec. 2002) Technical Specification; 3$^{rd}$ Generation Partnership Project; Technical Specification Group Core Network; NAS Functions related to Mobile Station (MS) in idle mode (release 1999).
GSM 22011 service accessibility; 3 GPP TS 22.011 V3.8.0 (Sep. 2002) Technical Specification; 3$^{rd}$ Generation Partnership Project; Technical Specification Group Services and System Aspects; Service accessibility (Release 1999).
3 GPP 29010; 3 GPP TS 29.010 V3.10.0 (Dec. 2002); Technical Specification; 3$^{rd}$ Generation Partnership Project; Technical Specification Group Core Network; Information element mapping between Mobile Station—Base Station System (MS-BSS) and Base Station System—Mobile-services Switching Centre (BSS—MSC).
GSM 318 on CAMEL Basic Call Handling; Digital cellular telecommunications system (Phase 2+) Basic call handling; Technical realization (GSM 03.18 version 6.6.0 Release 1997).
ITU-T Recommendation Q. 766 (1993), Performance objectives in the integrated services digital network application.
ITU-T Recommendation Q. 765 (1998), Signaling system No. 7—Application transport mechanism.
ITU-T Recommendation Q. 769.1 (1999), Signaling system No. 7—ISDN user part enhancements for the support of Number Portability.
Q771-775X TCAP.
GSM 1111 SIM and Mobile Interface.
GSM 1114 SIM Toolkit.
IR 7320 Steering of Roaming.
GSM 348 Security and OTA.
GSM 31048 Security and OTA.
GSM 23119 Gateway Location Register.
GSM 408 Mobile Radio Interface Network Layer.
GSM 23122 Mobile Station Procedure.
GSM 24008 Mobile Radio Interface Network Layer.
GSM 25304 Idle Mode Selection.
GSM 29010 Error Network Mapping.
GSM 29002 MAP Protocol.
3G TS 22.078 version 3.2.0 Release 1999 UMTS CAMEL.
3G TS 23.278 version 6.0.0. Release 6 UMTS CAMEL-IMS interworking.
GSM 360 GPRS.
GSM 960 GPRS Tunneling Protocol.
GSM 23060 GPRS.

GSM 29060 GPRS Tunneling Protocol.
GSM 23012 Location Update.
Q701-705 on SS7 MTP.
$3^{RD}$ Generation Partnership Project; Technical Specification Group Services and Systems Aspects; Voice Call Continuity between CS and IMS Study (Release 7) (3GPP TR 23.806 V1.60 (Oct. 2005)).

Universal Mobile Telecommunications System (UMTS); 3GPP system to Wireless Local Area Network (WLAN) interworking System description (3GPP TS 23.234 version 6.6.0 Release 6) (ETSI TS 123 234 V6.6.0 (Sep. 2005)).

* cited by examiner

NETWORK-BASED SYSTEM FOR REROUTING PHONE CALLS FROM PHONE NETWORKS TO VOIP CLIENTS FOR ROAMERS AND SUBSCRIBERS WHO DO NOT ANSWER

RELATED APPLICATIONS

This application claims priority to U.S. Provisional Patent Application No. 60/733,439, filed Nov. 3, 2005, entitled "Integrating Cellular VoIP Client with Cellular or Fixed Line Phone Services for Automatic Call Rerouting to Roamers or Subscribers Away From Phones;" and also is a continuation-in-part of U.S. patent application Ser. No. 11/064,200, filed on Feb. 23, 2005 now U.S. Pat. No. 7,379,436 entitled, "Integrated Cellular VoIP for Call Rerouting" (hereinafter "VoIP Call Rerouting Patent Application"), which claims priority from U.S. Provisional Patent Application No. 60/547,389 filed Feb. 23, 2004; and is also a continuation-in-part of U.S. patent application Ser. No. 10/778,970 filed Feb. 13, 2004 entitled, "Integrating GSM and WiFi Services in Mobile Communications Devices," which claims priority from U.S. Provisional Patent Application No. 60/448,000 filed Feb. 18, 2003; and also is a continuation-in-part of U.S. patent application Ser. No. 11/503,301, filed Aug. 14, 2006 now U.S. Pat. No. 7,512,098, entitled, "Method and System for Wireless Voice Channel/Data Channel Integration," which claims priority from U.S. patent application Ser. No. 09/932,439 filed Aug. 15, 2001, now U.S. Pat. No. 7,092,370 ("the '370 patent"), bearing the same title, issued Aug. 15, 2006, the '370 patent also claiming priority to U.S. Provisional Patent Application No. 60/226,255 filed Aug. 17, 2000. The entirety of each of the foregoing is incorporated by reference herein.

BACKGROUND OF THE INVENTION

Field of the Invention

The present invention generally relates to roaming users in mobile networks. More specifically, the invention relates to steering the traffic of the roaming users in VoIP clients.

VoIP (Voice Over Internet Protocol) services use Internet Protocol to carry voice and related content, and, beside other advantages, offer better rates than traditional switched-circuit voice services (so-called "Plain Old Telephone Service" or POTS), and can also provide better and more efficient integration of other data services as well, such as multimedia, context and video.

The advent and widespread use of the VoIP client Skype on personal computers has increased the popularity of VoIP services. In addition to built-in presence management and instant messaging, Skype also provides "Skype-out" for calling out to, and "Skype-in" for receiving calls from, fixed or mobile phone lines. Other providers, such as MSN®, Yahoo®, and Google®, have also added VoIP service to their instant messaging clients.

Cellular IP phones, such as a window-enabled mobile GSM WiFi phone, configured with a Skype client, allow the IP phone user to enjoy the same free VoIP service as a personal computer Skype user. This, however, requires a special WiFi phone, or a dual-system phone with a Skype client installed.

Skype has also enhanced its VoIP client and service, to enable a user to receive calls to his Skype ID or Skype-IN number on an ordinary mobile, or on a fixed line phone via call forwarding. Additionally, ISkoot™—a Skype add-on service, allows a user to make outbound Skype calls to either a phone number or another Skype ID with ordinary mobile phones, by using SMS to send call out information to the ISkoot™ service. Thus, a two-way call out bridge, connecting the caller's mobile phone and his called party, is established. The bridge may use Skype Out to call both the called party and the caller's mobile number. Skype also provides a plug-in API, (Applications Programming Interface), used to develop presence information applications at network servers in a scalable manner, as well as server side APIs to support simultaneous VoIP calls.

However, whether a GSM/WiFi (or WiMax or VoIP) mobile phone is used or an ordinary phone is used, these services fail to address the case in which a mobile user is roaming when called on his ordinary mobile phone number. For example, in the case of GSM WiFi phone, even though the phone can make an inexpensive outbound Skype call when it is on a WiFi connection, it cannot seamlessly receive a call over VoIP when called on the WiFi phone's mobile number. Another unaddressed case is when an ordinary cell phone is called on its mobile number while roaming—the call cannot be received via Skype on the user's laptop, even if the user is connected online to an IP connection and the mobile is out of its coverage area. Normally, a mobile subscriber roaming internationally might prefer to receive calls over Skype or his VoIP account either to save money on roaming charges, for improved quality, or in order to benefit from the additional presence or other services associated with their chosen VoIP method.

Yet another missing case is an enhanced Skype call-in service to forward a call to an SMS alert, or for a mobile phone to use SMS to set up a bridged VoIP call via a VoIP-to-POTS service such as Skype Out. That type of call setup would assist an international roamer to carry on the desired phone call without needing to pay his home mobile carrier lofty international roaming charges.

The co-pending VoIP Call Rerouting Patent Application describes a service that allows automatic rerouting of a call to a mobile or fixed line subscriber over an IP network to the subscriber's phone. That VoIP Call Rerouting Patent Application teaches a way for a special cellular VoIP integrated handset to detect a broadband IP connection, enabling the client to automatically set call forwarding to the VoIP number that corresponds to the current IP address. A similar concept also applies to any ordinary mobile phone, so that as soon as a mobile goes on roaming, a user may receive calls on a VoIP phone number corresponding to the user's location via IP.

That co-pending VoIP Call Rerouting Patent Application also describes a service that allows a mobile or fixed line subscriber to receive a call automatically rerouted over an IP network at the subscriber mobile. This application also teaches how an ordinary phone can accomplish this rerouting to a VoIP mobile phone, and how VPMN, HPMN or IP service providers can enable this service based on various business models.

In accordance with the foregoing, there is a need in the art for a system, method, computer product and service which, will automatically route a call to the subscriber's non-VoIP wireless or fixed line number over IP to the subscriber's VoIP client when a subscriber's VoIP client is online. The subscriber's wireless or fixed line carrier or home wireless network operator may perform the routing operation, and can condition the routing to depend on whether the non-VoIP number is roaming or not answering.

BRIEF DESCRIPTION OF DRAWINGS

In the drawings, the same or similar reference numbers identify similar elements or acts.

SUMMARY

Figure 1:
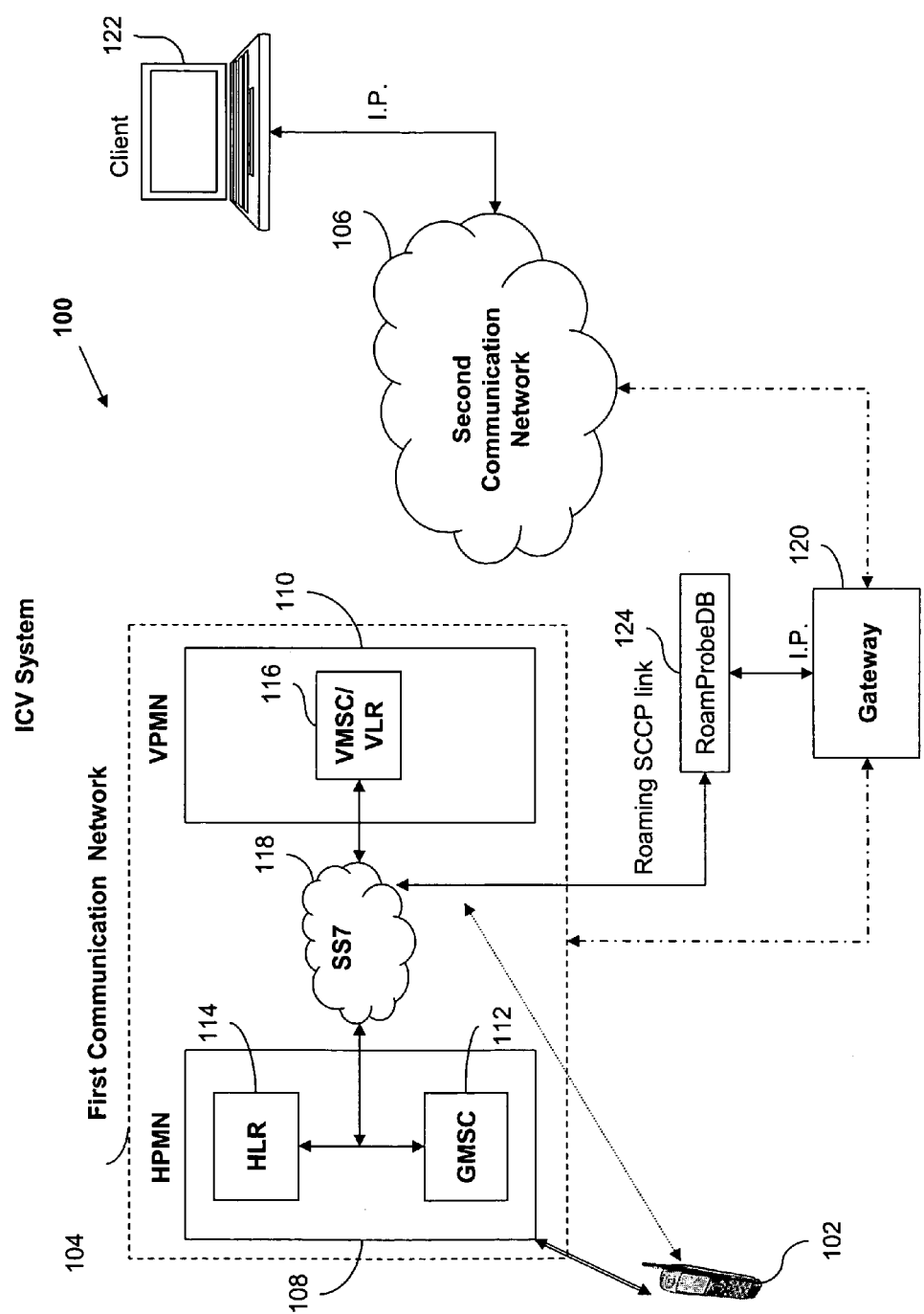
FIG. 1 represents an Integrated Cellular VoIP (ICV) System, in accordance with an embodiment of the invention.

The present invention is directed to a service that will automatically route a call to the subscriber's non-VoIP wireless or fixed line number over IP to the subscriber's VoIP client, when a subscriber's VoIP client is online. The subscriber's wireless or fixed line home operator may perform the routing, and system can route to different destinations based on conditions such as whether the non-VoIP number is roaming or whether it is not answering.

An aspect of the present invention comprises a system for routing a subscriber's calls associated with a first communication network including a home network or a visited network, by means of a gateway coupled to that first communications network. That gateway monitors roaming links of the first communication network and detects the subscriber registering with the visited network, and which receives location information corresponding to the location of the subscriber and selects a routing identifier, associated with at least one client coupled to the gateway via a second communication network. The routing identifier is associated with the client, and the gateway transfers the traffic of the subscriber to the client at the associated routing identifier, using the first or second communication network. The gateway further includes a mechanism to determine status of the client or the subscriber.

Another aspect of the present invention provides a system including a gateway coupled to a first communication system and a client application coupled to a client, which detects a coupling with a second communication system and transfers at least one message to the gateway via the coupling. The message may include identification information of the client or instructions and status information. The gateway establishes an association between a subscriber and a routing identifier associated with the client on the second communication system, and determines routing to the client via the second communication system that corresponds to the routing identifier of the client. The gateway transfers the traffic, received at the first communication system to the client as a VoIP call via the second communication system, using the routing and the status information.

Yet another aspect of the present invention presents a method for routing subscriber traffic that includes detecting the status or presence of the subscriber in a visited network. The method includes detecting a subscriber registration to a visited network, the subscriber being initially registered to a home network, the home network and the visited network being a part of a first communication network, receiving location information corresponding to a location of the subscriber, detecting at a gateway, status of at least one client associated with the subscriber, the client being coupled to the gateway via a second communication network, the gateway coupled to the first communication network, selecting a routing identifier associated with the client, the routing identifier corresponding to the location of the subscriber, and transferring traffic of the subscriber to the client at the associated routing identifier using at least one of the first communication network and the second communication network, wherein the transfer of traffic is performed based on the detected status of the client.

Another aspect of the present invention provides a computer program product including computer usable program code for routing subscriber traffic, detecting a subscriber registration to a visited network, in which the subscriber is initially registered to a home network and the home and visited networks being a part of a first communication network, receiving subscriber location information, detecting client status at a gateway, the client being coupled to the gateway via a second communication network, and the gateway being coupled to the first communication network, selecting a routing identifier corresponding to the location of the subscriber associated with the client, and transferring traffic of the subscriber to the client at the associated routing identifier using at least one of the first communication network and the second communication network, in which the transfer of traffic is performed based on the detected status of the client.

DETAILED DESCRIPTION

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified, so as not to obscure the present invention. Furthermore, reference in the specification to "one embodiment" or "an embodiment" means that a particular feature, structure or characteristic, described in connection with the embodiment, is included in at least one embodiment of the invention. The appearance of the phrase "in an embodiment," in various places in the specification, does not necessarily refer to the same embodiment.

The first communications network or second communications network under the present invention can be WiMax. Many embodiments of the present invention are illustrated in this patent application using examples of subscribers using the present invention to integrate phone calls with VoIP and the Internet. In the current state of the art, phone calls are often made using POTS or GSM or CDMA cellular networks. VoIP calls are often received over the Internet, connected via Ethernet, WiFi, DSL, cable modem connected by DOCSYS or other physical layers or even by dialup connections. Integrating presence and routing phone calls from one such network to any other such network are possible under the present invention. In addition, in the state of the art, so-called WiMax networks are being established worldwide, using public free spectrum, or spectrum specially allocated and licensed by governments. WiMax is a very high bandwidth protocol for transmitting data by radio frequency carrier wave. It is ammenable to use for phone calls and video calls such as those known in todays POTS, cellular and so-called "3G" networks. WiMax is also ammenable to use by personal computers, laptops or smart devices for data or Internet connectivity in the same manner as WiFi connections are commonly used today. In the present invention, phone calls to be rerouted may be placed in WiMax networks using WiMax enabled phone devices, or alternatively phone calls from any source can be rerouted to VoIP clients or other second communications networks to which a subscriber connects by means of a WiMax transceiver.

ICV System

FIG. 1 represents an Integrated Cellular VoIP (ICV) System 100 for routing traffic of a subscriber 102 associated with a first communication network 104 via a second communication network 106. First communication network 104 includes an HPMN (Home Public Mobile Network) 108, and a VPMN (Visited Public Mobile Network) 110, which are cellular networks. In another embodiment of the invention, the first communication network 104 is POTS, and the subscriber is a fixed line subscriber. Second communication network 106 is an IP based network, such as, but not limited to, a VoIP network, the Internet, a WiFi network, or a WiMax network. Subscriber 102 is a home subscriber of the HPMN 108, and may be roaming in VPMN 110, thus making it an outbound roamer from the perspective of HPMN 108.

In accordance with an embodiment of the invention, subscriber 102 uses a communication device, such as, but not limited to, a mobile station, a fixed line phone, a Wi-Fi enabled mobile phone, a WiMax enabled mobile phone, a personal computer connected to a widely accessible network such as the Internet, a portable computing device connected to a widely accessible network such as the Internet, a portable telephone, a portable communication device, a phone adaptor, or a personal digital assistant connected to a communications network.

HPMN 108 includes a GMSC (Gateway Mobile Switching Center) 112 and an HLR (Home Location Register) 114, which receives subscriber 102's location information when it is roaming in VPMN 110 from a VLR/VMSC (Visited Location Register/Visited Mobile Switching Center) 116 connected to the HLR 114, such as by a SS7 link 118. There may be a case when subscriber 102 is not in the coverage of either HPMN 108 or VPMN 110. For example, the subscriber may have his mobile phone switched off or may not be picking up the calls. In such cases, a gateway 120 is able to route any calls intended to subscriber 102 originally intended for mobile termination, instead to a client 122 associated with subscriber 102 via second communication network 106. Client 122 preferably couples to gateway 120 via second communication network 106. In accordance with an embodiment of the invention, the gateway can be any sort of gateway for person to person communications, including but not limited to, a VoIP gateway, a Skype gateway, a Vonage like gateway, a SIP/IMS gateway, or an IM-VoIP gateway or any other type of VoIP, SIP or instant-messaging type gateway. Client 122 is a VoIP client such as, but not limited to, Skype™, Yahoo®, Google®, GizmoProject, MSN®, Vonage or any SIP, VoIP or messaging client. Client 122 may be a VoIP based application installed on a PC, a laptop or a smart device associated with subscriber 102. The client installed on any one of the devices listed above hereinafter interchangeably refers to as client 122.

In one embodiment of the invention, gateway 120 couples to both, HPMN 108 and VPMN 110. Alternatively, HPMN 108 may deploy gateway 120 or a third network that has access to HPMN 108 may host gateway 120. If the third network hosts the gateway, the gateway can support multiple home operators, thereby making the implementation scalable. In another embodiment of the invention, the visited network operator 106 deploys ICV system 100 and gateway 120 couples to VPMN 110. Usually, gateway 120 has an SS7 interface to HLR 114 of HPMN 108 and hence is always online from HLR's perspective. When subscriber 102 subscribes to the services provided by ICV system 100, the client 122, installed at subscriber's device, is able mutually to accept VoIP client interface of gateway 120 at HPMN 108, as buddies. In other words, this embodiment enables each client to indicate the presence of other VoIP clients as being available for communications, to the extent that each VoIP client has designated the other as a "buddy" or as being permitted to indicate presence. Subscriber 102 can turn on or turn off incoming calls on his mobile number via IP when connected by configuring client's 122 presence indication to the home operator's VoIP client (at gateway 120). (for example "visible/invisible (or block/unblock)", or "visible but not available" or "visible but do not disturb" or "invisible but available"—a designation meaning the client will be able to see which buddies are present, but will not display its own presence to them_) This client control of visibility to gateway 120 is referred to herein as presence management of the client. The presence management of a VoIP client can be controlled via an API (a client application built on the application programming interface of the VoIP client), which may also provide a user interface to the VoIP client. For example, the API of the VoIP client can switch the visibility status of its client towards the VoIP gateway.

In accordance with an embodiment of the invention, the client application (i.e. the API) coupled to client 122 detects a coupling of client 122 with the second communication system, and transfers one or more messages to the gateway via the coupling. The messages may include identification information of client 122 and one or more instructions and status information pertaining to client 122. The message may contain in its header, routing information from client 122 to gateway 120. The status information is either blocking or unblocking information of client 122. The status information may also define the call forwarding status of client 122 with the required call forwarding number. Gateway 120 may receive these instructions including control instructions such as, an Instant Message (IM) or an SMS.

In one embodiment of the invention, gateway 120 can support any number of types of VoIP clients 122 to support different subscribers. Often, ordinary users will subscribe to a number of different VoIP or messaging services. For example, a person might generally use Skype to communicate with all other Skype subscribers, but might also operate a SIP client for Vonage Softphone, in order to make calls from his laptop using his home Vonage account. Or a person might both subscribe to AOL Instant Messenger for buddies in the U.S., but also Neophone to make calls in Europe. Or a person may have one set of friends that are "buddies" on MSN Messenger, but another set of friends that use Google Talk. A gateway 120 that supports multiple types of VoIP or messaging clients could enable a single subscriber to have phone calls forwarded to various VoIP clients based on configurable conditions.

In particular, gateway 120 supports different subscribers or phone numbers (fixed or mobile) with a single VoIP client or multiple VoIP clients. There could also be one physical gateway 120 supporting multiple types of VoIP clients, or one gateway for each type of VoIP client. For example, there may be a Skype™ VoIP gateway for a Skype type client and a Yahoo® VoIP gateway for a Yahoo® type client. In another embodiment of the invention, a subscriber may have multiple associated VoIP clients of different types. In such cases, the subscriber may choose to have a client preferential order such that only the most preferred client available online (with the VoIP gateway client), is called. The preference can also be sequential whereby a caller may call the next preferred client only when the most preferred client is unavailable. In yet another embodiment of the invention, the gateway couples to the HPMN to cater to multiple subscribers present in the home network.

Gateway 120 monitors the SS7 link 118 (i.e. the roaming SCCP link) exchanged between HPMN 108 and VPMN 110, thereby detecting registration of subscriber 102 with VPMN 110. In one embodiment of the invention, gateway 112 uses a roamer probe database (RPD) 124 to intercept the SS7 link 118. Gateway 120 connects to the RPD 124 using an IP protocol. RPD 124 monitors messages, including but not limited to, MAP location update, InsertSubscriberData (ISD), Cancel Location, and PurgeMS messages at the roaming links of the operator (i.e. HPMN 108). RPD 124 stores the subscriber's current VLR/VMSC/SGSN locations, IMSI/MSISDN, conditional forwarding information and other subscriber profile data. Further, when HPMN 108 receives a PurgeMS or a CancelLocation without a new location update, the current roamer's RPD deletes the subscriber record. Gateway 120 may access RPD 122 to check if subscriber 102 is roaming with VPMN 110. Thus, gateway 120 receives the location information corresponding to the location of subscriber 102 from RPD 124. Hence, gateway 120 embodies a mechanism to determine the status of both subscriber 102 and client 122. Gateway 120 uses RPD 124 to detect whether subscriber 102 is in any operator's coverage in first communication network 104. Also, the VoIP client of gateway 120 at HPMN 108 receives the client's status information via the second communication network 106.

Also, gateway 120 selects a routing identifier associated with client 122. The routing identifier is typically a number associated with the client. Examples of routing identifiers may include, but are not limited to, a Skype-IN number, a mobile number of the subscriber, a fixed landline number associated with the subscriber, a temporary assigned routing number corresponding to the location of the subscriber and a temporarily assigned late call forwarding number for the subscriber. Gateway 120 selects the routing identifier based on the type of VoIP client is used. In addition, the selection also depends on whether the subscriber is a wireless or a wireline subscriber. The VoIP client may or may not have a call-in number associated with it. For example, a VoIP client such as Skype has a Skype-IN number associated with it. However, a VoIP client like MSN® does not have any associated call-in number. Even in such a case, it is possible to route the traffic (call traffic etc.) for the subscriber at a routing identifier associated with such client. The routing identifier in this case may be a temporary assigned routing number. In one embodiment of the invention, the routing identifier may be corresponding to the location of the subscriber. In the case of a temporarily assigned number, the HPMN operator may configure/program the VoIP Gateway to support independent VoIP calls between the HPMN's VoIP Client and each subscriber's VoIP Client. Thereafter, gateway 120 transfers the traffic associated with the subscriber to client 122 at the associated routing identifier using second communication network 106. The traffic associated with the subscriber may be call traffic or value added services traffic such as an SMS. In other words, gateway 120 may forward a subscriber's call, text message, or a text message indicating the call, to the client. Gateway 120 typically would transfer the traffic to the routing identifier using second communication network 106, i.e., the IP based network. The case, in which the IP network is down, gateway 120 routes the traffic using first communication network 104, i.e., the cellular network. However, in such cases, gateway 120 routes the call to the mobile number of the subscriber and not to the VoIP client of the subscriber.

The ICV system described herein integrates VoIP with SS7 signaling and, in contrast to typical integrated communication systems, allows roaming subscribers to receive telephone calls as VoIP calls at the routing numbers of the client associated with the subscriber. The ICV system also supports integrated cellular Wi-Fi services for cellular telephones. The ICS system also supports multiple cellular technologies including GSM, CDMA, and TDMA, to name a few.

SS7 signaling is a Common Channel Signaling ("CCS") system defined by the International Telecommunications Union-Telecommunication Standardization Sector ("ITU-T"). SS7 signaling is common in telecommunication networks and provides a suite of protocols, which enables routing of circuit and non-circuit related information within and between networks. The protocols of SS7 signaling include but are not limited to Message Transfer Part ("MTP"), Signaling Connection Control Part ("SCCP"), and Integrated Service Digital Network ("ISDN") User Part ("ISUP").

Figure 2:
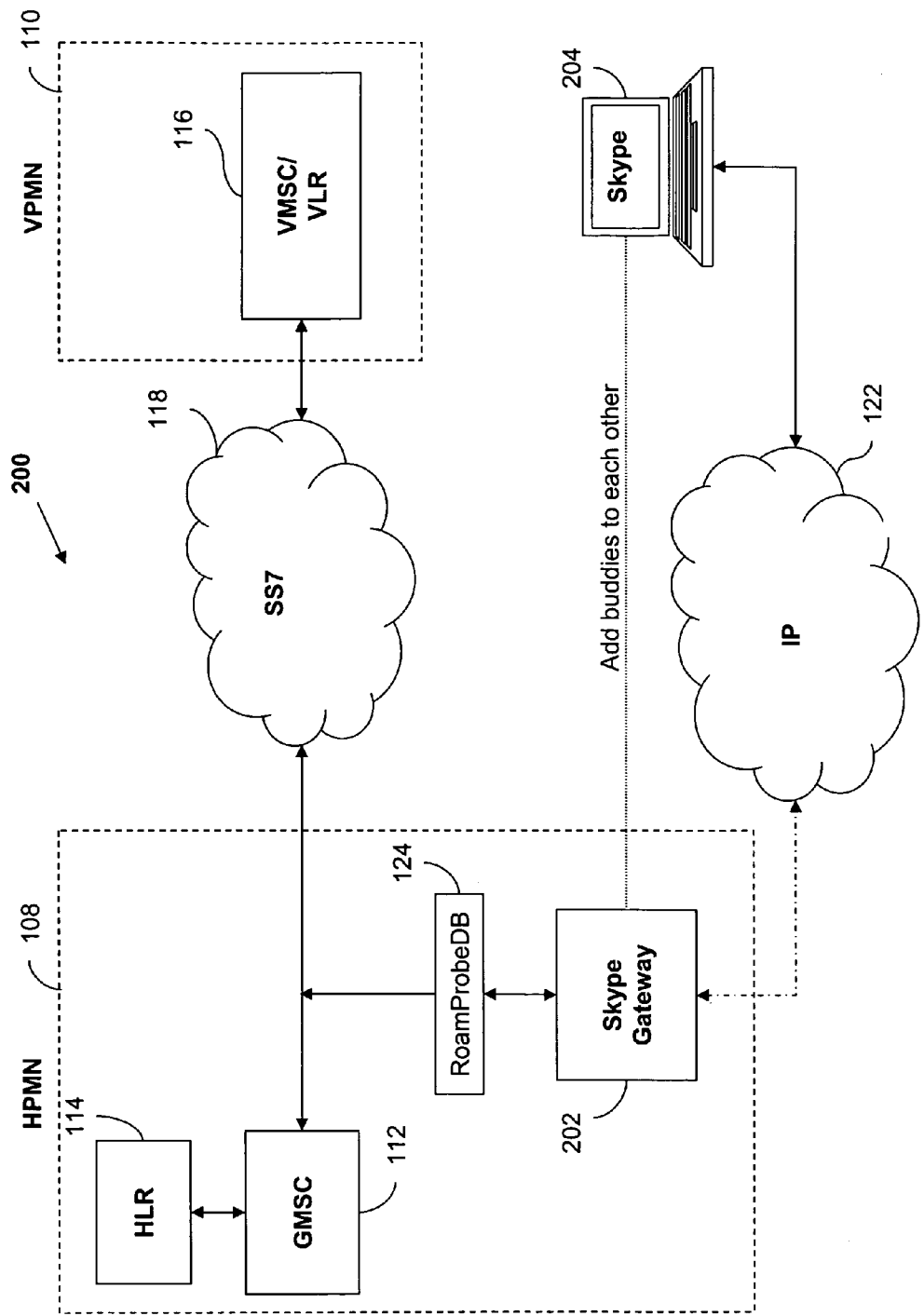
FIG. 2 represents the ICV system implemented using a Skype service, in accordance with an embodiment of the invention.

FIG. 2 represents an ICV system 200 implemented using the Skype™ service, in accordance with an embodiment of the invention. This embodiment applies to wireless subscribers present in first communication network 104. ICV system 200 is a modified version of ICV system 100. ICV system 200 includes a Skype gateway 202 as the VoIP gateway, so as to cater to Skype users. Further, HPMN 108 deploys Skype gateway 202, with RPD 124 monitoring the roaming SCCP links between HPMN 108 and VPMN 110. RPD 124 provides the roaming information to Skype gateway 202. The subscriber may use a laptop, a PC or a smart device with a Skype client 204 connected to the Skype gateway 202 using IP protocol. ICV system 200 advantageously utilizes the fact that Skype provides a call-in number (Skype-IN) facility and assumes that subscriber 102 has subscribed to the call-in service of Skype™.

Figure 3:
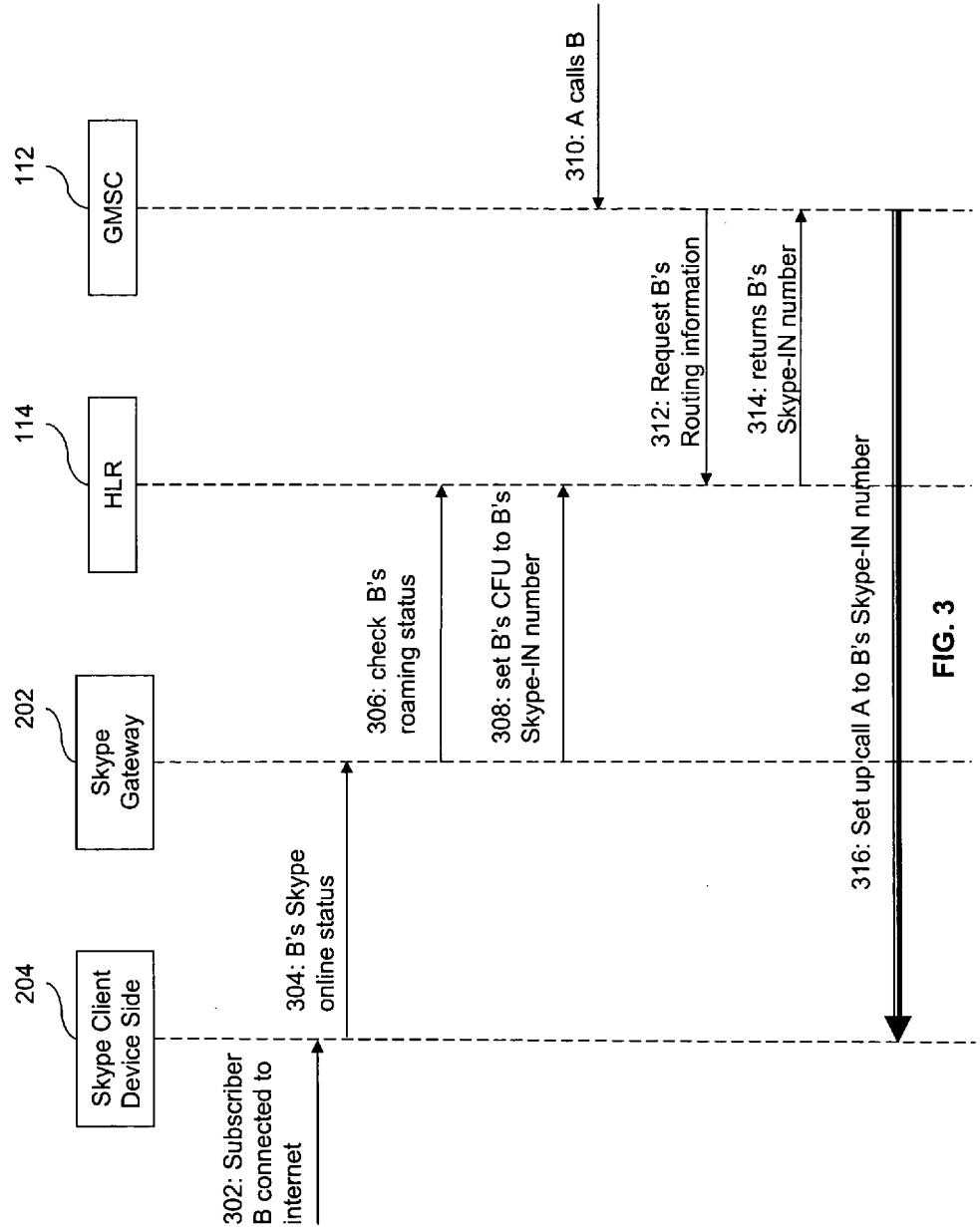
FIG. 3 represents a flow diagram of unconditional call forwarding implementation of the ICV system using the Skype service, in accordance with an embodiment of the invention.

FIG. 3 represents a flow diagram of unconditional call forwarding implementation in ICV system 200 using the Skype service, in accordance with an embodiment of the invention. The unconditional call forwarding implies that routing of any mobile terminated (MT) call to an outbound roamer at his mobile number to its associated client over the IP network. In accordance with various embodiments of the invention, subscriber 102 is interchangeably referred to herein as subscriber B. At step 302, subscriber B connects to the Internet (or any other IP based network) using the Skype client 204. At step 304, Skype client 204 informs his 'online' status to the Skype gateway 202 present in HPMN 108 of subscriber B. Thereafter, in accordance with an embodiment of the invention, at step 306, Skype gateway 204 checks subscriber B's roaming status and other subscriber information with HLR 114. Skype gateway 204 checks whether unconditional call forwarding is set against RPD 124. If not, at step 308, Skype gateway 202 sets unconditional call forwarding for subscriber B to the Skype-IN number. To do so, Skype gateway 202 issues messages, for example, MAP RegisterSS in GSM network, to the HLR 114. Next, at step 310, another subscriber A calls subscriber B at his mobile number and the call reaches at GMSC 112 of subscriber B's network. Thereafter, at step 312, GMSC 112 requests subscriber B's routing information from the HLR 114 by sending a MAP SRI message (in a GSM implementation) to the HLR. In case of a CDMA network implementation, an IS 41 MAP Location Request message is used. Thereafter, at step 314, HLR 114 returns subscriber B's Skype-IN number to GMSC 112. Finally, at step 316, GMSC 112 initiates a call set up using subscriber A's number, subscriber B's called number (as the originally called number) and the Skype-IN number of subscriber B. Hence, the Skype gateway 202 re-directs the call initially destined to mobile number of subscriber B, to the Skype-IN number associated with the Skype client 204.

Figure 4A:
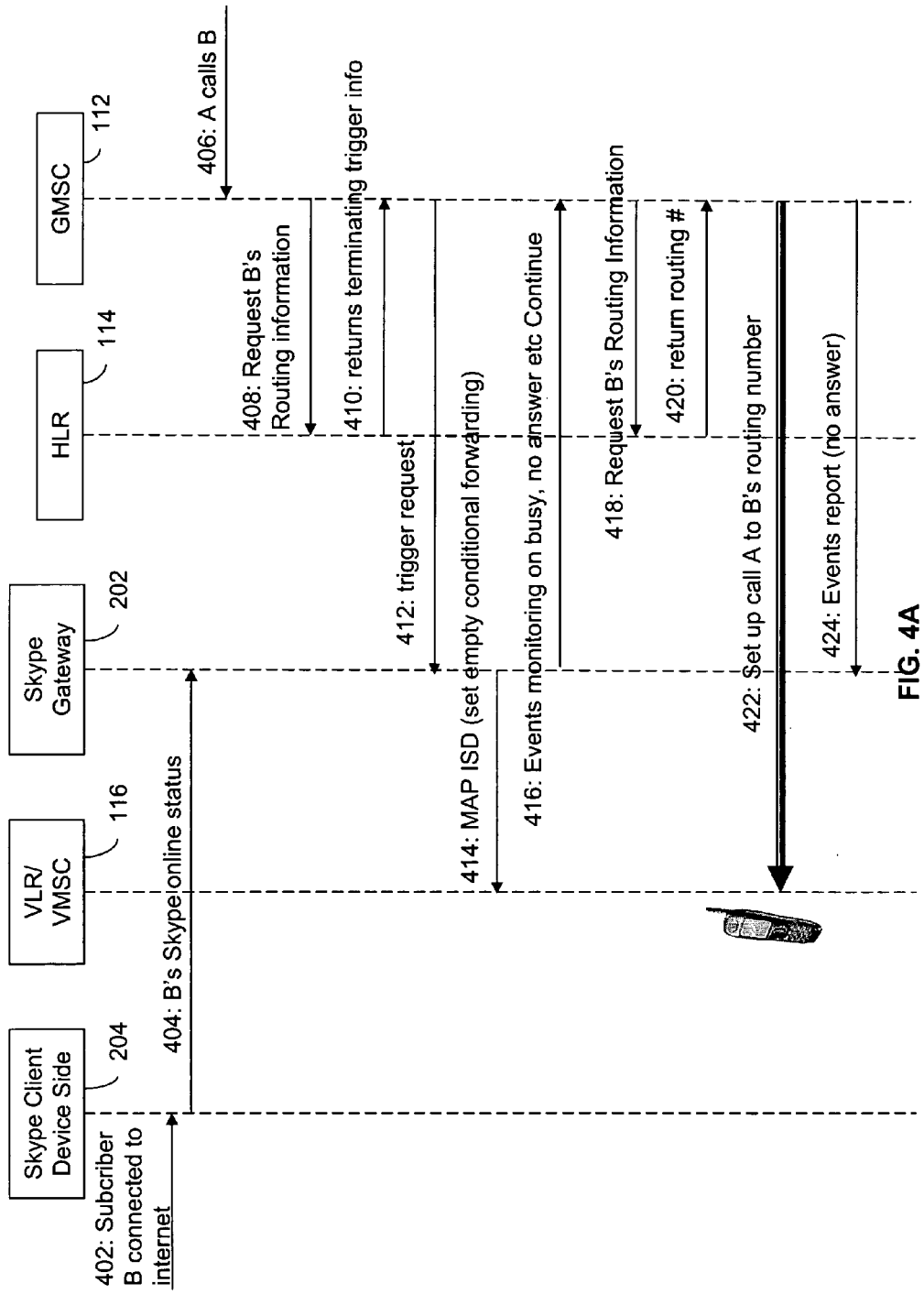
FIGS. 4A and 4B represent a flow diagram of conditional late call forwarding implementation of the ICV system using the Skype service, in accordance with a first embodiment of the invention.
Figure 4B:
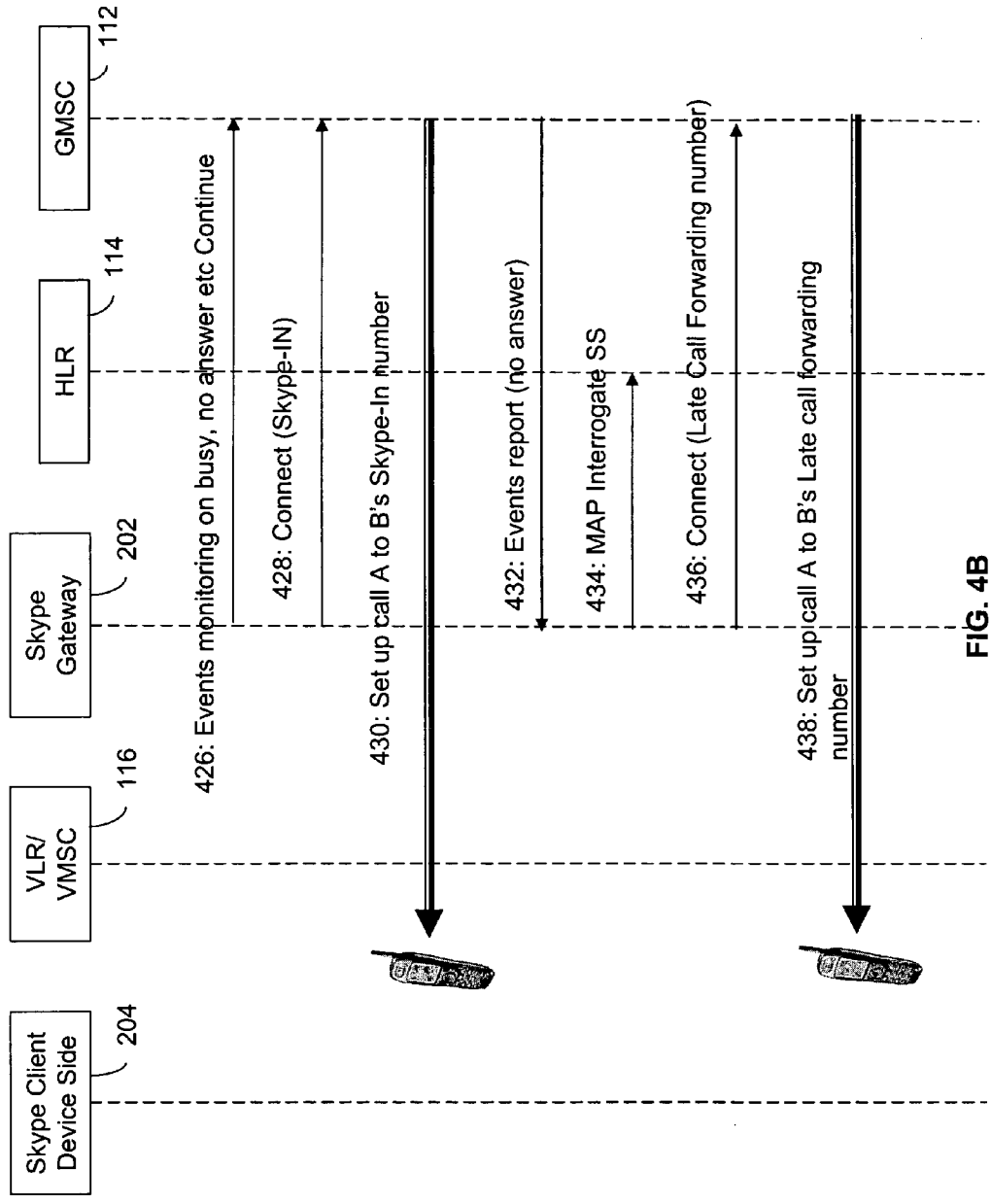

FIGS. 4A and 4B represent a flow diagram of conditional late call forwarding implementation of the ICV system 200 using Skype a VoIP or messaging client or method such as Skype, in accordance with a first embodiment of the invention. In the case of Skype, and other peer-to-peer or client-based VoIP networks, often a variation of the ordinary client is available that permits commercial operation of Skype, permits publishing presence to other applications, and is configured as a "supernode," that is as a client that is capable of processing a great deal more peer traffic than the ordinary free-of-charge client that ordinary users download and operate on their computers. Optionally, ICV System 200, or gateway 202 would operate in conjunction with such a "supernode" or commercial-grade version of a VoIP client. More information about state-of-the art commercial extensions on free peer-to-peer messaging systems is available in the Sep. 15, 2004 article by Salman A. Basset which is incorporated herein by this reference.

This embodiment uses DP 12 terminating trigger to implement the conditional late call forwarding. At step 402, subscriber B connects to the Internet (or any other IP based network) using Skype client 204. At step 404, Skype client 204 informs his 'online' status to Skype gateway 202 present in HPMN 108 of subscriber B. Thereafter, at step 406, subscriber A calls subscriber B at his mobile number and the call reaches GMSC 112 of B's network. At step 408, GMSC 112 requests B's routing information from HLR 114, by sending a MAP SRI message (in a GSM implementation) to HLR 114. In case of a CDMA network implementation, an IS 41 MAP Location Request message is used. Thereafter, at step 410, HLR 114 returns the terminating trigger to GMSC 112. The terminating trigger may be a Camel T-CSI in GSM implantation or a WIN in CDMA implementation. The terminating trigger used may also depend on specific switch vendors such as Siemens, Nokia etc. GMSC 112 downloads the terminating trigger only when the subscriber is roaming. At step 412, GMSC 112 issues a trigger request, such as Initial DP in IN protocol, to the Skype gateway 202, which is equipped with support of IN protocols.

Thereafter, at step 414, Skype gateway 202 issues a MAP ISD (IMSI-B) message to VLR/VMSC 116 of subscriber B. The Skype gateway 202 receives VLR/VMSC 116 information either from Initial DP or from RPD 124. The Skype gateway 202 sends the MAP ISD message to remove (set to empty) the conditional forwarding information from the VLR/VMSC. Next, at step 416, Skype gateway 202 requests the monitoring of call events, such as NO-ANSWER and BUSY, from GMSC 112, and issues a CONTINUE message to GMSC 112. At step 418, GMSC 112 again requests HLR 114 for the routing information of subscriber B. At step 420, HLR 114 returns the routing number (i.e. the routing identifier), such as MSRN in GSM implementation and TLDN in CDMA implementation. GMSC 112 then continues the call setup using the routing number, at step 422. If subscriber B does not respond to the call at the MSRN, then, at step 424, GMSC 112 sends an event report to Skype gateway 202. At step 426, Skype gateway 202 again requests for monitoring of call events such as NO-ANSWER and BUSY from GMSC 112. Thereafter, at step 428, Skype gateway 202 requests GMSC 112 to connect subscriber B's Skype-IN number. Hence, at step 430, GMSC 112 initiates a call set up using subscriber A's number, subscriber B's called number (as the originally called number) and the Skype-IN number of subscriber B.

In case Skype client 204 did not respond to the call at the Skype-IN number, at step 432, GMSC 112 is able to send an event report to Skype gateway 202. If subscriber B sets the Skype client 204 with call forwarding, such as to a Skype voicemail, the call goes to the forwarded number. Thereafter, at step 434, Skype gateway 202 gets the conditional forwarding number of subscriber B, either from RPD 124 or by issuing MAP Interrogate SS (or messages like AnyTimeSubscriberProfile, restoreData or SendParameters), to HLR 114 on the late call forwarding number corresponding to the late forwarding condition received. The late call forwarding number maybe a temporarily allocated number. At step 436, Skype gateway 202, requests GMSC 112 to connect to the late call forwarding number of subscriber B. Hence, at step 438, Skype gateway 202 re-directs the call initially destined to mobile number of subscriber B, to the late call forwarding number of subscriber B.

Figure 5A:
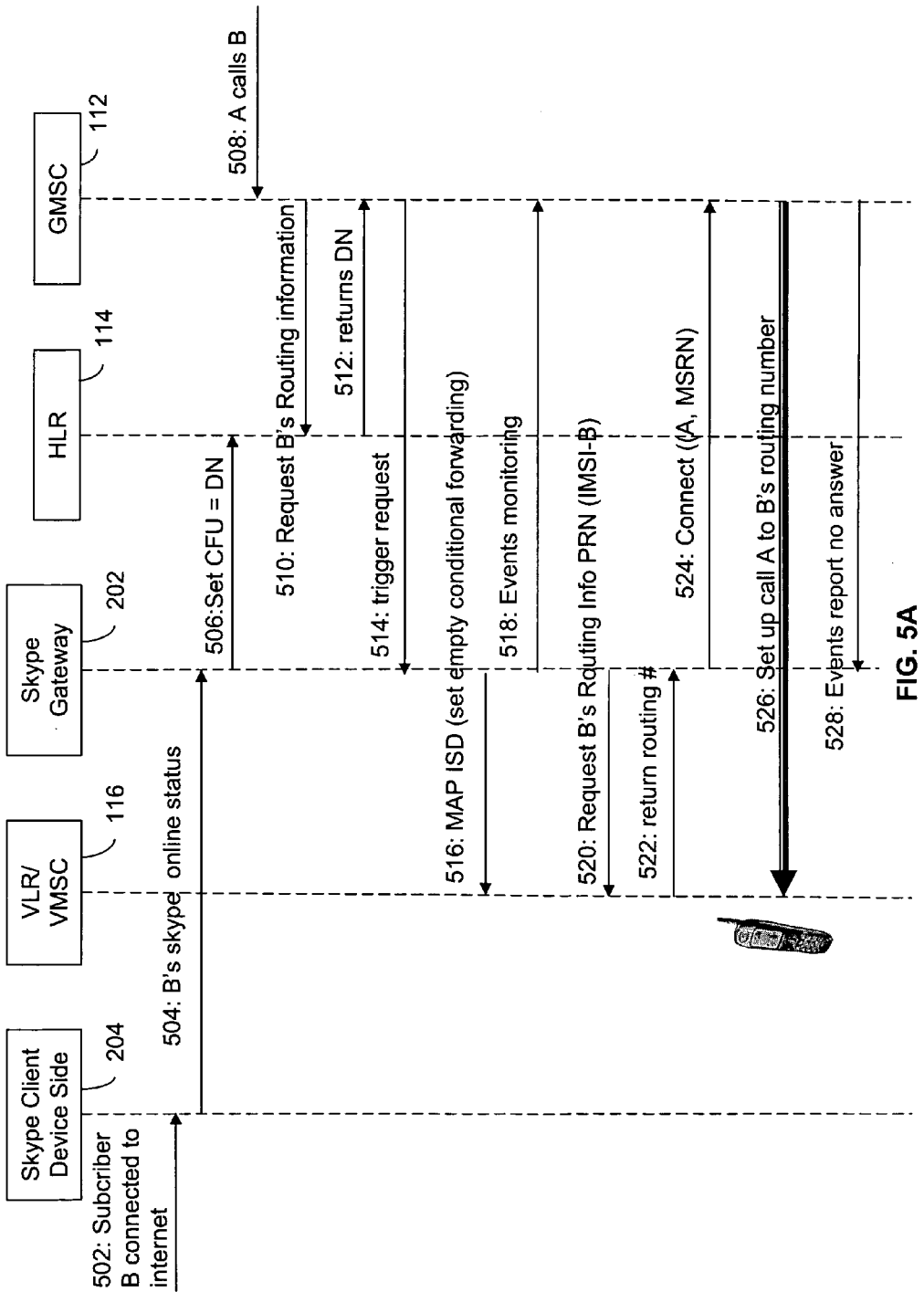
FIGS. 5A and 5B represent a flow diagram of conditional late call forwarding implementation of the ICV system using the Skype service, in accordance with a second embodiment of the invention.
Figure 5B:
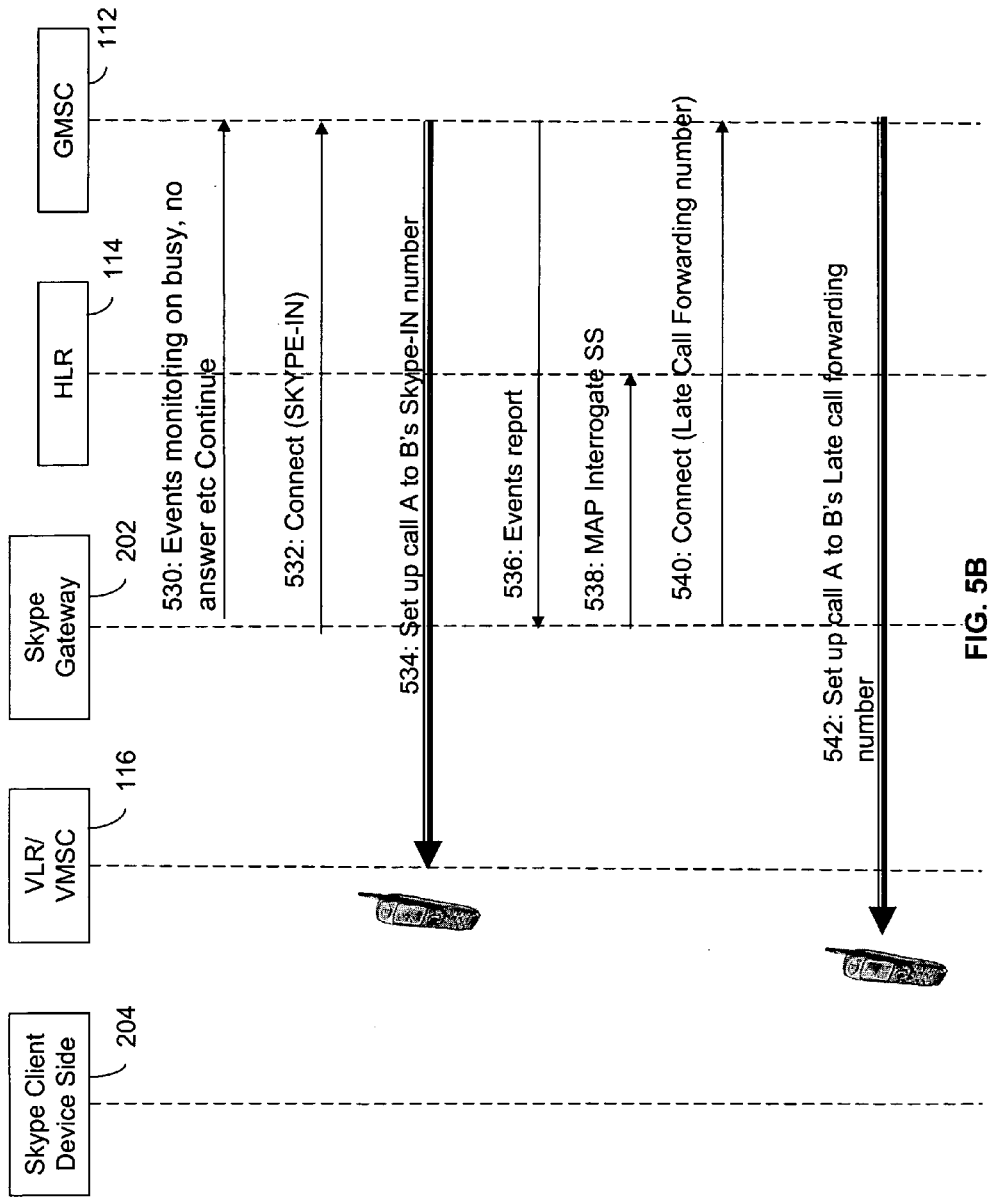

FIGS. 5A and 5B represent a flow diagram of conditional late call forwarding implementation of ICV system 200 using the Skype service, in accordance with a second embodiment of the invention. This embodiment uses DP 2 or DP 3 trigger to implement the conditional late call forwarding. Contrary to the previously described embodiment for the DP 12 trigger implementation, this implementation does not require a HLR trigger profile, which is an expensive resource in terms of HLR storage when there are many subscribers, and in terms of the number of different T-CSI profiles a subscriber can have. Also, the call flow is no different from ordinary call flow when subscriber B is not roaming or not online. At step 502, subscriber B connects to the Internet (or any other IP based network) using Skype client 204. At step 504, Skype client 204 informs his 'online' status to the Skype gateway 202 present in HPMN 108 of subscriber B. Skype gateway 202 may check that the roaming status and unconditional call forwarding (CFU) status is unset. Thereafter, at step 506, Skype gateway 202 sets the CFU to a Dummy Number (DN) via MAP RegisterSS at subscriber B's HLR entry. Since GMSC 112 uses the DP 2 or DP 3 trigger, it is able to perform event supervision on the DN. At step 508, subscriber A calls subscriber B at his mobile number and the call reaches GMSC 112 of subscriber B's network. At step 510, GMSC 112 requests subscriber B's routing information from HLR 114 by sending a MAP SRI message (in a GSM implementation) to HLR 114. In case of a CDMA network implementation, an IS 41 MAP Location Request message is used. Thereafter, at step 512, HLR 114 returns the DN to GMSC 112.

Next, at step 514, GMSC 112 issues the DP2 or DP3 network trigger request on the DN (e.g. InitialDP in IN protocol) to Skype Gateway 202, which is equipped with support for IN protocols. In this case, the IDP parameters should contain the original called number of subscriber B. At step 516, Skype gateway 202 issues a MAP ISD (IMSI-B) message to VLR/VMSC 116 of subscriber B. Skype gateway 202 receives the information of VLR/VMSC 116 either from Initial DP or from RPD 124. Skype gateway 202 sends the MAP ISD message to remove (set to empty) the conditional forwarding information from VLR/VMSC 116. Then, at step 518, Skype gateway 202 requests the monitoring of call events such as NO-ANSWER, and BUSY from GMSC 112. Thereafter, at step 520, Skype gateway 202 issues a MAP PRN (IMSI-B) message to VLR/VMSC 116 with the information received from RPD 124. At step 522, VLR/VMSC 116 returns the routing number to Skype gateway 202. The routing number is the MSRN in GSM implementation, while it is the TLDN in CDMA implementation. Upon receiving the routing number, Skype gateway 202, at step 524, issues an IN protocol message CONNECT (A, MSRN) to GMSC 112. At step 526, GMSC 112 continues the call setup towards the routing number. In case, subscriber B did not respond to the call at the mobile number, at step 528, GMSC 112 sends the event report to Skype gateway 202.

Thereafter, at step 530, Skype gateway 202 again requests for monitoring of call events such as NO-ANSWER and BUSY from GMSC 112. Thereafter, at step 532, Skype gateway 202 requests GMSC 112 to connect subscriber B's Skype-IN number. Hence, at step 534, GMSC 112 initiates a call set up using subscriber A's number, subscriber B's called number (as originally called number) and the Skype-IN number of subscriber B. The Skype client can answer the call, when ringing.

In case, Skype client 204 did not respond to the call at the Skype-IN number either, at step 536, GMSC 112 sends the event report to Skype gateway 202. In case the subscriber B sets Skype client 204 with call forwarding such as a Skype voicemail, the call goes to the forwarded number. At step 538, Skype gateway 202 gets the conditional forwarding number of B, either from RPD 124 or by issuing MAP Interrogate SS (or messages like AnyTimeSubscriberProfile, restoreData or SendParameters), to HLR 114 on the late call forwarding number corresponding to the late forwarding condition received. At step 540, Skype gateway 202 requests GMSC 112 to connect to the late call forwarding number of subscriber B. Hence at step 542, the Skype gateway 202 re-directs the call initially destined to mobile number of subscriber B, to the late call forwarding number of subscriber B.

In some of the above explanations accompanying the figures, the VoIP clients may be busy, not answering, or not reachable. Hence, it is desirable for the ICV system to have the ability to switch the calls from VoIP clients to mobile station and vice versa. The reason for switching from VoIP client to mobile may due to improvement in the voice quality during the middle of VoIP client call, by switching the call to the mobile.

Figure 6:
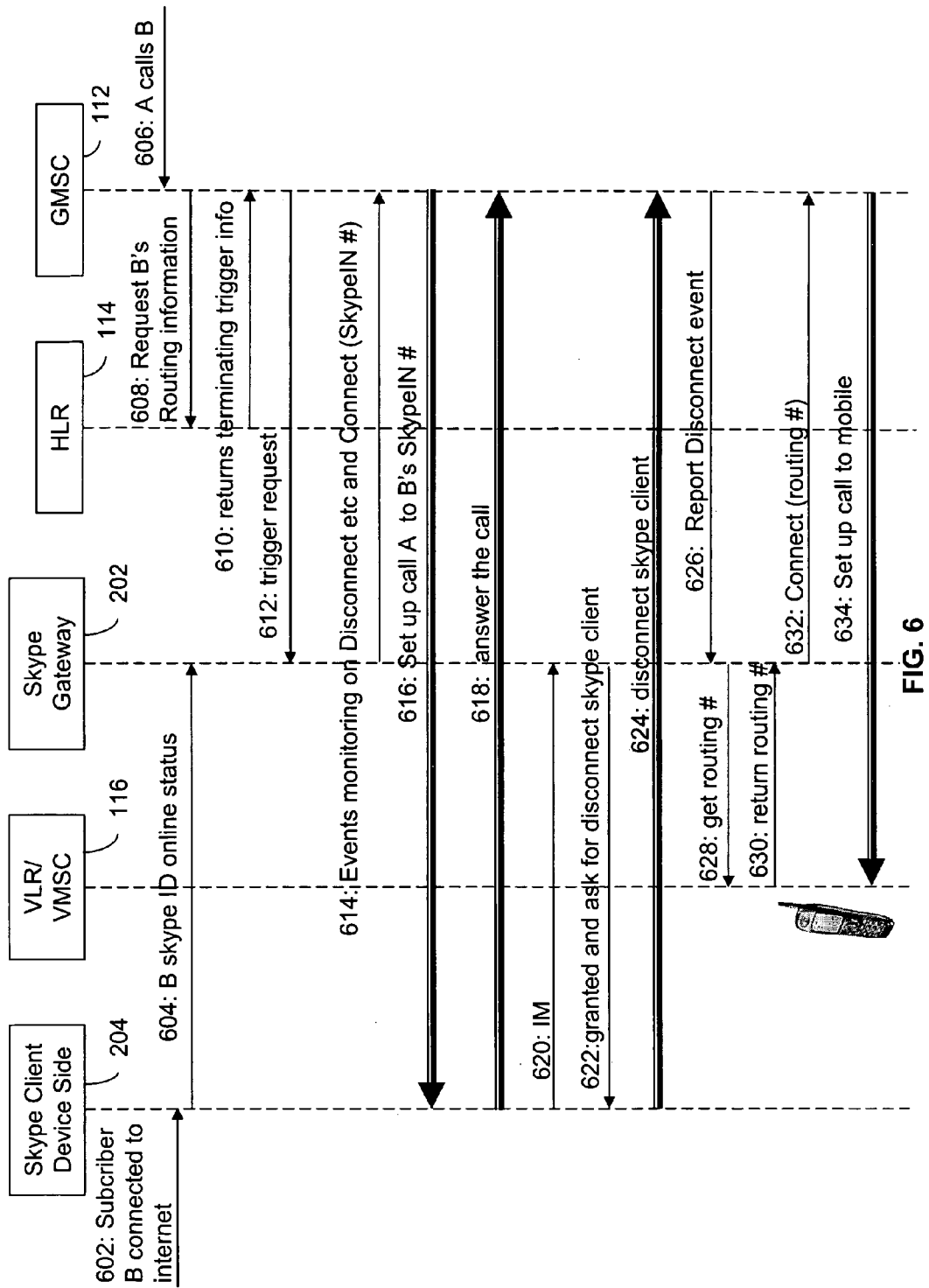
FIG. 6 represents a flow diagram for switching of traffic from a second communication network to a first communication network, in accordance with one embodiment of the invention.

FIG. 6 represents a flow diagram for switching of traffic from a second communication network to a first communication network, in accordance with one embodiment of the invention. This embodiment uses DP 12 terminating trigger to implement the switching of traffic. At step 602, subscriber B connects to the Internet (or any other IP based network) using the Skype client 204. At step 604, Skype client 204 informs his 'online' status to Skype gateway 202, present in HPMN 108 of subscriber B. Thereafter, at step 606, subscriber A calls subscriber B at his mobile number and the call reaches GMSC 112 of subscriber B's network. At step 608, GMSC 112 requests subscriber B's routing information from HLR 114 by sending a MAP SRI message (in a GSM implementation) to HLR 114. In case of a CDMA network implementation, an IS 41 MAP Location Request message is used. Thereafter, at step 610, HLR 114 returns the terminating trigger to GMSC 112. The terminating trigger may be a Camel T-CSI in GSM implantation or a WIN in CDMA implementation. The terminating trigger is also dependent on specific switch vendors such as Siemens, Nokia etc. GMSC 112 downloads the terminating trigger only when a subscriber is roaming. At step 612, GMSC 112 issues a trigger request such as, Initial DP in IN protocol, to Skype gateway 202, which is equipped with support of IN protocols.

Thereafter, at step 614, Skype gateway 202 requests monitoring of call events such as DISCONNECT, Busy or No Answer from GMSC and issues a CONNECT (Skype-IN number). At step 616, GMSC 112 sets up the call from subscriber A to Skype-IN number of subscriber B. At step 618, Skype client 204 answers the call at Skype-IN number. Thereafter, at step 620, Skype client 204 sends an Instant Message (IM) to Skype gateway 202 requesting to switch the ongoing call to subscriber B's mobile number. At step 622, Skype gateway 202 grants switching and asks Skype client 204 to disconnect the call. Hence, at step 624, Skype client 204 disconnects the call. GMSC 112, at step 626, issues the event report of DISCONNECT to Skype gateway 204. Further, at step 628, Skype gateway 204 issues the PRN (IMSI-B) to VLR/VMSC 116. Skype gateway 202 receives the information of VLR/VMSC 116 either from Initial DP or from RPD 124. At step 630, VLR 116 returns the routing number (i.e. the routing identifier) such as, MSRN in GSM implementation and TLDN in CDMA implementation. Skype gateway 202 issues a Connect to routing number to GMSC 112, step 632. Finally, at step 634, subscriber B answers the voice call from A at his mobile number.

Figure 7:
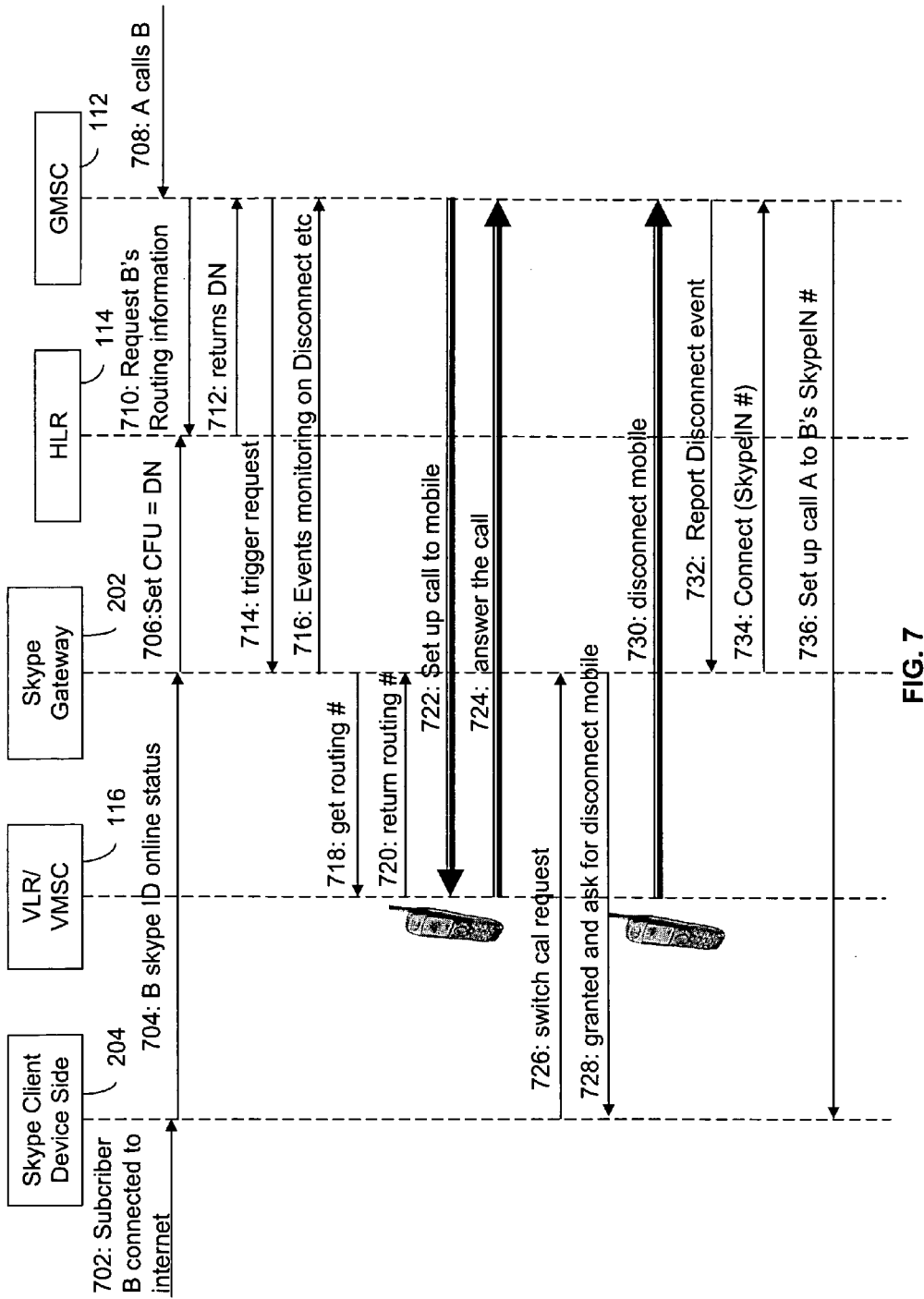
FIG. 7 represents a flow diagram for switching of traffic from the first communication network to the second communication network, in accordance with another embodiment of the invention.

There may also be a requirement of switching an ongoing call and not just a no responding call from a mobile number to the VoIP client. The reason for this would be the higher cost of a call to the mobile in comparison to the call at the VoIP client when it is online. FIG. 7 represents a flow diagram for switching of traffic from first communication network 104 to second communication network 106, in accordance with another embodiment of the invention. This embodiment uses DP 2 or DP 3 trigger to implement the switching of traffic. At step 702, subscriber B connects to the Internet (or any other IP based network) using Skype client 204. At step 704, Skype client 204 informs his 'online' status to Skype gateway 202 present in HPMN 108 of subscriber B. At step 706, Skype gateway 202 checks the roaming status and unconditional call forwarding (CFU) status against RPD 124. Thereafter, Skype gateway 202 sets the CFU to a Dummy Number (DN) via MAP RegisterSS at subscriber B's HLR entry. Since GMSC 112 uses DP 2 or DP 3 trigger, it is able to perform event supervision on the DN. At step 708, subscriber A calls subscriber B at his mobile number and the call reaches GMSC 112 of subscriber B's network. At step 710, GMSC 112 requests subscriber B's routing information from HLR 114 by sending a MAP SRI message (in a GSM implementation) to the HLR. In case of a CDMA network implementation, an IS 41 MAP Location Request message is used. Further, at step 712, HLR 114 returns the DN to GMSC 112.

Thereafter, at step 714, GMSC 112 issues the DP2 or DP3 network trigger request on the DN (e.g. InitialDP in IN protocol) to Skype Gateway 202, which is equipped with support for IN protocols. In this case, the IDP parameters should contain the original called number of B. At step 716, Skype gateway 202 requests monitoring of events such as DISCONNECT from GMSC 112. Thereafter, at step 718, Skype gateway 202 issues PRN (IMSI-B) message to VLR/VMSC 116 of subscriber B. VLR/VMSC 116 returns the routing number (MSRN) at step 720. GMSC 112, at step 722, routes the call to the mobile. Subscriber B answers the call at step 724. At step 726, Skype client 204 sends an IM to the Skype gateway requesting to switch the call to Skype client 204. Thereafter, at step 728, Skype gateway 202 grants the switching and requests the subscriber to disconnect the call to the mobile. The subscriber disconnects the call at his mobile number at step 730. At step 732, GMSC 112 issues the DISCONNECT event report to Skype gateway 202. Thereafter, at step 734, Skype gateway 202 issues a CONNECT (Skype-IN) to GMSC 112. GMSC 112 routes the call to the Skype-IN number at step 736. Hence, the voice call gets through the IP network when the Skype client answers the call.

In both the above embodiments, Skype is an explanatory VoIP client for switching call flow. However, it would be apparent to a person skilled in the art that similar call flows would be applicable to other VoIP clients like Yahoo®, Google, Gizmon, MSN etc. It would also be apparent to a person skilled in the art that the implementation, as explained above, also allows the subscriber to alternate between one device and another several times using the instructions communicated to the VoIP/Skype™-Gateway from the IM/Skype client.

Figure 8:
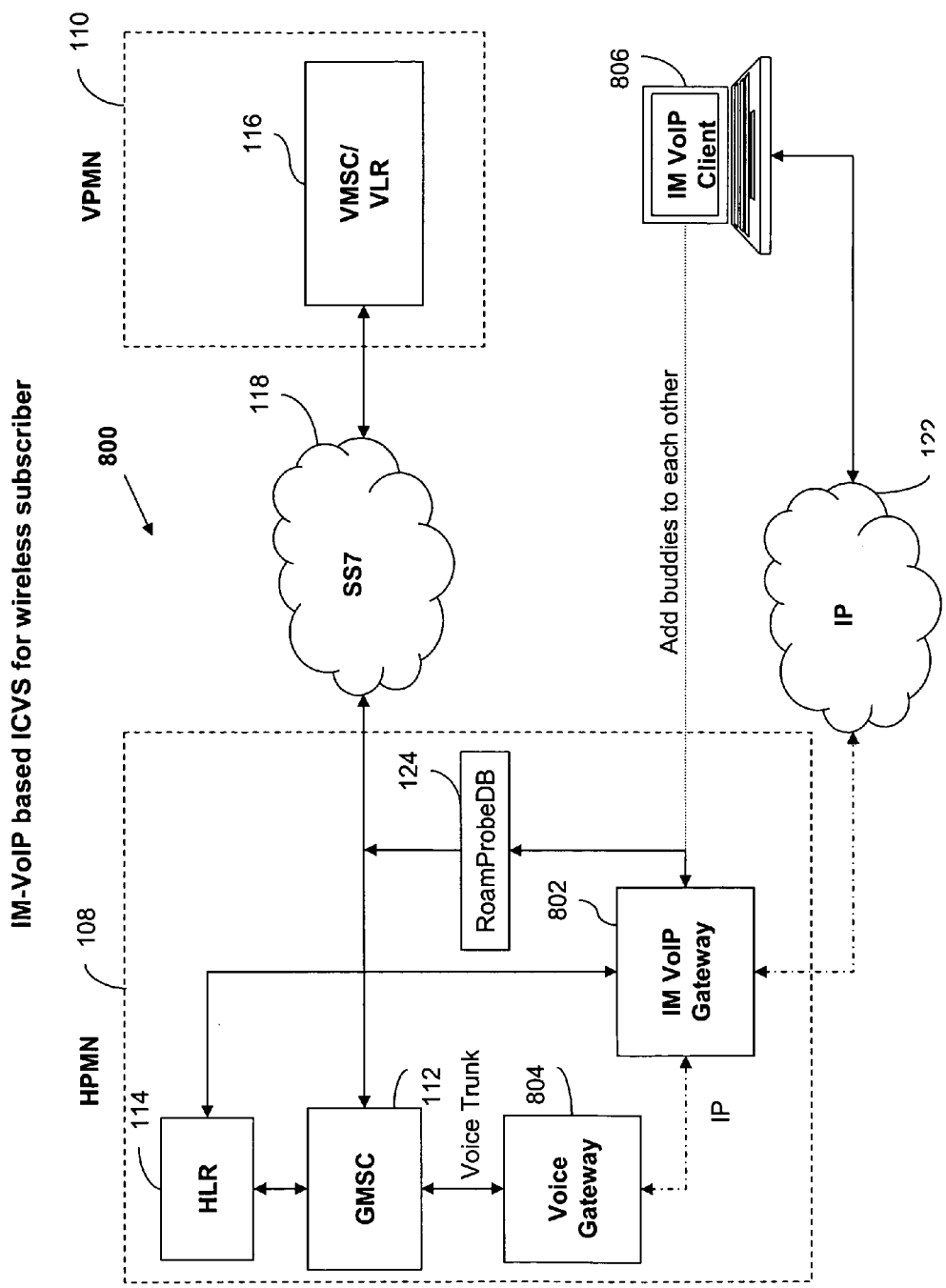
FIG. 8 represents a system for implementing the ICV system using an IM-VoIP like service, in accordance with an embodiment of the invention.

FIG. 8 represents a system for implementing an ICV system 800 using an IM-VoIP service, in accordance with an embodiment of the invention. This embodiment caters to wireless subscribers in first communication network 104. ICV system 800 is modified version of ICV system 200 to include an IM-VoIP gateway 802 instead of the Skype gateway to cater to any IM based VoIP service. Further, ICV system 800 includes a voice gateway 804 connected to GMSC 112 via a Voice trunk using ISUP protocol. The voice gateway 804 connects to IM-VoIP gateway 802 via an IP link. Moreover, HPMN 108 deploys IM-VoIP gateway 802, with RPD 124 monitoring the roaming SCCP links between HPMN 108 and VPMN 110. The RPD provides the roaming information to IM-VoIP gateway 802 by monitoring roaming messages at the roaming links of HPMN 108 to build up roaming profile of the roamers in the database. The subscriber may use a laptop, a PC or a smart device with an IM-VoIP client 806 connected to the IM-VoIP gateway 802 using IP protocol. The ICV system 800 is applicable for IM-VoIP clients, such as, but not limited to, MSN, Yahoo®, Google and the like, wherein, there is no call-in number facility. It's even useful for a subscriber of IM-VoIP clients such as Skype and Gizmon where there is a call-in number service but the subscriber has not signed up for it. In such a case, a temporary assigned number, preferably a local number depending on the local area where the subscriber is present, is used to route the call.

Figure 9:
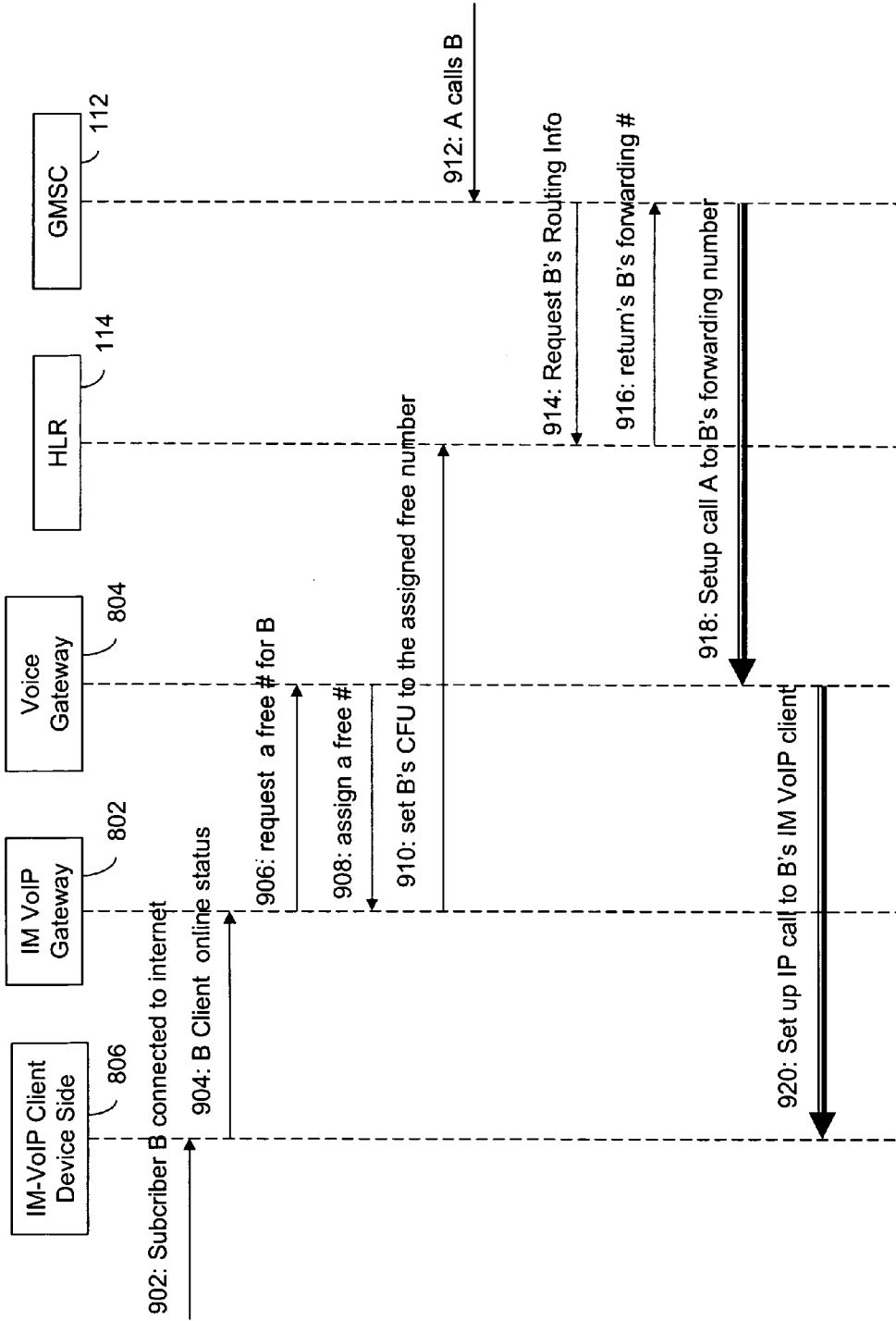
FIG. 9 represents a flow diagram of unconditional call forwarding implementation of the ICV system using the IM-VoIP like service, in accordance with an embodiment of the invention.

FIG. 9 represents a flow diagram of unconditional call forwarding implementation of ICV system 800 using the IM-VoIP service, in accordance with an embodiment of the invention. The unconditional call forwarding implies the routing of any mobile terminated (MT) call to an outbound roamer to its associated client over the IP network. At step 902, subscriber B connects to the Internet (or any other IP based network) using IM-VoIP client 806. At step 904, IM-VoIP client 806 informs his 'online' status to IM-VoIP gateway 802 present in HPMN 108 of subscriber B. At step 906, IM-VoIP gateway 802 requests a free local (temporary assigned) F for B from voice gateway 804, which maintains a pool of available local numbers. Thereafter, at step 908, voice gateway 804 assigns the free number F to B and records the assignment. At step 910, IM-VoIP Gateway 802 sets the unconditional call forwarding of subscriber B to the assigned number F by issuing messages such as MAP RegisterSS in GSM network to HLR 114. Further, at step 912, subscriber A calls subscriber B at his mobile number and the call reaches GMSC 112 of subscriber B's network. Thereafter, at step 914, GMSC 112 requests subscriber B's routing information from HLR 114 by sending a MAP SRI message (in a GSM implementation) to the HLR. In case of a CDMA network implementation, an IS 41 MAP Location Request message is used. Thereafter, at step 916, HLR 114 returns the assigned number F to GMSC 112. Further, at step 918, GMSC 112 initiates a call set up using subscriber A's number, subscriber B's called number and the assigned number F. Finally, at step 920, voice gateway 804 uses the recorded number assignment on subscriber B to route the call over IP to IM-VoIP client 806 of subscriber B. Hence, the IM-VoIP gateway 802 re-directs the call initially destined to mobile number of subscriber B, to the temporary assigned number F associated with IM-VoIP client 806.

Figure 10A:
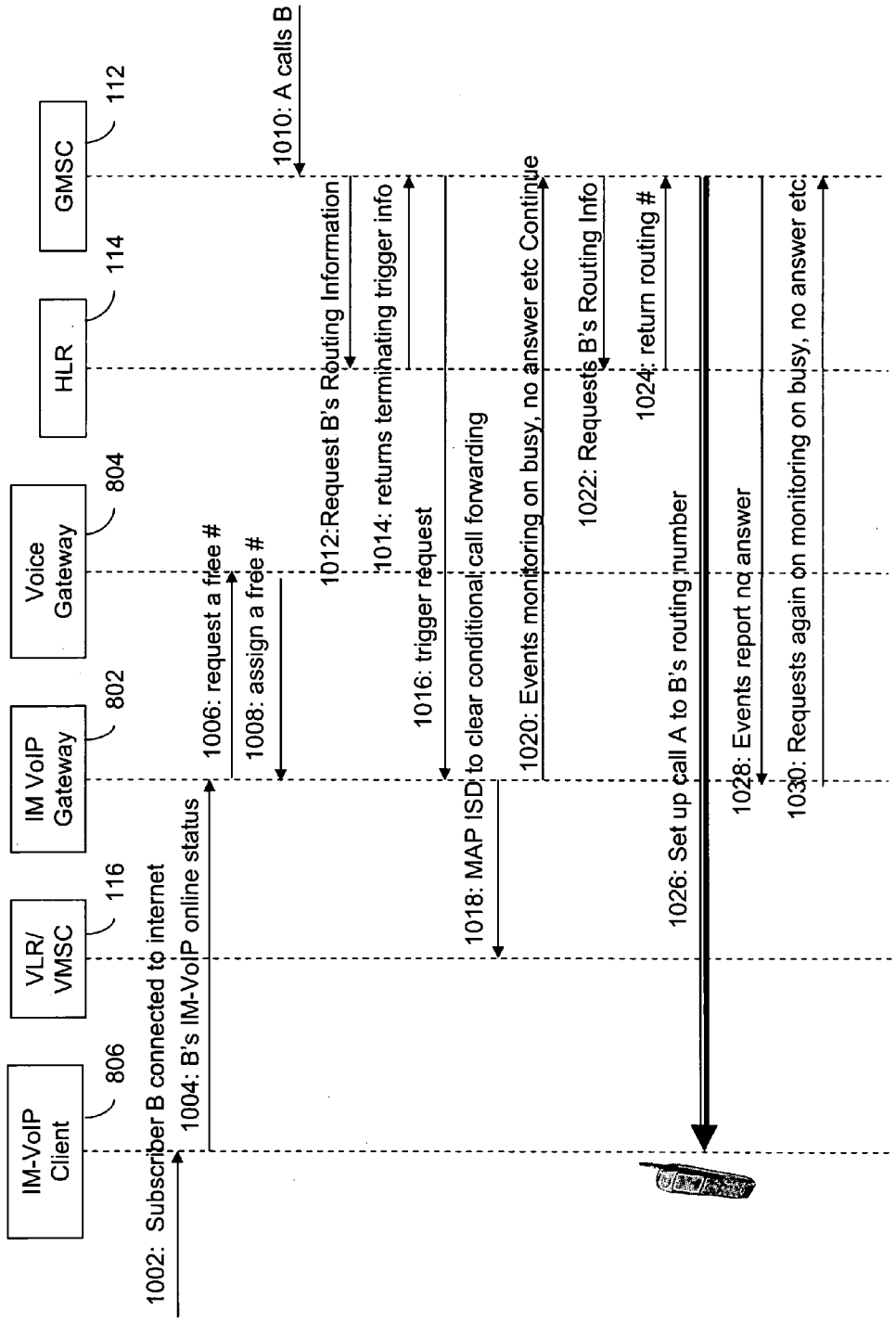
FIGS. 10A and 10B represent a flow diagram of conditional late call forwarding implementation of the ICV system using the IM-VoIP like service, in accordance with a first embodiment of the invention.
Figure 10B:
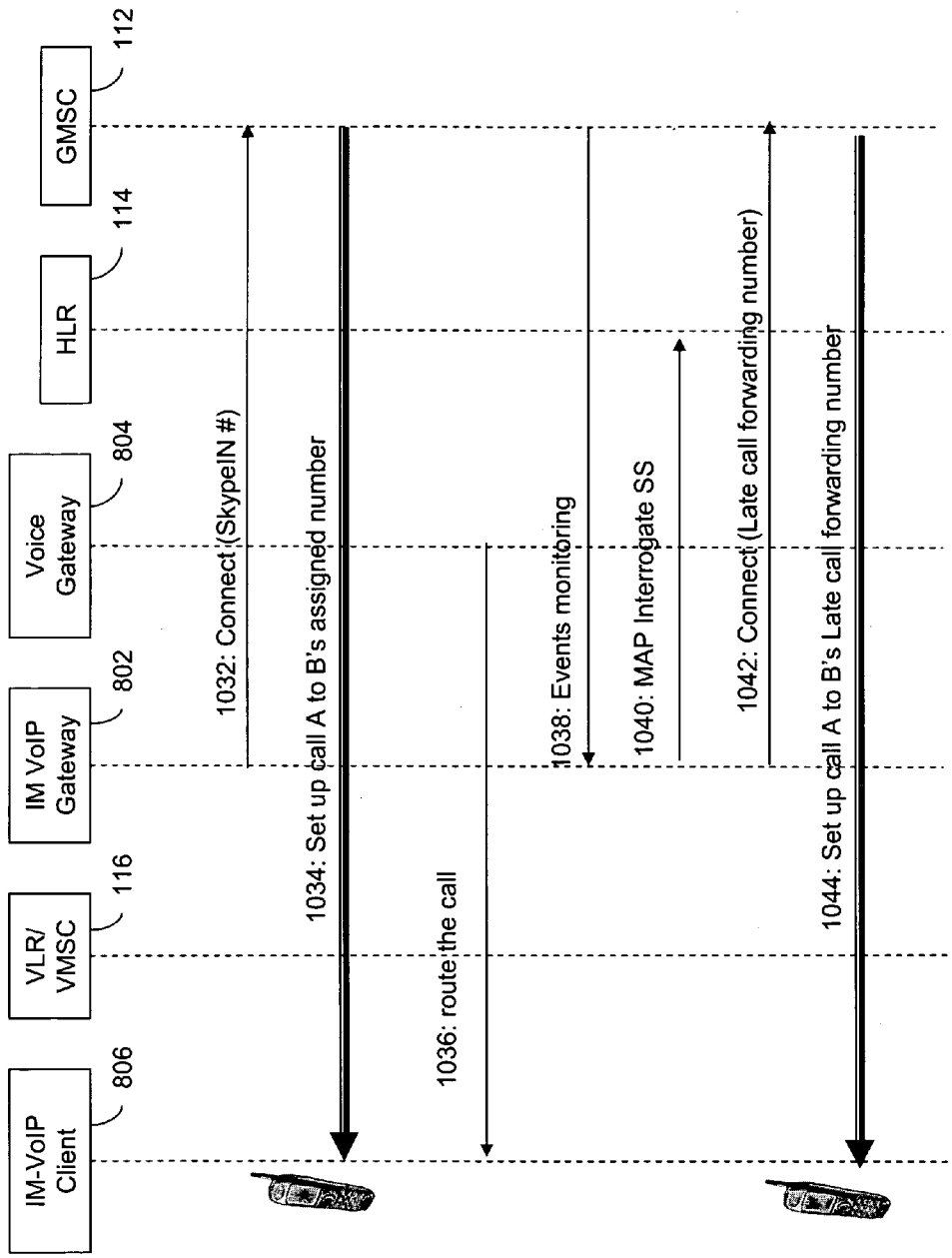

FIGS. 10A and 10B represent a flow diagram of conditional late call forwarding implementation of the ICV system 800 using the IM-VoIP service, in accordance with a first embodiment of the invention. This embodiment uses DP 12 terminating trigger to implement the conditional late call forwarding in ICV system 800. At step 1002, subscriber B connects to the Internet (or any other IP based network) using the IM-VoIP client 806. At step 1004, IM-VoIP client 806 informs its 'online' status to IM-VoIP gateway 802 present in HPMN 108 of subscriber B. At step 1006, IM-VoIP gateway 802 requests a free local (temporary assigned) F for B from voice gateway 804, which maintains a pool of available local numbers. Thereafter, at step 1008, voice gateway 804 assigns the free number F to B and records the assignment. In one embodiment of the invention, ICV system performs step 1006 and 1008 later in the call flow when conditional call forwarding takes place. Thereafter, at step 1010, subscriber A calls subscriber B at his mobile number and the call reaches GMSC 112 of subscriber B's network. At step 1012, GMSC 112 requests subscriber B's routing information from HLR 114 by sending a MAP SRI message (in a GSM implementation) to the HLR. In case of a CDMA network implementation, an IS 41 MAP Location Request message is used. Thereafter, at step 1014, HLR 114 returns the terminating trigger to GMSC 112. The terminating trigger may be a Camel T-CSI in GSM implantation or a WIN in CDMA implementation. The terminating trigger is also dependent on specific switch vendors such as Siemens, Nokia etc. GMSC 112 downloads the terminating trigger only when the subscriber B is roaming. At step 1016, GMSC 112 issues a trigger request such as, Initial DP in IN protocol, to the IM-VoIP gateway 802, which is equipped with support for IN protocols.

Thereafter, at step 1018, IM-VoIP gateway 802 issues a MAP ISD (IMSI-B) message to VLR/VMSC 116 of subscriber B. IM-VoIP gateway 802 receives the information of VLR/VMSC 116 either from Initial DP or from RPD 124. Skype gateway 202 sends the MAP ISD message to remove (set to empty) the conditional forwarding information from VLR/VMSC 116. Further, at step 1020, IM-VoIP gateway 802 requests the monitoring of call events such as NO-ANSWER, and BUSY from GMSC 112 and issues a CONTINUE message to GMSC 112. At step 1022, GMSC 112 again requests to HLR 114 for the routing information of subscriber B. At step 1024, HLR 114 returns the routing number (i.e. the routing identifier) such as, MSRN in GSM implementation and TLDN in CDMA implementation. GMSC 112 continues the call setup towards the routing number, at step 1026. In case, subscriber B does not respond to the call setup at his routing number, which is the mobile number in this case. Thereafter, at step 1028, GMSC 112 sends event report to IM-VoIP gateway 802. ICV system 800 may perform the steps 1006 and 1008 after step 1028 to avoid assign pre-assigning a temporary number until a conditional forwarding call on subscriber B's mobile number takes place. At step 1030, IM-VoIP gateway 802 again requests for monitoring of call events such as NO-ANSWER and BUSY from GMSC 112. Thereafter, at step 1032, IM-VoIP gateway 802 requests GMSC 112 to connect subscriber B's assigned number F by voice gateway 804. Hence, at step 1034, GMSC 112 initiates a call set up using subscriber A's number, subscriber B's called number and the assigned number F for B, towards the voice gateway 804. Thereafter, at step 1036, voice gateway 804 uses the stored record for subscriber B to route the call over IP to subscriber B's IM VoIP client 806. IM-VoIP client 806 can answer the call when ringing.

In case, IM VoIP client 806 did not respond to the call at the number F, at step 1038, GMSC 112 sends the event report to IM-VoIP gateway 802. In case, subscriber B sets IM VoIP client 806 with call forwarding such as a voicemail, the call goes to the forwarded number. At step 1040, IM-VoIP gateway 802 gets the conditional forwarding number of B from either RPD 124 or by issuing MAP Interrogate SS (or AnyTimeSubscriberProfile, restoreData or SendParameters) to HLR 114 on the late call forwarding number corresponding to the late forwarding condition received. At step 1042, IM-VoIP gateway 802 requests GMSC 112 to connect to the late call forwarding number of B. Thereafter, voice gateway 804 releases the temporary assigned F back to the free number pool. Hence, at step 1044, IM-VoIP gateway 802 re-directs the call initially destined to mobile number of subscriber B, to the late call forwarding number of subscriber B.

Figure 11A:
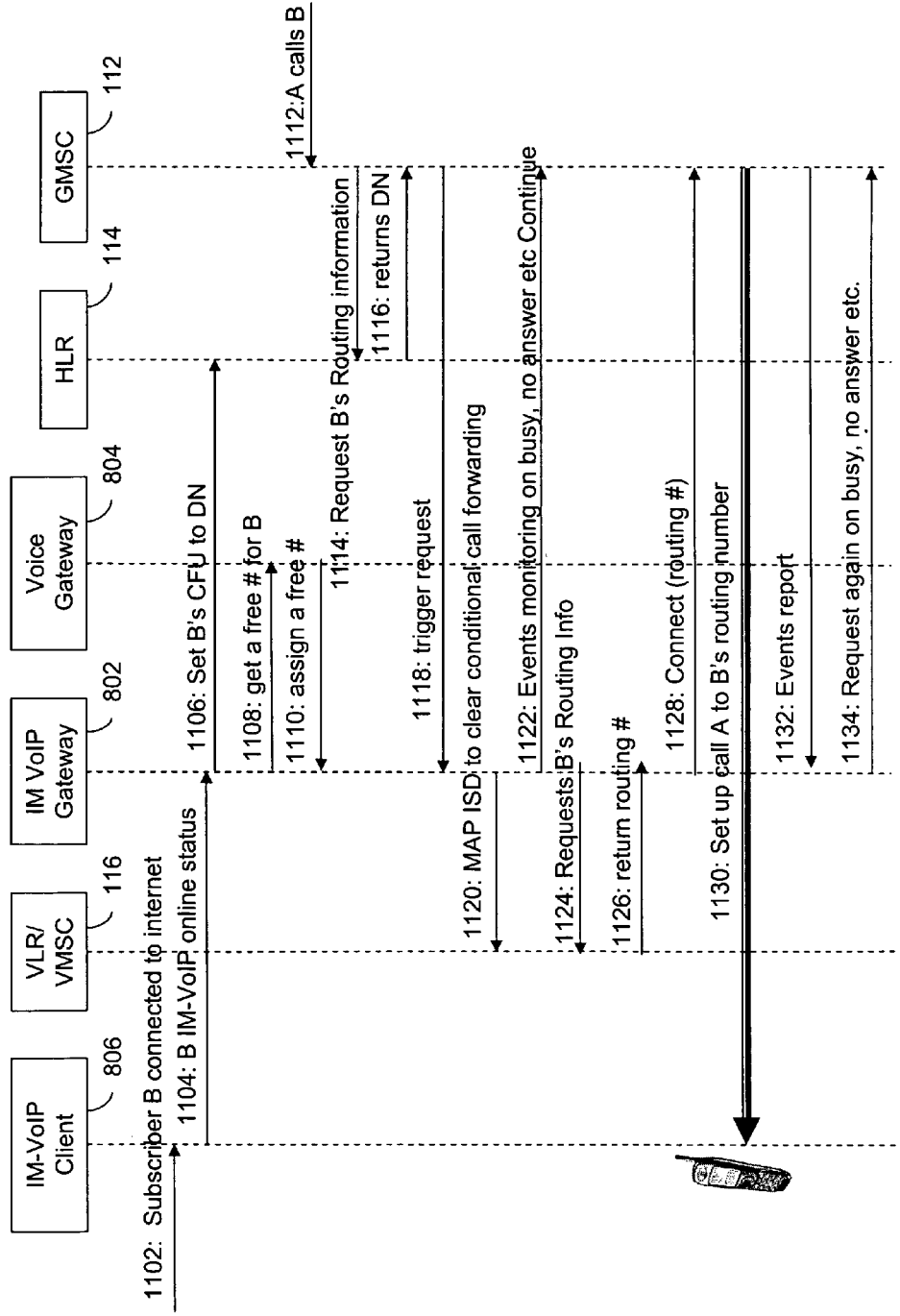
FIGS. 11A and 11B represent a flow diagram of conditional late call forwarding implementation of the ICV system using the IM-VoIP like service, in accordance with a second embodiment of the invention.
Figure 11B:
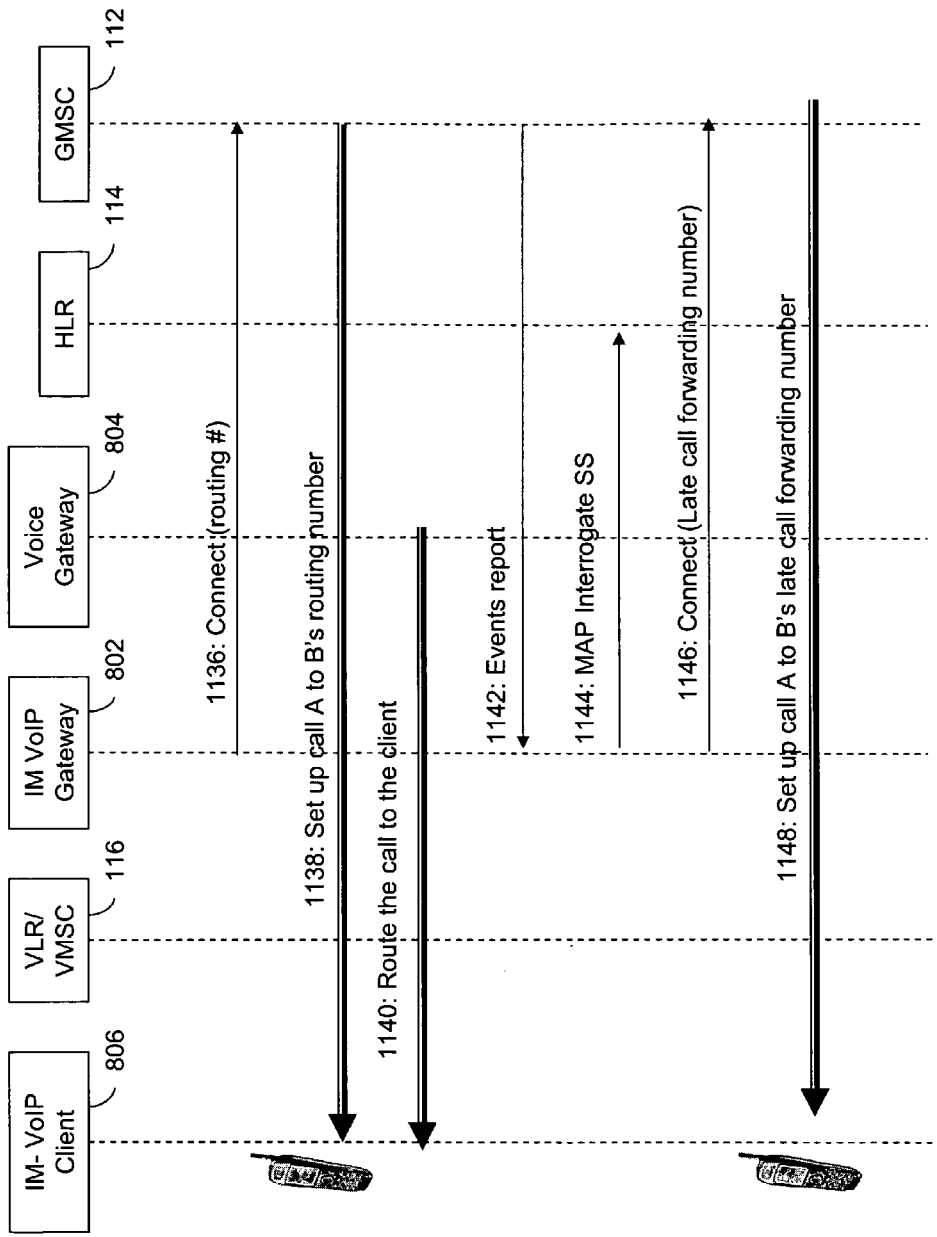

FIGS. 11A and 11B represent a flow diagram of conditional late call forwarding implementation of the ICV system 800 using the IM-VoIP service, in accordance with a second embodiment of the invention. This embodiment uses DP 2 or DP 3 trigger to implement the conditional late call forwarding. At step 1102, subscriber B connects to the Internet (or any other IP based network) using IM-VoIP client 806. At step 1104, IM-VoIP client 806 informs his 'online' status to IM-VoIP gateway 802 present in HPMN 108 of subscriber B. At step 1106, IM-VoIP gateway 802 sets the CFU to a Dummy Number (DN) via MAP RegisterSS at subscriber B's HLR entry. IM-VoIP gateway 802 may request for temporary assigned free number F from voice gateway 804, at step 1108. At step 1110, IM-VoIP gateway 802 assigns the number F from a pool of free numbers and records the assignment. At step 1112, subscriber A calls subscriber B at his mobile number and the call reaches GMSC 112 of subscriber B's network. At step 1114, GMSC 112 requests subscriber B's routing information from HLR 114 by sending a MAP SRI message (in a GSM implementation) to the HLR. Thereafter, at step 1116, HLR 114 returns the DN to GMSC 112. Further, at step 1118, GMSC 112 issues the DP2 or DP3 network trigger request on the DN (e.g. InitialDP in IN protocol) to IM-VoIP Gateway 802, which is equipped with support for IN protocols. In this case, the IDP parameters should contain the original called number of B. At step 1120, IM-VoIP gateway 802 issues a MAP ISD (IMSI-B) to VLR/VMSC 116 of subscriber B to remove the conditional call forwarding. Further, at step 1122, IM-VoIP gateway 802 requests the monitoring of call events such as NO-ANSWER, and BUSY from GMSC 112. Thereafter, at step 1124, IM-VoIP gateway 802 issues a MAP PRN (IMSI-B) message to VLR/VMSC 116 with the information received from RPD 124. At step 1126, VLR/VMSC 116 returns the routing number (MSRN) to IM-VoIP gateway 802. Upon receiving the routing number, IM-VoIP gateway 802, at step 1128, issues an IN protocol message CONNECT (A, MSRN) to GMSC 112. At step 1130, GMSC 112 continues the call setup towards the routing number. In case, the subscriber B (i.e. the mobile) did not respond to the call at the routing number, at step 1132, GMSC 112 sends the event report to IM-VoIP gateway 802. In one embodiment of the invention, ICV system 800 performs the steps 1108 and 1110 here to avoid pre-assigning of the number F until a conditional call forward on mobile number of subscriber B takes place.

Thereafter, at step 1134, IM-VoIP gateway 802 again requests for monitoring of call events such as NO-ANSWER and BUSY from GMSC 112. Thereafter, at step 1136, IM-VoIP gateway 802 requests GMSC 112 to connect subscriber B's temporary number F to IM-VoIP gateway 802. Hence, at step 1138, GMSC 112 initiates a call set up using subscriber A's number, subscriber B's called number (as the originally called number) and number F for subscriber B. At step 1140, voice gateway 804 uses the stored record (number F) on B to route the call over IP to subscriber B's IM VoIP client 806. The IM-VoIP client can answer the call when ringing.

In case, IM-VoIP client 806 does not respond to the call at the number F, at step 1142, GMSC 112 sends the event report to IM-VoIP gateway 802. In case, the subscriber B sets the IM-VoIP client 806 with call forwarding such as a voicemail, the call goes to the forwarded number. At step 1144, IM-VoIP gateway 802 gets the conditional forwarding number of subscriber B from either RPD 124 or by issuing MAP Interrogate SS (or AnyTimeSubscriberProfile, restoreData or SendParameters) to HLR 114 on the late call forwarding number corresponding to the late forwarding condition received. At step 1146, IM-VoIP gateway 802 requests GMSC 112 to connect to the late call forwarding number of subscriber B. Finally, voice gateway 804 releases the assigned number F back to free pool of number. Hence, at step 1148, IM-VoIP gateway 802 re-directs the call initially destined to mobile number of subscriber B, to the late call forwarding number of subscriber B.

Figure 12:
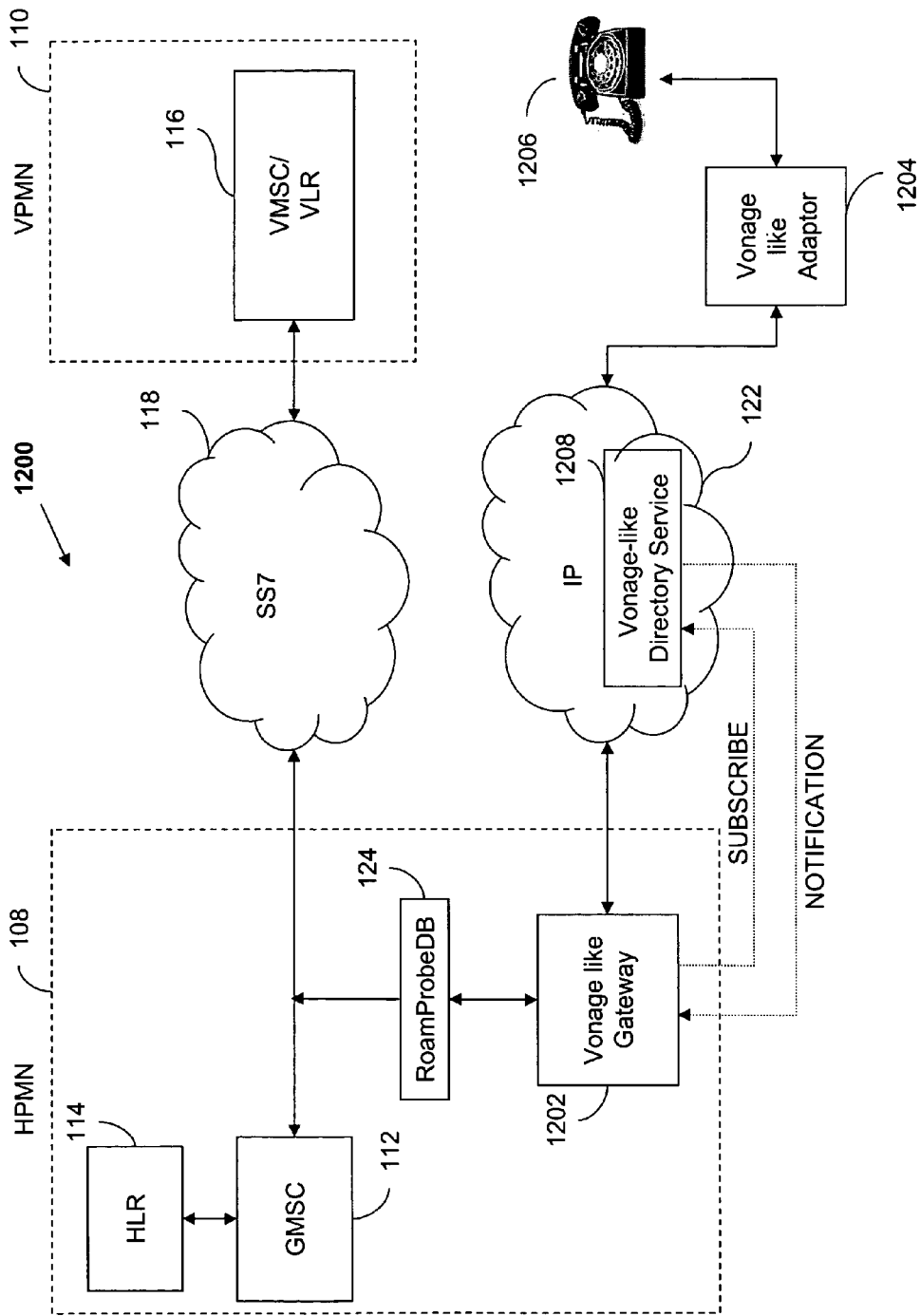
FIG. 12 represents a system for implementing the ICV system using a Vonage like service, in accordance with an embodiment of the invention.

Another embodiment of the invention provides the re-routing service to subscribers using Vonage like service. FIG. 12 represents a system for implementing an ICV system 1200 using the Vonage like service. This embodiment caters to wireless subscribers in first communication network 104. ICV system 1200 is a modified version of ICV system 800 to include a Vonage like gateway 1202 instead of IM-VoIP gateway 802 to cater to any Vonage based VoIP service. Further, ICV system 1200 includes subscriber's Vonage-like Client device 1204 (phone adaptor) that has an IP interface and a phone interface to a phone 1206. Each time the phone adaptor connects to an IP network, it reports the IP address and phone number to a Vonage-like Directory Service 1208. Vonage-like Gateway 1202 subscribes to Directory Service 1208 for any information pertaining to subscriber of the network deploying ICV system 1200. Whenever such a subscriber's Vonage-like Client device 1204 registers with Directory Service 1208, Directory Service 1208 notifies Vonage-like Gateway 1202. Further, there is RPD 124 for monitoring the roaming links to capture information about roamers (subscribers) in a database. The architecture caters to VoIP clients like Vonage, SunRocket where there is a call-in number service and an IP phone adaptor. There is no IM or presence component. However, there is still a registration of IP address with the phone number on a directory service.

Figure 13:
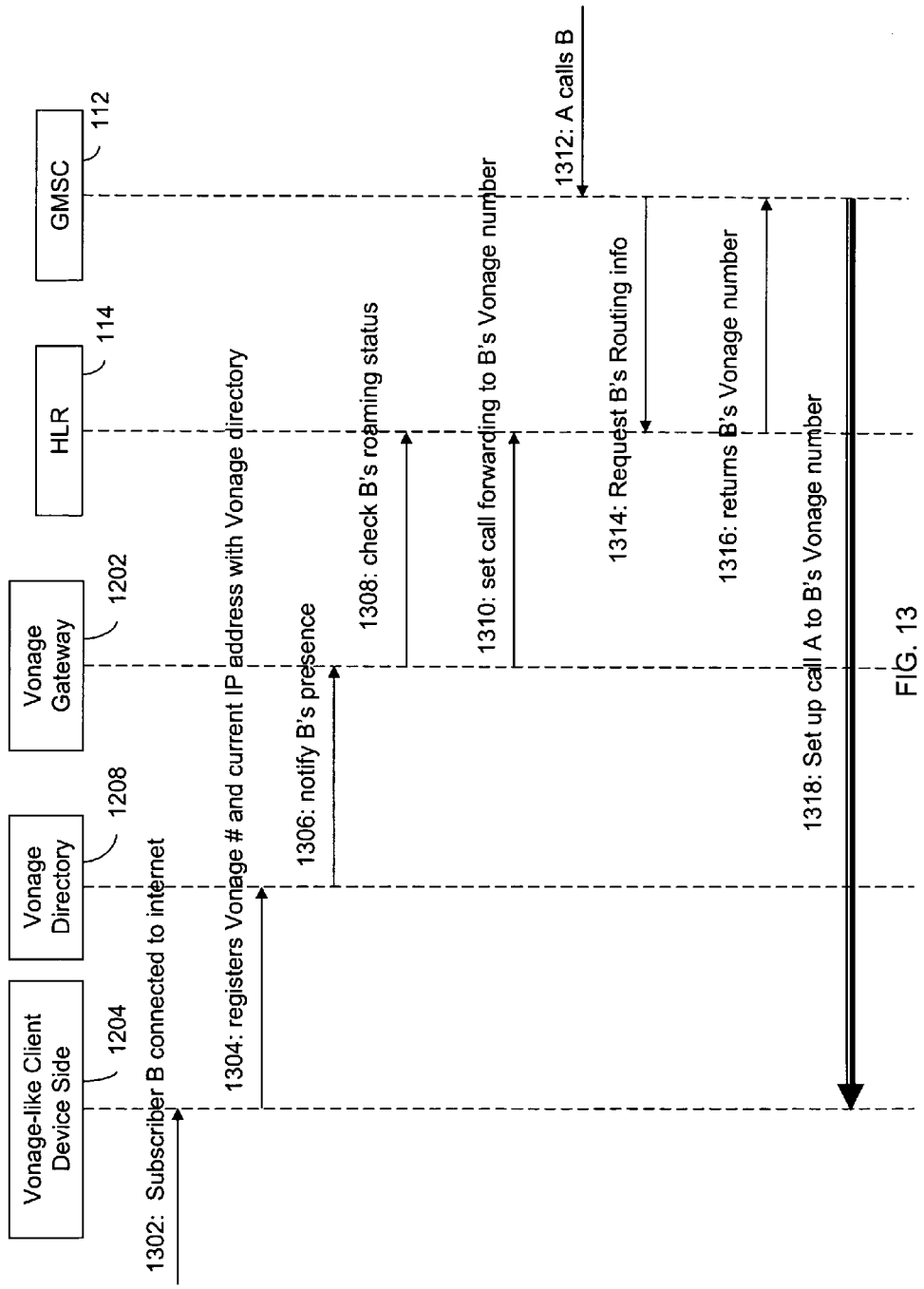
FIG. 13 represents a flow diagram of unconditional call forwarding implementation of the ICV system using the Vonage like service, in accordance with an embodiment of the invention.

FIG. 13 represents a flow diagram of unconditional call forwarding implementation of the ICV system 1200 using the Vonage like service, in accordance with an embodiment of the invention. The unconditional call forwarding implies the routing of any mobile terminated (MT) call to an outbound roamer to its associated Vonage like client over the IP network. At step 1302, subscriber B connects to the Internet (or any other IP based network) using Vonage-like client 1204. At step 1304, Vonage-like VoIP client 1204 registers with Vonage-like Directory Service 1208. Thereafter, at step 1306, Directory Service 1208 notifies Vonage-like Gateway 1202 at HPMN 108. Further, at step 1308, Vonage-like Gateway 1202 may optionally check if subscriber B is roaming or not by issuing messages such as, but not limited to, MAP SRI-SM in GSM network or IS-41 MAP SMS-REQUEST in CDMA network to get the VLR/VMSC 116 address. If subscriber B is roaming, then, at step 1310, Vonage-like Gateway 1202 sets the unconditional call forwarding of subscriber B to the Vonage number by issuing, messages such as, but not limited to, MAP RegisterSS in GSM network in HLR 114. Further, at step 1312, subscriber A calls subscriber B at his mobile number and call reaches GMSC 112 of subscriber B's network. At step 1314, GMSC 112 requests routing information by issuing, messages such as, but not limited to, MAP SRI in GSM network or IS 41 MAP LocationRequest in CDMA from HLR 114. Then at step 1316, HLR 114 returns Vonage-like number of subscriber B. Further at step 1318, GMSC 112 continues the call set up using subscriber A's number, subscriber B's called number (as originally called number) and the Vonage-like number of subscriber B.

Figure 14A:
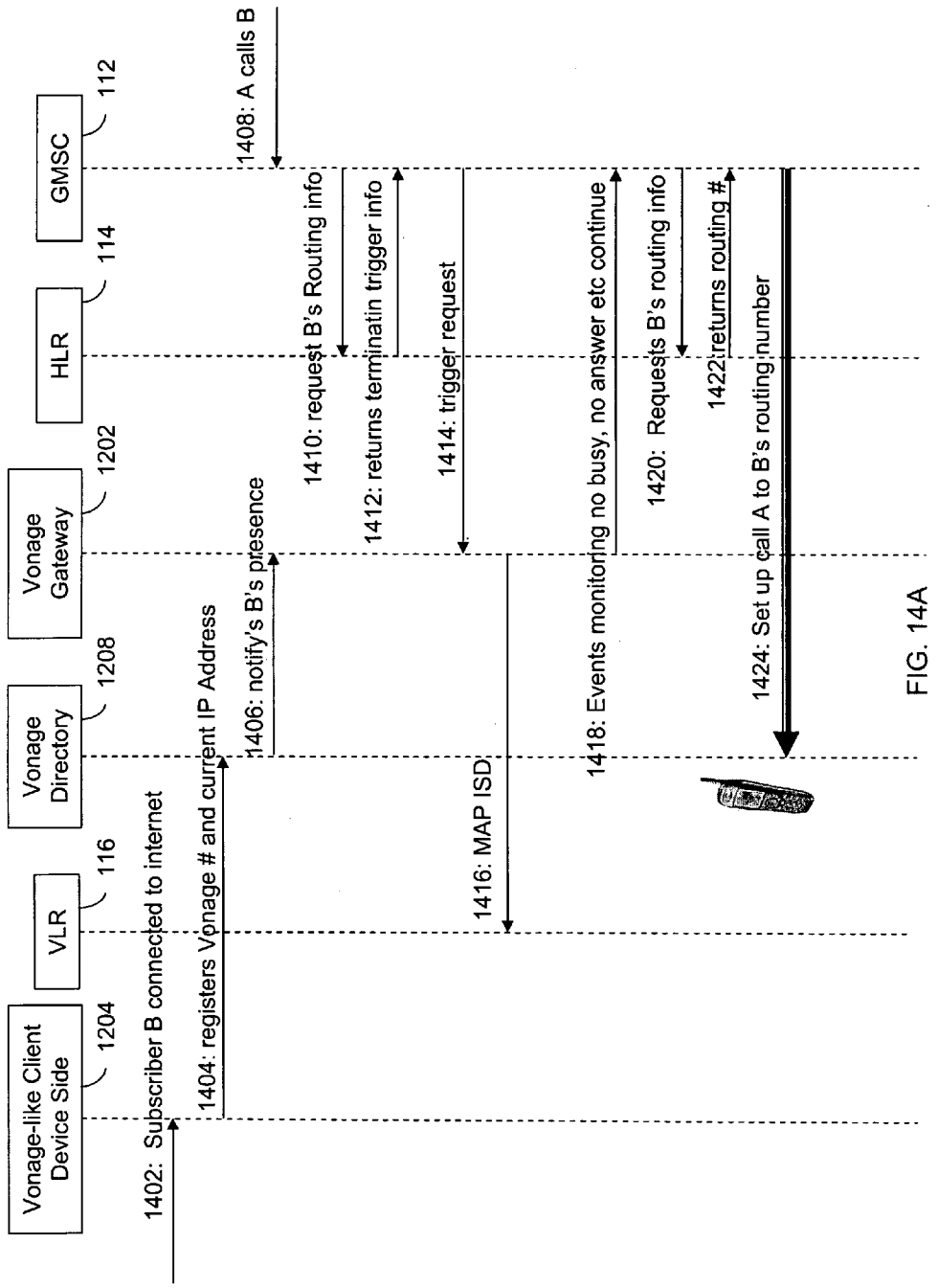
FIGS. 14A and 14B represent a flow diagram of conditional late call forwarding implementation of the ICV system using the Vonage like service, in accordance with a first embodiment of the invention.
Figure 14B:
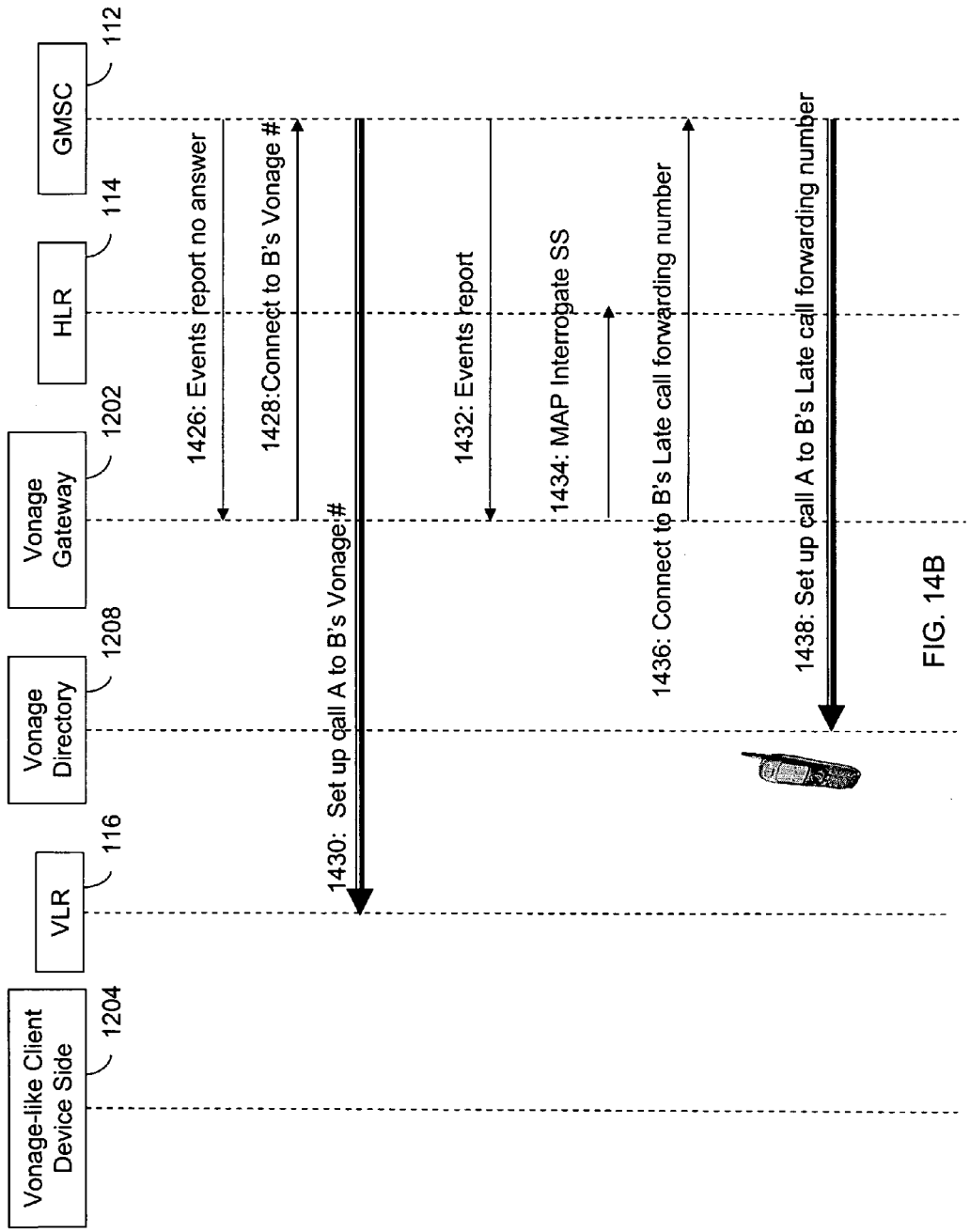

FIGS. 14A and 14B represent a flow diagram of conditional late call forwarding implementation of the ICV system 1200 using the Vonage like service, in accordance with a first embodiment of the invention. This embodiment uses DP 12 terminating trigger to implement the conditional late call forwarding in ICV system 1200. At step 1402, subscriber B's Vonage-like client device is connected to the IP network. Further, at step 1404, Vonage-like client 1204 registers his presence with Vonage-like Directory Service 1208. Directory service 1208 notifies subscriber B's presence information to Vonage-like Gateway 1202, at step 1406. Thereafter, at step 1408, subscriber A calls subscriber B's mobile number and the call reaches GMSC 112. GMSC 112 requests routing information by issuing a MAP SRI message to HLR 114, at step 1410. Thereafter, at step 1412, HLR 114 returns terminating trigger such as a Camel T-CSI message in GSM or WIN in CDMA to GMSC 112. GMSC 112 downloads the terminating trigger only when subscriber B is roaming. Henceforth, at step 1414, GMSC 112 issues trigger request to Vonage-like Gateway 1202, which is equipped with support for IN protocols. Then at step 1416, Vonage-like Gateway 1202 issues MAP ISD to VLR/VMSC 116 obtained from the InitialDP or RPD 124 to remove the conditional forwarding information from VLR/VMSC 116.

Thereafter at step 1418, Vonage-like Gateway 1202 requests the monitoring of call events such as NO-ANSWER, and BUSY from GMSC and issues CONTINUE message. The GMSC 112 requests routing information from HLR 114 again on subscriber B, at step 1420. At step 1422, HLR 114 returns the routing number (MSRN) to GMSC 112. GMSC 112 continues the call set up towards the routing number, at step 1424. There may be a case, when subscriber B (i.e. the mobile) does not answer the call on its MSRN. Hence, at step 1426, GMSC 112 sends event report to Vonage-like Gateway 1202. Vonage-like Gateway 1202 again requests the monitoring of call events such as NO-ANSWER, and BUSY from GMSC 112. Vonage-like Gateway 112, at step 1428, requests via IN-CONNECT GMSC 112 to connect to the subscriber B's Vonage number. At step 1430, GMSC 112 continues the call set up using subscriber A's number, subscriber B's called number (as originally called number) and the Vonage-like number of subscriber B. Again, in case, subscriber B's Vonage-like client 1204 did not answer the call, at step 1432, GMSC 112 sends event report to Vonage-like Gateway 1202. In cases when Vonage-like Client 1204 itself is set with call forwarding on a voicemail, the call goes to the forwarding number. Thereafter, at step 1434, Vonage-like Gateway 1202 gets conditional call forwarding number from RPD 124 or by issues a MAP Interrogate SS (or AnyTimeSubscriberProfile, restoreData or SendParameters etc) to HLR 114 of subscriber B on the late call forwarding number corresponding to the late forwarding condition received. Further, at step 1436, Vonage-like Gateway 1202 then requests GMSC 112 via IN-CONNECT message to connect to the subscriber B's late call forwarding number. Finally at step 1438, the GMSC initiates the call setup to the subscriber B's late call forwarding number.

Figure 15A:
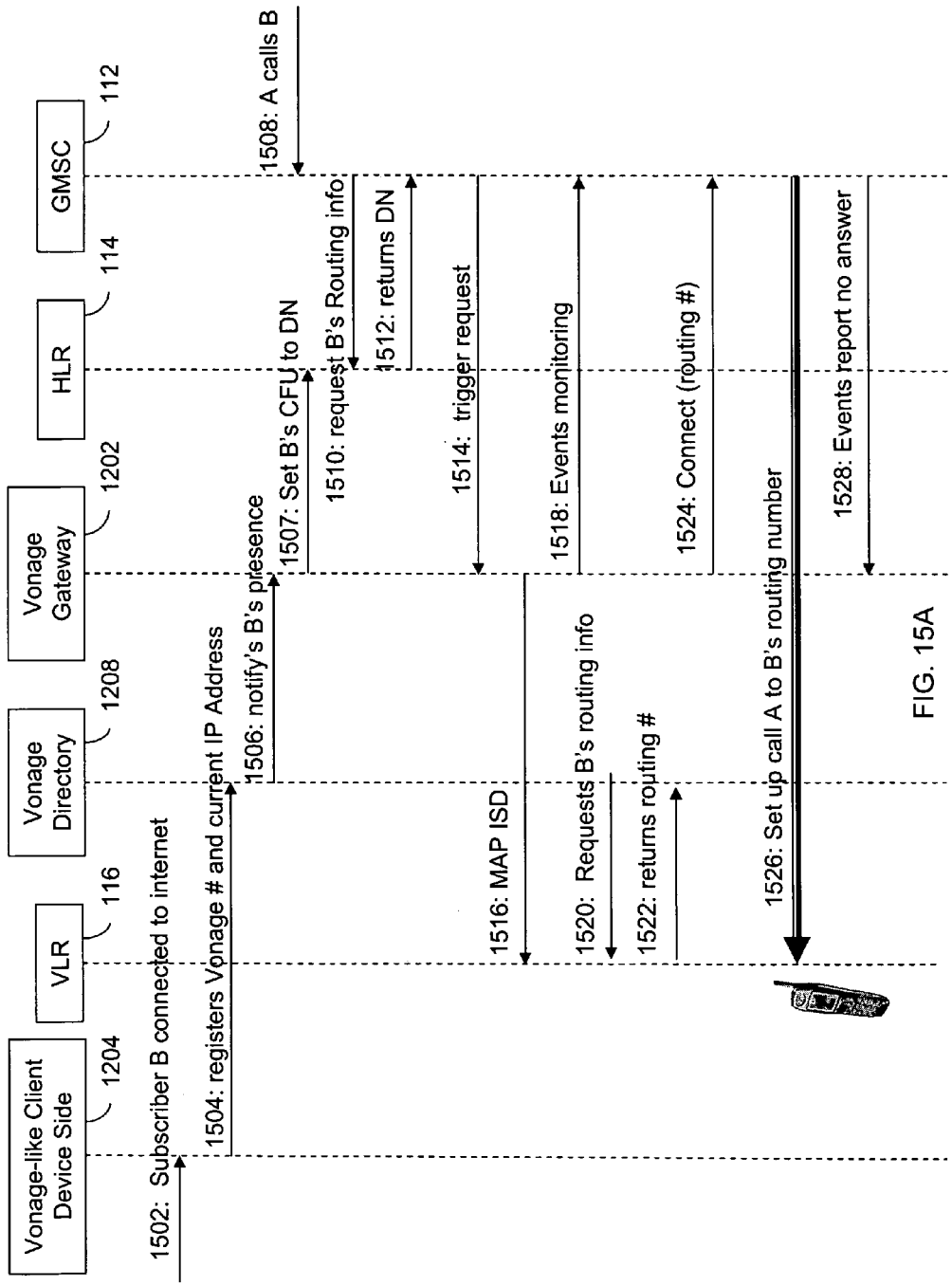
FIGS. 15A and 15B represent a flow diagram of conditional late call forwarding implementation of the ICV system using the Vonage like service, in accordance with a second embodiment of the invention.
Figure 15B:
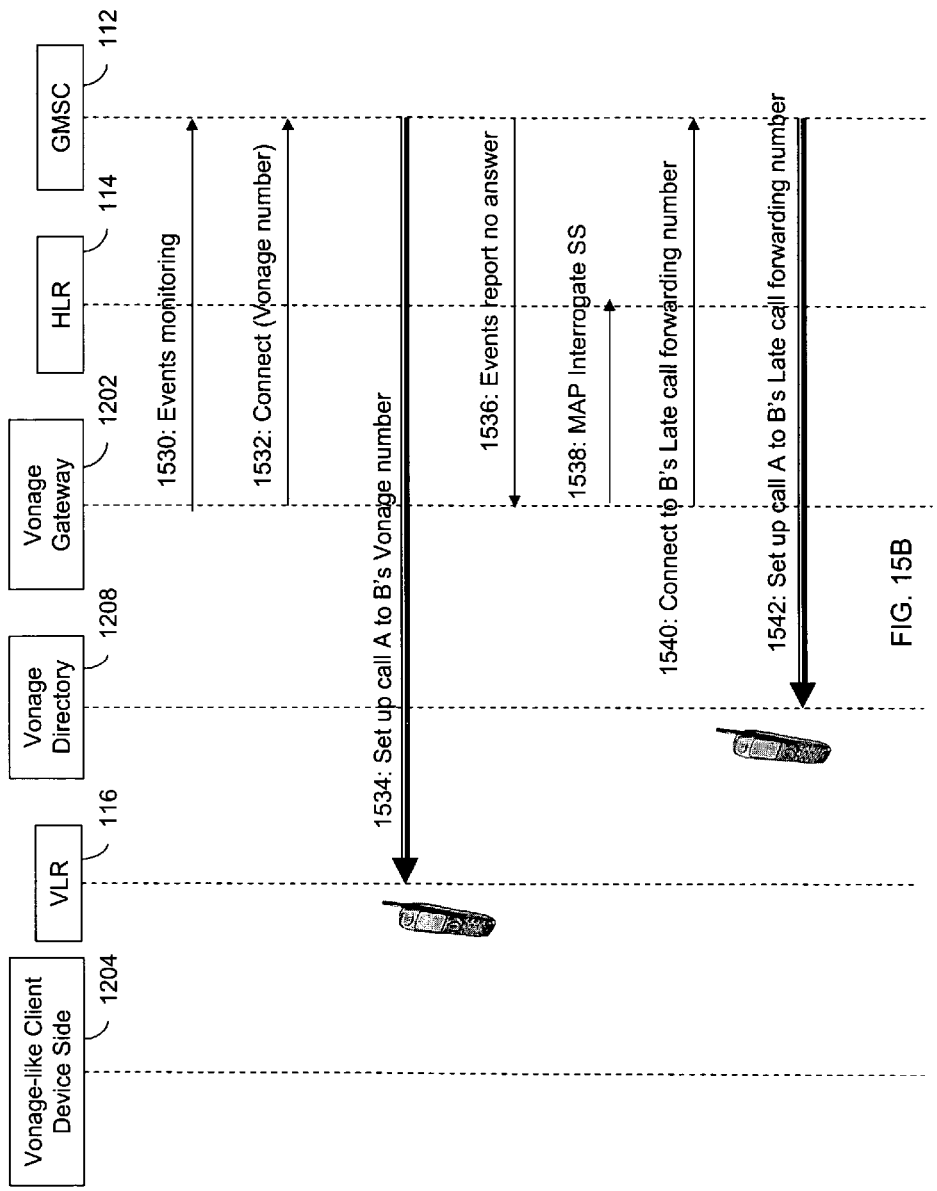

FIGS. 15A and 15B represent a flow diagram of conditional late call forwarding implementation of ICV system 1200 using the Vonage like service, in accordance with a second embodiment of the invention. This embodiment uses DP 2 or DP 3 trigger to implement the conditional late call forwarding. At step 1502, subscriber B connects to the Internet (or any other IP based network) using Vonage-like client 1204. At step 1504, Vonage-like client 1204 registers his presence with Vonage-like Directory Service 1208. The subscriber registers its presence using the Vonage number and current IP address associated with the Vonage number. Further, Directory Service 1208 notifies subscriber B's presence information to Vonage-like Gateway 1202 at step 1506. Again, the check for roaming status and unconditional call forwarding status maybe omitted at this point of call flow. Further, at step 1507, Vonage-like Gateway uses MAP RegisterSS to set the unconditional call forwarding to the DN. Thereafter, at step 1508, subscriber A calls subscriber B's mobile number and the call reaches GMSC 112 of subscriber B's network. At step 1510, GMSC 112 requests routing information by issuing MAP SRI to HLR 114. HLR 114 returns the DN at step 1512. Thereafter at step 1514, GMSC 112 issues trigger request on the DN to the Vonage-like Gateway 1202, which is equipped with support of IN protocols. At step 1516, Vonage-like Gateway 1202 issues MAP ISD (IMSI-B) message to VLR/VMSC 116 to remove the conditional forwarding information from VLR/VMSC 116. Vonage-like Gateway 1202 at step 1518, requests the monitoring of call events such as NO-ANSWER, and BUSY from GMSC 112. At step 1520, Vonage-like Gateway 1202 issues MAP PRN (IMSI-B) message to VLR 116. VLR 116 returns the routing number (MSRN) at step 1522. Vonage-like Gateway 1202 issues a CONNECT (routing-number) to GMSC 112 at step 1524. Thereafter, at step 1526, GMSC 112 continues the call set up towards the routing number. In case subscriber B does not answer the call on his routing number, then at step 1528, GMSC 112 sends event report to Vonage-like Gateway 1202. At step 1530, Vonage-like Gateway 1202 again requests the monitoring of call events such as NO-ANSWER, and BUSY from GMSC 112. At step 1532, Vonage-like Gateway 1202 then requests GMSC 112 via an IN-CONNECT message to connect to subscriber B's Vonage number. Thereafter, at step 1534, GMSC 112 continues the call set up using subscriber A's number, subscriber B's called number (as originally called number) the Vonage-like number of subscriber B. Further, when subscriber B's Vonage-like client 1204 does not answer the call, then at step 1536, GMSC 112 sends event report to Vonage-like Gateway 1202. In case, call forwarding at voicemail is present in the Vonage-like Client 1204, the forwarding number receives the call. At step 1538, Vonage-like Gateway 1202 gets conditional call forwarding number from RPD 124 or by issues MAP Interrogate SS (or AnyTimeSubscriberProfile, restoreData or SendParameters etc) to HLR 114 of subscriber B on the late call forwarding number corresponding to the late forwarding condition received. Henceforth, at step 1540, Vonage-like Gateway 1202 then request GMSC 112 via IN-CONNECT message to connect to the subscriber B's late call forwarding number. Finally, at step 1542, GMSC 112 initiates a call setup to subscriber B's late call forwarding number.

Figure 16:
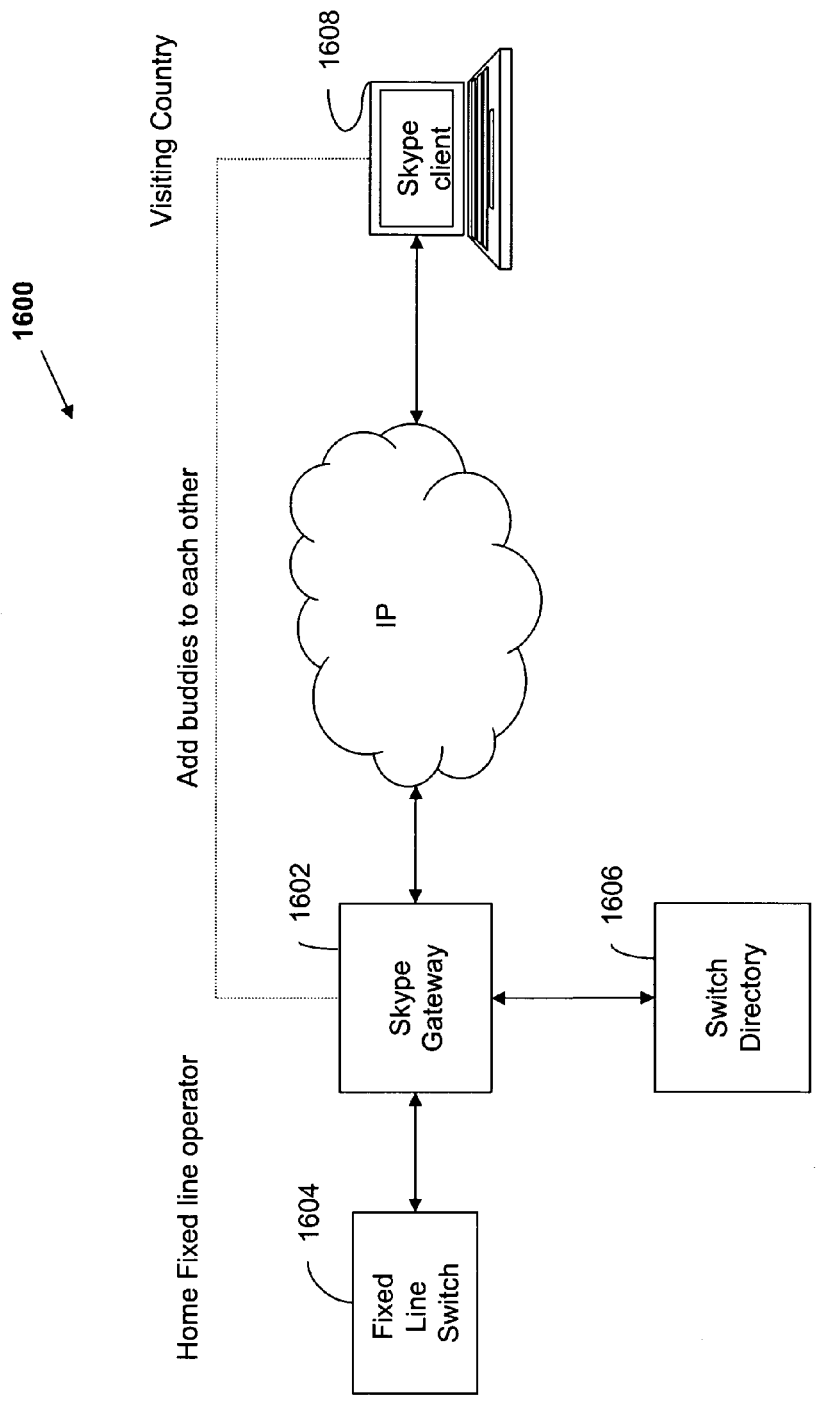
FIG. 16 represents a system for implementing the ICV system using a Skype-IN like service for a fixed line subscriber, in accordance with an embodiment of the invention.

In each of the above embodiments, subscriber B (i.e. subscriber 102) is associated with a wireless operator. It is also desirable to have an ICV system for providing services to subscriber B when he is associated with the wireline (fixed line) operators. Further, it is also desirable to provide ICV systems that cater to various types of VoIP clients such as Skype™, IM-VoIP like, and Vonage. FIG. 16 represents an ICV system 1600 using the Skype-IN like service for a fixed line subscriber B, in accordance with an embodiment of the invention. The ICV system 1600 includes a Skype gateway 1602, a fixed line switch 1604 and a switch directory 1606 in HPMN 108 of the fixed line subscriber B. The subscriber's Skype client 1608 may be associated with a device such as, but note limited to, a laptop, a PC or a smart device that has an IP interface. Skype client 1608 of the subscriber connects to Skype gateway 1602 via an IP network. ICV system 1600 does not require a Roamer Probe Database (RPD) because the objective for this system is to connect to the subscriber when he is online on his VoIP client and unavailable at the fixed line. Further, in this embodiment, subscriber B registers for the call-in number service for its VoIP client.

Figure 17:
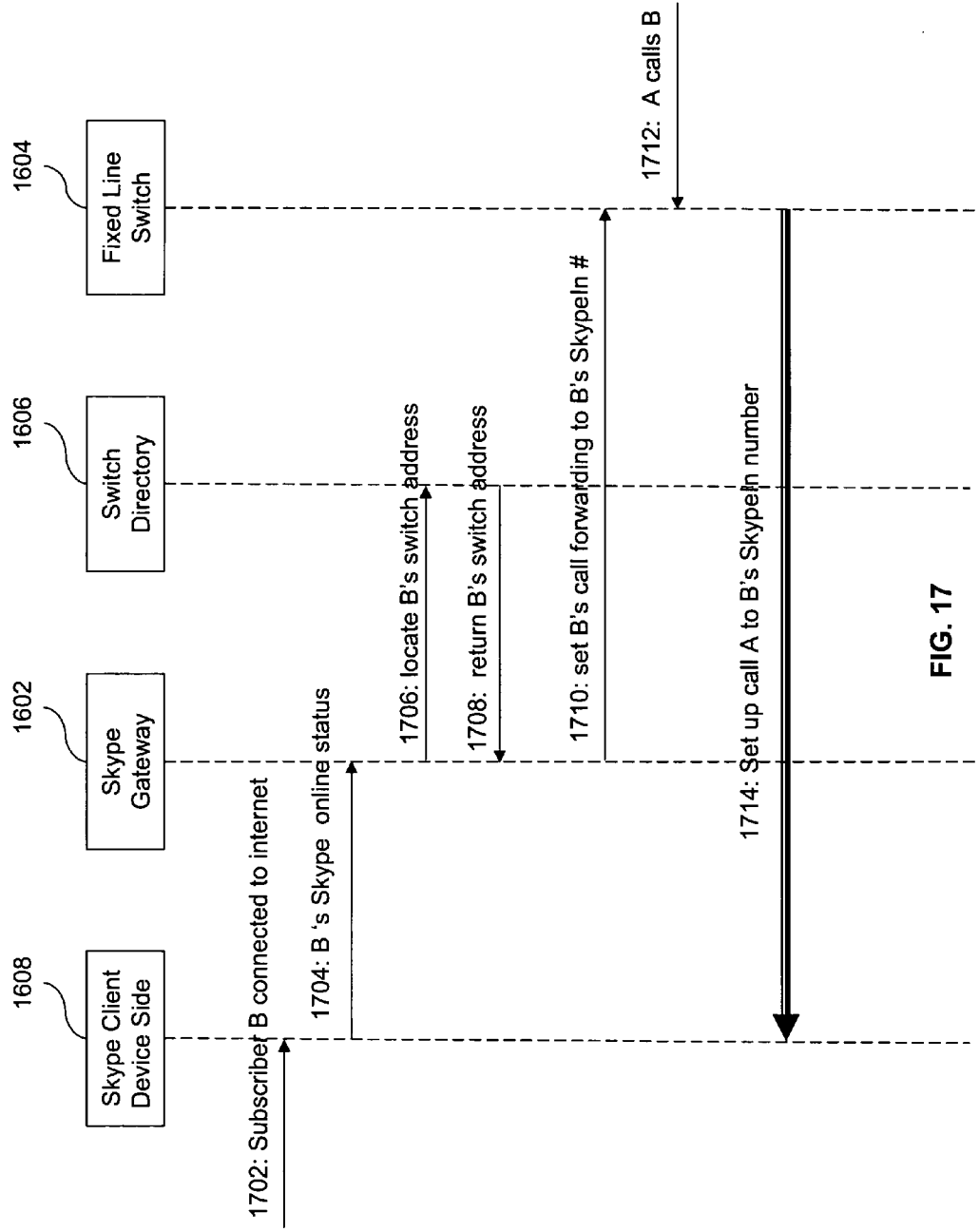
FIG. 17 represents a flow diagram representing unconditional call forwarding implementation of the ICV system using the Skype-IN like service for the fixed line subscriber, in accordance with an embodiment of the invention.

FIG. 17 represents a flow diagram of unconditional call forwarding implementation of ICV system 1600 using the Skype-IN service for the fixed line subscriber, in accordance with an embodiment of the invention. The unconditional call forwarding implies that any call that terminates at the fixed line number of subscriber B, is routed to its associated client over the IP network. At step 1702, subscriber B's Skype client 1608 connects to the IP network (i.e. the second communication network). At step 1704, Skype client 1608 informs his 'online' status to Skype Gateway 1602 in HPMN 108 of the fixed line subscriber B. Thereafter, at step 1706, Skype Gateway 1602 requests Switch Directory 1606 for an address of fixed line switch 1604 corresponding to subscriber B. At step 1708, Switch Directory 1606 returns the address of fixed line switch 1604 of subscriber B. Henceforth, at step 1710, Skype Gateway 1602 sets the unconditional call forwarding of subscriber B at fixed line switch 1604 to the Skype-IN number at fixed line switch 1604 of B. In such a case, ICV system 1600 may use a possibly proprietary fixed line switch interface. Further, at step 1712, subscriber A calls subscriber B and the call reaches fixed line switch 1604. Fixed line switch 1604, at step 1714, continues the call set up using subscriber A's number, subscriber B's called number (as originally called number) and the Skype-IN number of subscriber B.

Figure 18:
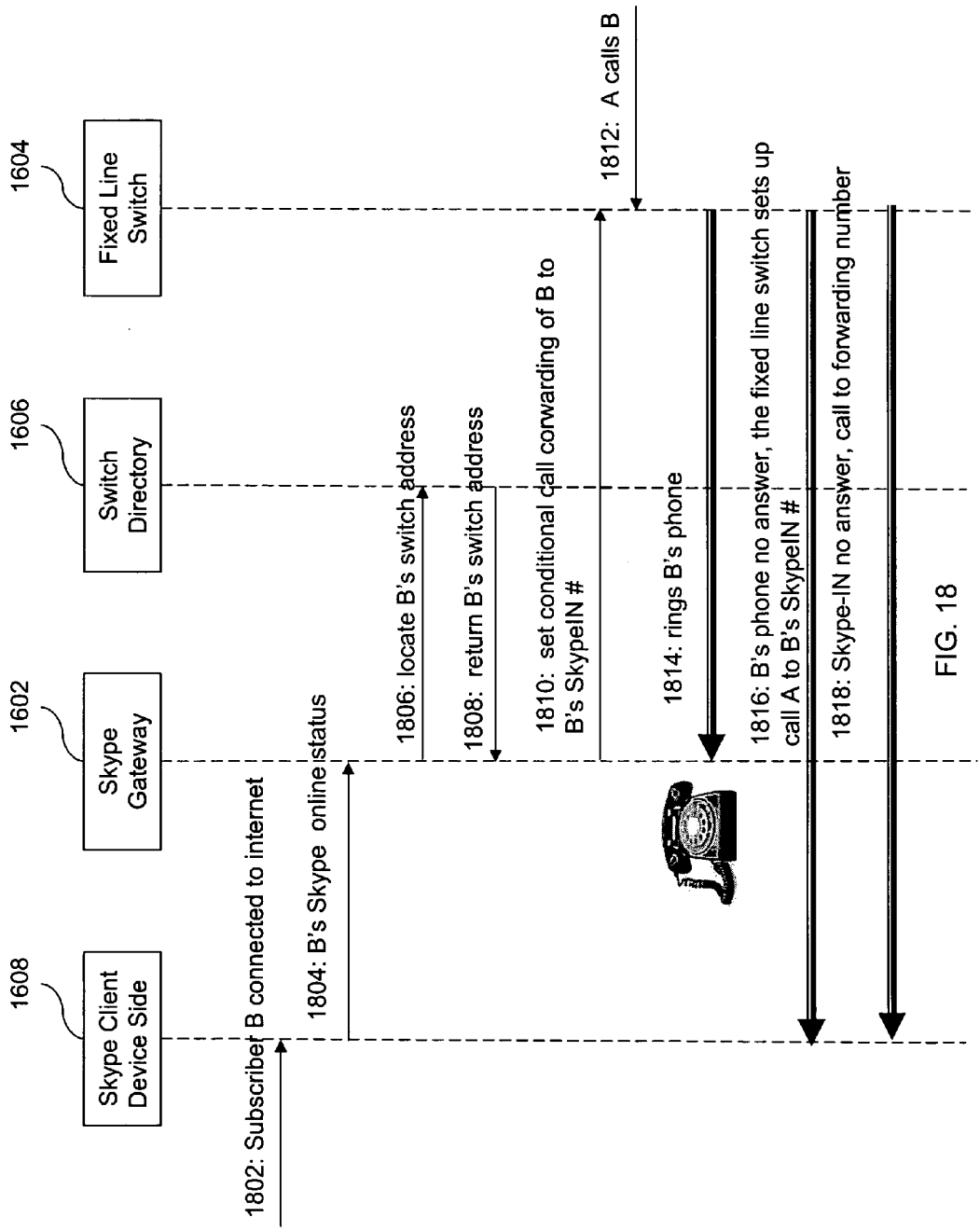
FIG. 18 represents a flow diagram of conditional call forwarding implementation of the ICV system using the Skype-IN like service for the fixed line subscriber, in accordance with an embodiment of the invention.

FIG. 18 represents a flow diagram for conditional call forwarding implementation of the ICV system 1600 using the Skype-IN service for fixed line subscriber, in accordance with an embodiment of the invention. At step 1802, subscriber B's Skype client 1608 connects to the IP network (i.e. the second communication network). Skype client 1608 informs his 'online' status to Skype Gateway 1602 in HPMN 108 of subscriber B, at step 1804. Further, at step 1806, Skype Gateway 1602 requests from Switch Directory 1606, information about fixed line switch 1604 of subscriber B. At step 1808, Switch Directory 1606 returns the address of fixed line switch 1604 of subscriber B. Thereafter, at step 1810, Skype Gateway 1602 sets conditional call forwarding of subscriber B at fixed line switch 1604 to the Skype-IN number at fixed line switch 1604. In case, fixed line switch 1604 originally already has a late call forwarding number such as a voicemail, fixed line switch 1604 saves it. Further, at step 1812, subscriber A calls subscriber B and the call reaches fixed line switch 1604 of subscriber B. Fixed line switch 1604, at step 1814, facilitates a ring at the fixed line phone of subscriber B. If there is a NO-ANSWER response from the fixed line phone, fixed line switch 1604, at step 1816, continues the call set up using A's number, subscriber B's called number (as originally called number) and the Skype-IN number of B. However, in case Skype client 1608 is set with a call forwarding facility, the call is forwarded to the number based on condition such as, but not limited to, no answer or busy or always. Furthermore, in case there is a NO-ANSWER or busy from Skype-IN number, then fixed line switch 1604, at step 1818, routes the call to the saved original call forwarding number (if any).

Figure 19:
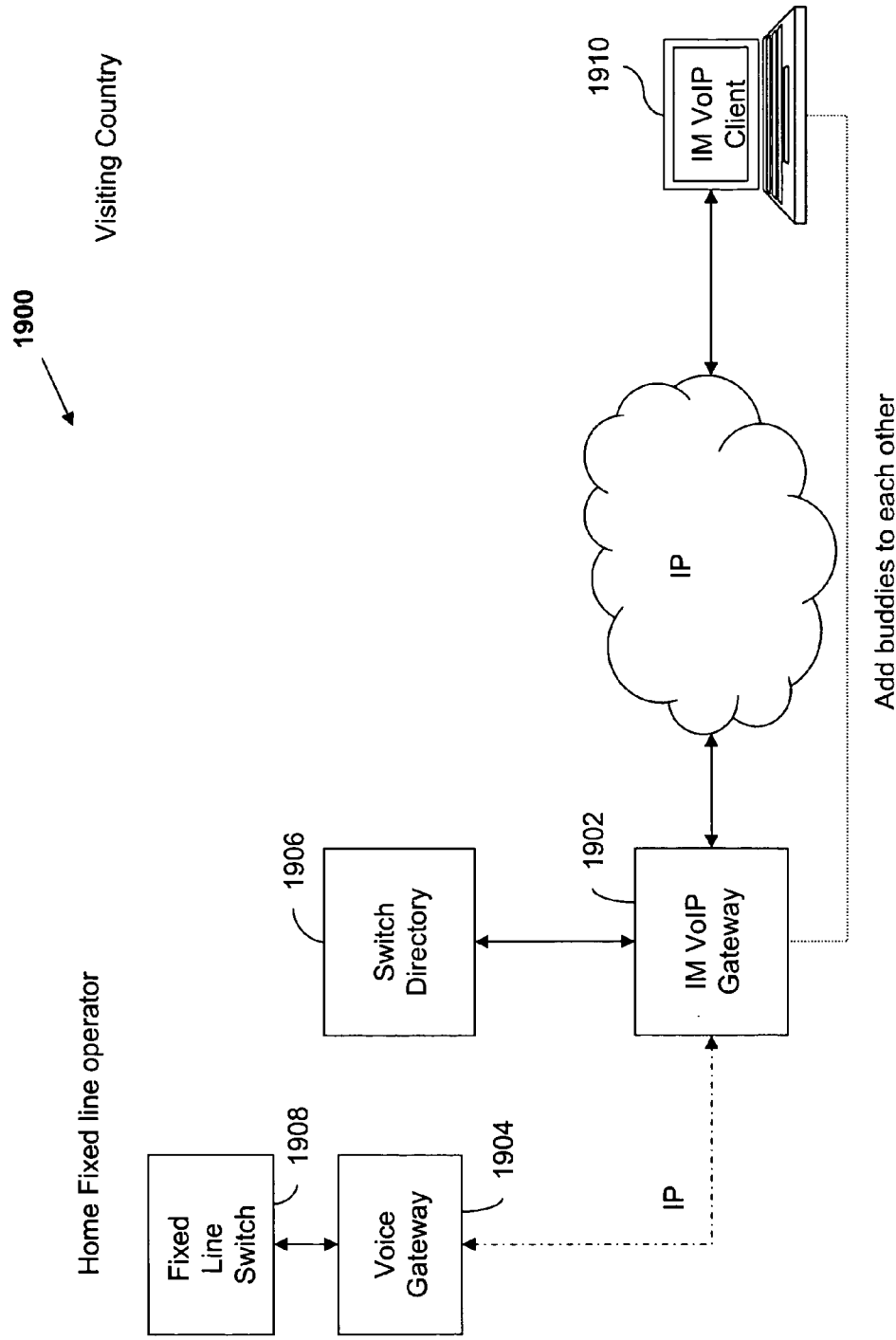
FIG. 19 represents a system for implementing the ICV system using the IM-VoIP like service for a fixed line subscriber, in accordance with an embodiment of the invention.

FIG. 19 represents an ICV system 1900 implemented using the IM-VoIP service for a fixed line subscriber B, in accordance with an embodiment of the invention. ICV system 1900 includes an IM-VoIP gateway 1902, a voice gateway 1904, a switch directory 1906, and a fixed line switch 1908 in HPMN 204 of fixed line subscriber B. Subscriber B has an IM-VoIP client 1910 associated with devices such as, a laptop, a PC, and a smart device. IM-VoIP client 1910 has an IP interface using which it connects to IM-VoIP gateway 1902 (via the IP network) and add each other as 'buddies'. ICV system 1900 is applicable for IM-VoIP clients such as, Yahoo®, MSN®, Google® etc. where there is no call-in number facility. Alternatively, VoIP clients like Skype or Gizmon may also use ICV system 1900, when the subscriber has not registered with their call-in number facility. In such cases, ICV system 1900 selects a local temporary number depending upon the location of the subscriber to route the call to that temporary number.

Figure 20:
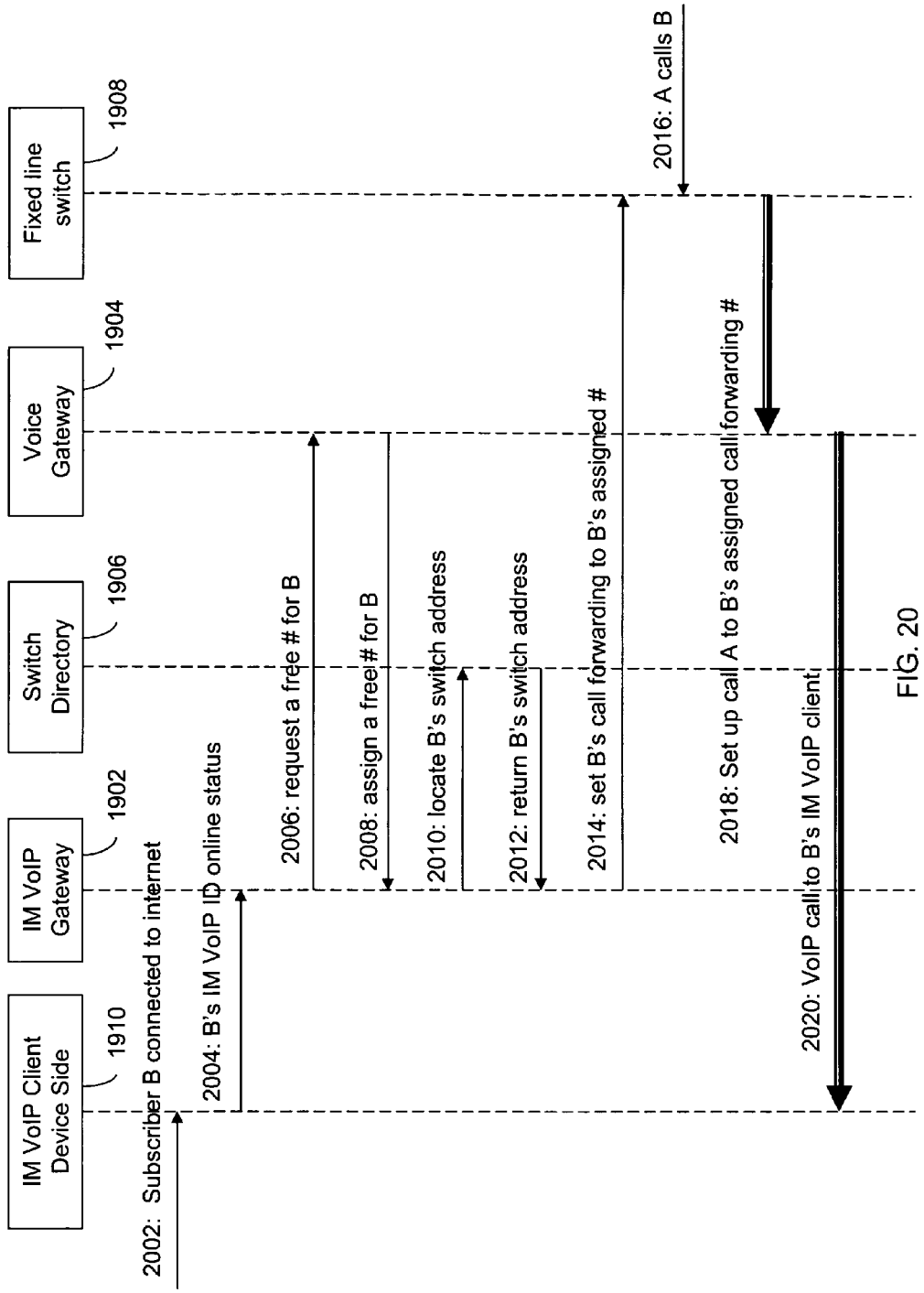
FIG. 20 represents a flow diagram of unconditional call forwarding implementation of the ICV system using the IM-VoIP like service for the fixed line subscriber, in accordance with an embodiment of the invention.

FIG. 20 represents a flow diagram of unconditional call forwarding implementation of ICV system 1900 using the IM-VoIP service for the fixed line subscriber, in accordance with an embodiment of the invention. The unconditional call forwarding implies routing any call that terminates at the fixed line number of the subscriber B to its associated IM-VoIP client over the IP network. At step 2002, IM-VoIP client 1910 of subscriber B connects to the IP network (i.e. second communication network). At step 2004, IM-VoIP client 1910 informs his 'online' status to IM-VoIP Gateway 1902 in HPMN 204 of fixed line subscriber B. Thereafter, at step 2006, IM-VoIP Gateway 1902 requests a free (local) temporary number for B from Voice Gateway 1904, which maintains a pool of available local numbers. At step 2008, Voice Gateway 1904 assigns a free local number F to subscriber B and records the assignment. Further, at step 2010, IM-VoIP Gateway 1902 requests Switch Directory 1906 for address of fixed line switch 1908. At step 2012, Switch Directory 1906 returns the address of fixed line switch 1908 of subscriber B. Thereafter, at step 2014, IM-VoIP Gateway 1902 sets unconditional call forwarding of subscriber B to the temporary assigned number F at fixed line switch 1908 of subscriber B. In such a case, ICV system 1900 may use a proprietary fixed line switch interface. Furthermore, at step 2016, subscriber A calls subscriber B and the call reaches fixed line switch 1908. At step 2018, fixed line switch 1908 continues call set up using subscriber A's number, subscriber B's called number (as originally called number) and the temporary assigned number F of subscriber B towards voice gateway 1904. Finally, at step 2020, voice gateway 1904 uses the recorded assignment on subscriber B to route the call over IP network to the subscriber B's IM VoIP client 1910.

Figure 21:
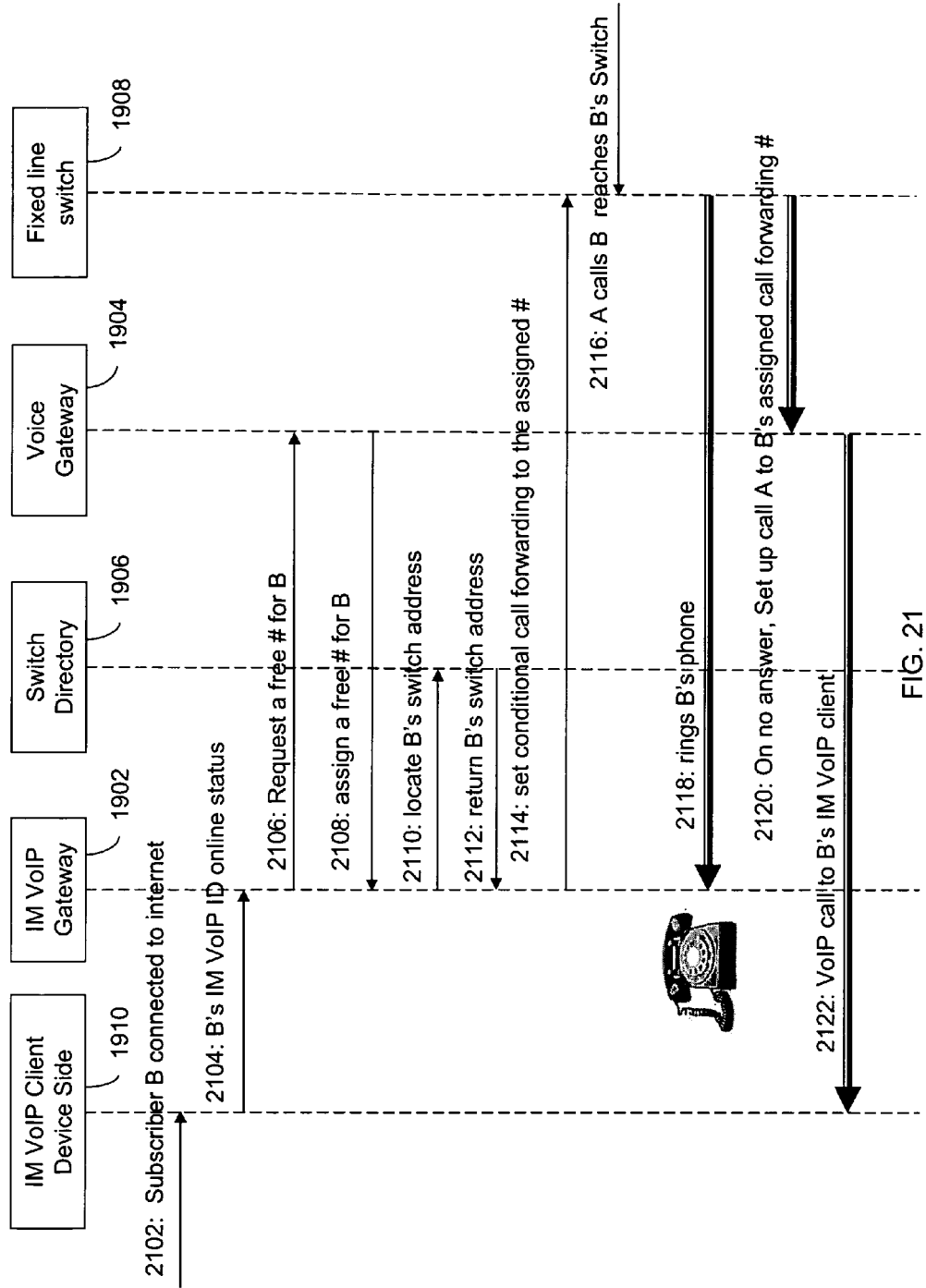
FIG. 21 represents a flow diagram of conditional call forwarding implementation of the ICV system using the IM-VoIP like service for the fixed line subscriber, in accordance with an embodiment of the invention.

FIG. 21 represents a flow diagram of conditional call forwarding implementation of ICV system 1900 using the IM-VoIP service for the fixed line subscriber B, in accordance with an embodiment of the invention. At step 2102, subscriber B's IM-VoIP client connects to the IP network (i.e. the second communication network). At step 2104, IM-VoIP client 1910 informs his 'online' status to IM-VoIP Gateway 1902 in HPMN of fixed line subscriber B. At step 2106, IM-VoIP Gateway 1902 requests a free (local) temporary assigned number for subscriber B from Voice Gateway 1904, which maintains a pool of available local numbers. At step 2108, Voice Gateway 1904 assigns a free local number F to B and records the assignment. Thereafter, at step 2110, IM-VoIP Gateway 1902 requests for address of fixed line switch of subscriber B from Switch Directory 1906. At step 2112, Switch Directory 1906 returns the address of fixed line switch 1908 of subscriber B. Further, at step 2114, IM-VoIP Gateway 1902 sets the conditional call forwarding of subscriber B to the assigned number F at fixed line switch 1908 of subscriber B. The conditional call forwarding may be applied on one or more criteria such as, but not limited to, no-answer, busy etc. The ICV system 1900 using call forwarding may use a proprietary fixed line switch interface. In case fixed line switch 1908 already has a late call forwarding number, such as voicemail, fixed line switch 1908 saves it. Furthermore, at step 2116, subscriber A calls subscriber B and the call reaches fixed line switch 1908. At step 2118, fixed line switch 1908 facilitates a ring at subscriber B's fixed line phone. In case there is a NO-ANSWER message response, fixed line switch 1908, at step 2120, sets the call at voice gateway 1904 using subscriber A's number, subscriber B's called number (as originally called number) and the assigned number F of subscriber B. Finally, at step 2122, voice gateway 1904 uses the recorded assignment on subscriber B to route the call over IP to subscriber B's IM VoIP client 1910. Also, in case of a NO-ANSWER or busy or non-availability of a late call forwarding number, fixed line switch 1908 routes the call to the original saved call forwarding number.

Figure 22:
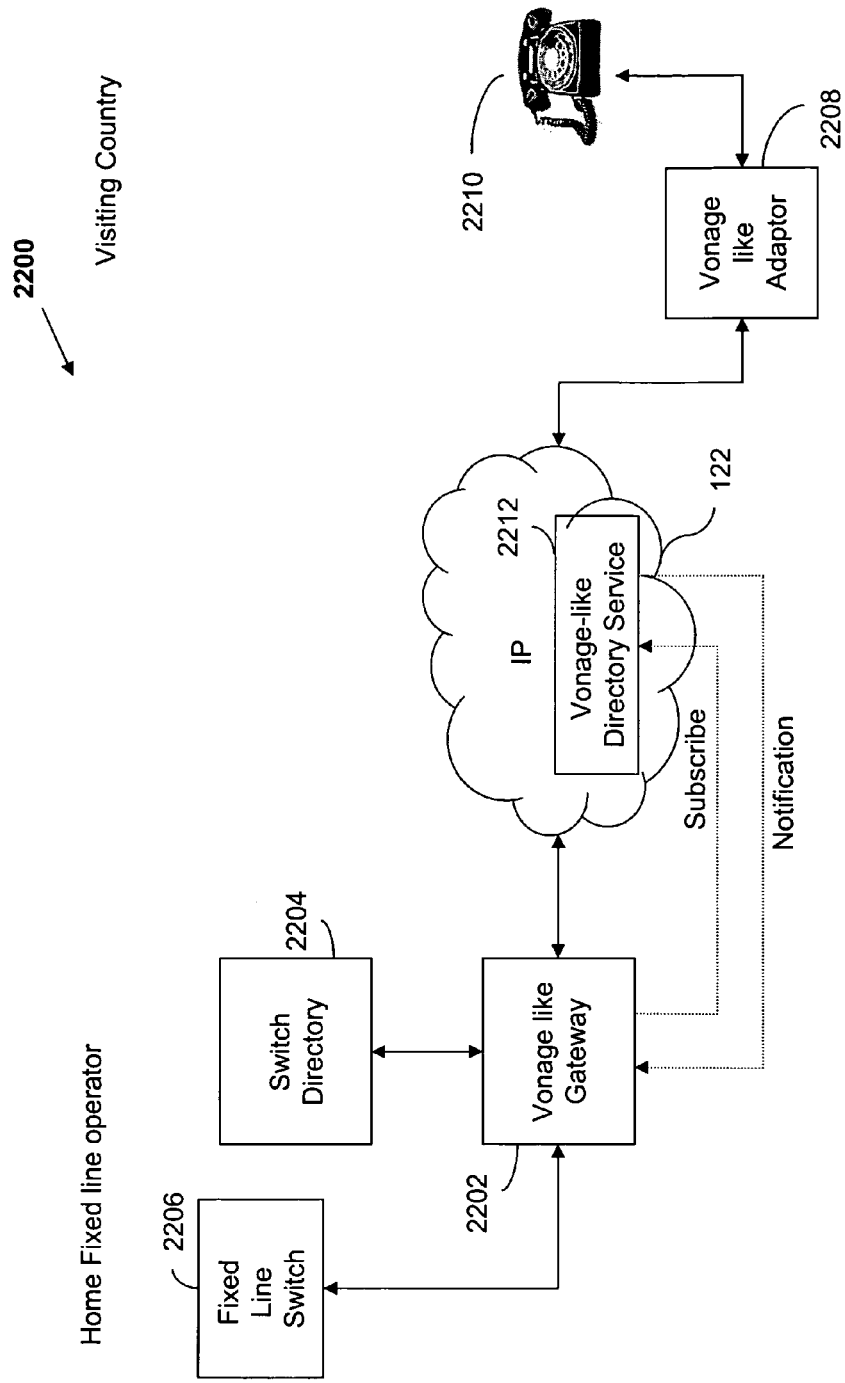
FIG. 22 represents a system for implementing the ICV system using the Vonage like service for a fixed line subscriber, in accordance with an embodiment of the invention.

FIG. 22 represents an ICV system 2200 implemented using the Vonage like service for a fixed line subscriber, in accordance with an embodiment of the invention. ICV system 2200 includes a Vonage like gateway 2202, a switch directory 2204, and a fixed line switch 2206 in the HPMN of subscriber B. Further, ICV system 2200 includes subscriber's Vonage like client device 2208 (phone adaptor) that has an IP interface and phone interface connected to a fixed line phone 2210. Each time the phone adaptor connects to an IP network, it reports the IP address and phone number to a Vonage-like Directory Service 2212. Vonage-like Gateway 2202 subscribes to Directory Service 2212 for any information pertaining to subscriber of the network deploying ICV system 2200. Whenever such a subscriber's Vonage-like client device 2208 registers with Directory Service 2212, Directory Service 2212 notifies Vonage-like Gateway 2202. Clients such as, but not limited to, Vonage and SunRocket, may use ICV 2200, where there is a call-in number facility and an IP phone adaptor. However, since there is no IM or presence component, the IP address of the phone number registers with the directory service.

Figure 23:
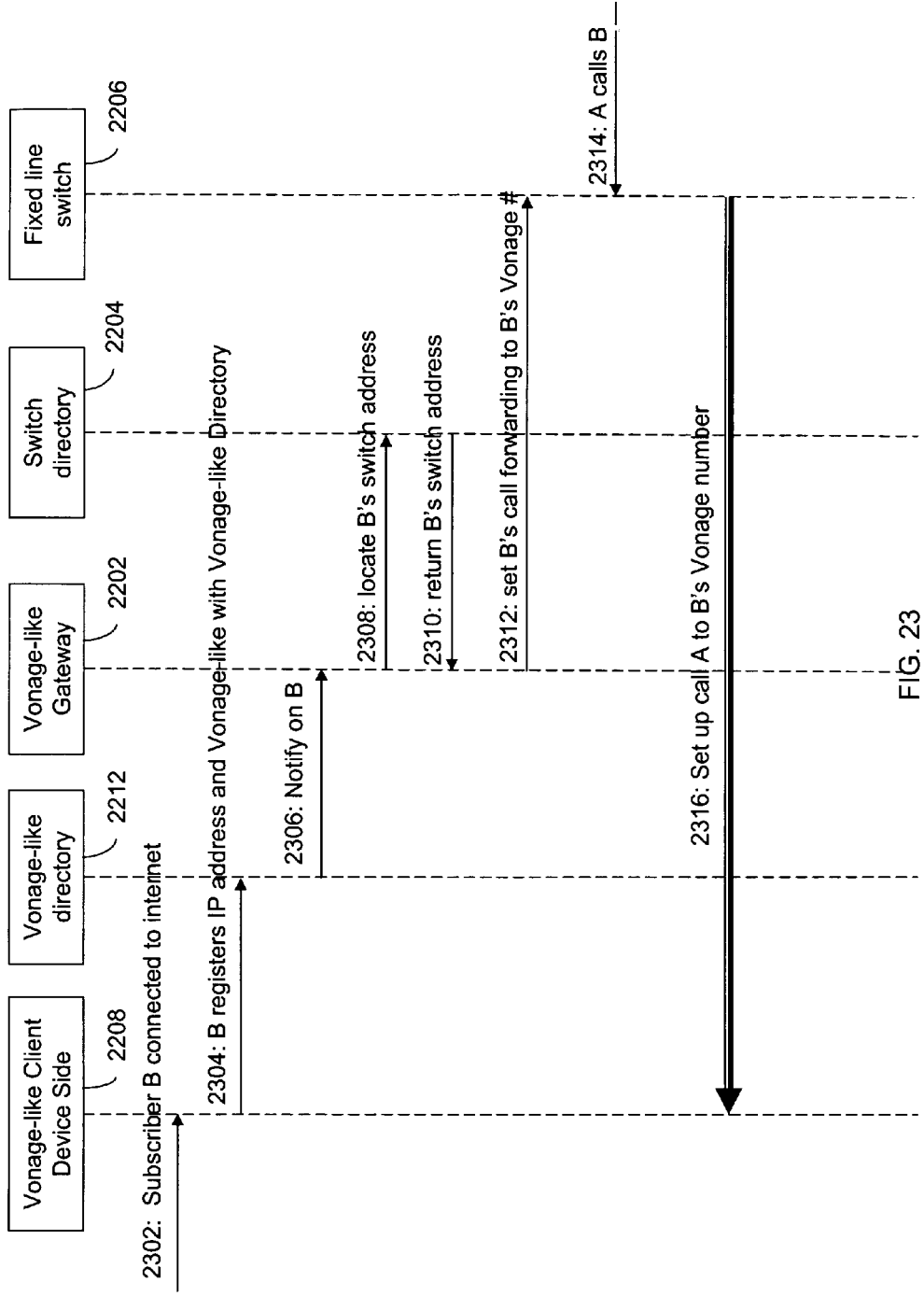
FIG. 23 represents a flow diagram of unconditional call forwarding implementation of the ICV system using the Vonage like service for the fixed line subscriber, in accordance with an embodiment of the invention.

FIG. 23 represents a flow diagram for unconditional call forwarding implementation of ICV system 2200 using the Vonage like service for the fixed line subscriber, in accordance with an embodiment of the invention. At step 2302, subscriber B's Vonage-like client device 2208 connects to the IP network. At step 2304, Vonage-like VoIP client 2208 registers with Vonage-like Directory 2212. Directory Service 2212, at step 2306, notifies Vonage-like Gateway 2202 at the fixed line home network of subscriber B. At step 2308, Vonage-like Gateway 2202 requests for address of the local fixed line switch from switch directory 2204. Switch Directory 2204 returns the address of fixed line switch 2206 of subscriber B, at step 2310. Thereafter, at step 2312, Vonage-like Gateway 2202 sets unconditional call forwarding to subscriber B's Vonage-like number at fixed line switch 2206. ICV system 2200 using this call forwarding may use a proprietary fixed line switch interface. Further, at step 2314, subscriber A calls subscriber B and the call reaches at fixed line switch 2206. At step 2316, fixed line switch 2206 continues the call set up using subscriber A's number, subscriber B's called number (as originally called number) and subscriber B's Vonage-like number towards the subscriber B's Vonage client device 2208.

Figure 24:
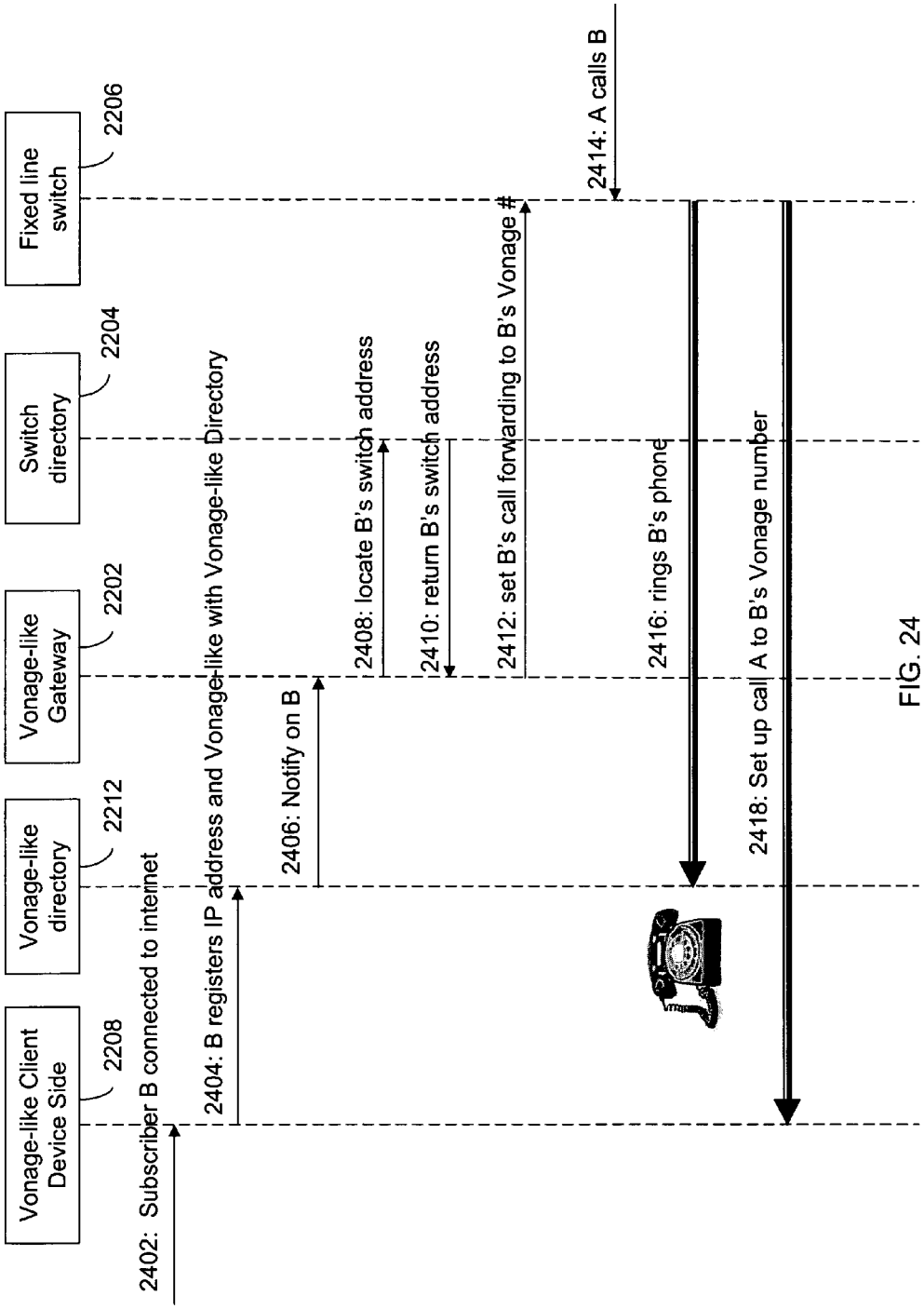
FIG. 24 represents a flow diagram of conditional late call forwarding implementation of the ICV system using the Vonage like service for the fixed line subscriber, in accordance with a first embodiment of the invention.

FIG. 24 represents a flow diagram for conditional late call forwarding implementation of ICV system 2200 using the Vonage-like service for the fixed line subscriber, in accordance with an embodiment of the invention. At step 2402, subscriber B's Vonage-like client device 2208 connects to the IP network. At step 2404, Vonage-like client 2208 registers with Vonage-like Directory 2212. Directory Service 2212, at step 2406, notifies Vonage-like Gateway 2202 at the home network of subscriber B. At step 2408, Vonage-like Gateway 2202 requests for information about the local fixed line switch of B from Switch Directory 2204. At step 2410, Switch Directory 2204 returns the address of fixed line switch 2206 of subscriber B. Thereafter, at step 2412, Vonage-like Gateway 2202 sets conditional call forwarding to subscriber B's Vonage-like number (by using a possibly proprietary fixed line switch interface) at fixed line switch 2206. The conditional forwarding may be set based on criteria such as, but not limited to, NO ANSWER, and busy response. In case fixed line switch 2206 already has late call forwarding number such as voicemail, fixed line switch 2206 saves it. Thereafter, at step 2414, subscriber A calls subscriber B and the call reaches fixed line switch 2206. At step 2416, fixed line switch 2206 facilitates a call at the fixed line phone of B. In case there is a NO ANSWER response from the fixed line phone, fixed line switch 2206, at step 2418, continues the call set up using A's number, subscriber B's called number (as originally called number) and B's Vonage-like number towards Vonage client device 2208. However, in case of still a NO-ANSWER or busy message response, fixed line switch 2206 routes the call to the original saved call forwarding number.

Figure 25:
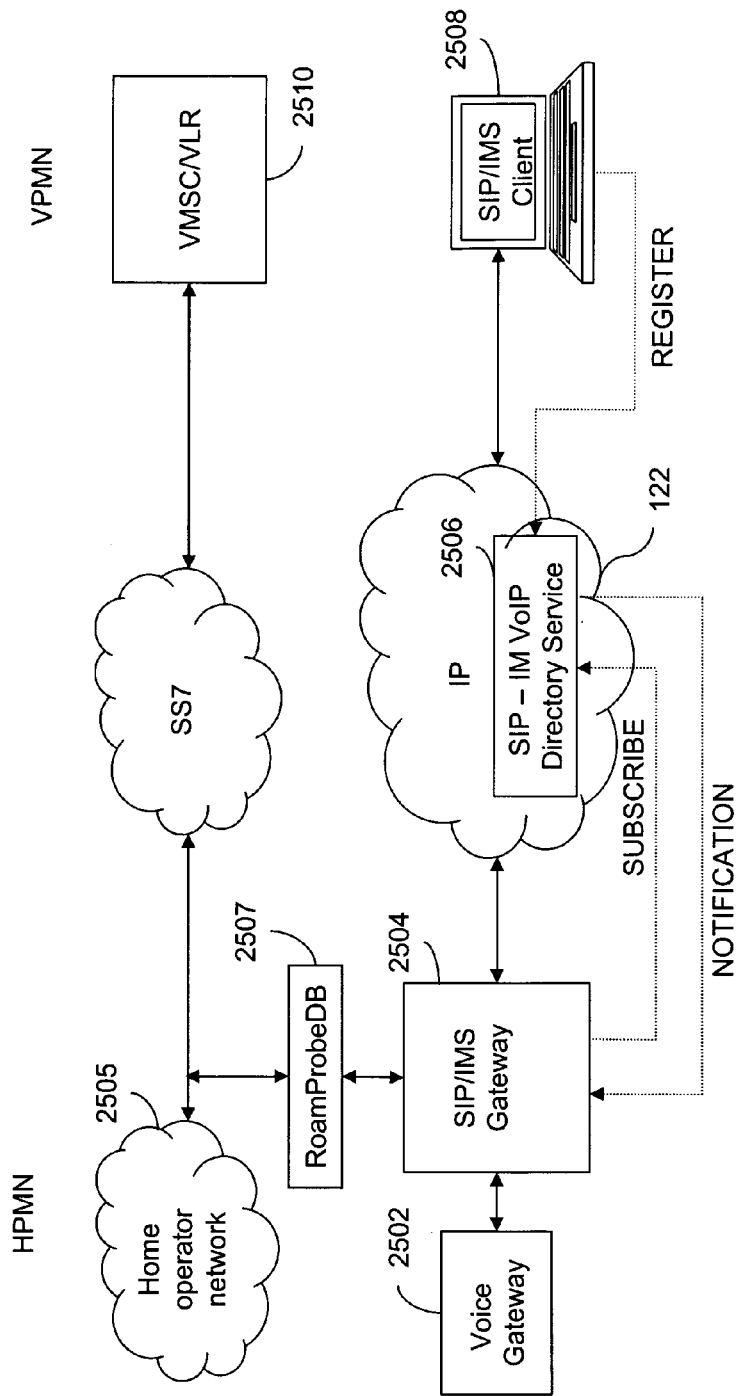
FIG. 25 represents a generic SIP based system diagram for implementing the ICV system for both wireless and fixed line subscribers, in accordance with an embodiment of the invention.

FIG. 25 represents a generic SIP based system diagram 2500 for implementing ICV system for both wireless and fixed line subscribers, in accordance with an embodiment of the invention. System 2500 includes a Voice Gateway 2502, a SIP/IMS Gateway 2504 in a home network 2505 of the fixed or wireless subscriber. SIP/IMS Gateway 2504 subscribes to a SIP IM-VoIP Directory Service 2506 to check for the status of the subscriber. Further, SIP/IMS gateway 2504 uses a roamer probe database (RPD) 2507 to monitor SS7 roaming links between home operator 2505 and the visited network. A SIP IM-VoIP client device 2508 registers with Directory Service 2506 when it connects to an IP network. In the case of a wireless subscriber (mobile user), the mobile device can optionally register with a VLR/VMSC 2510 in the visited network (VPMN).

In accordance with an embodiment of the invention, when a SIP IM-VoIP client device 2508 registers with Directory Service 2506, Directory Service 2506 notifies subscriber B's status information (i.e. presence information) to SIP/IMS Gateway 2504. Thereafter, SIP/IMS Gateway 2504 sets the unconditional or conditional call forwarding of subscriber B either at the HLR of subscriber B or at the fixed line switch of subscriber B. Now, when subscriber A calls subscriber B, the call gets rerouted over an IP network to SIP IM-VoIP client 2508 via Voice Gateway 2502. Voice Gateway 2502 is responsible to assign a temporary local number in the current area of subscriber B so to reduce the forwarding call cost. Voice Gateway 2502 also routes the final call to SIP IM-VoIP client device 2508.

It would be apparent to a person skilled in the art that signal flow for non-call related traffic is similar to the one as explained in one or more of the above embodiments of routing call related traffic. A mobile terminated SMS (MT SMS) is usually free even when the subscriber is roaming. The forwarding of a MT-SMS is preferred when subscriber's mobile is not in coverage area, yet connects to IP network. It may not be necessary that the subscriber is out of coverage only when he's roaming, it may also be possible that mobile subscriber is at the home network and yet may be unreachable because subscriber may have switched off his mobile or may not answer the call. In such cases, the gateway delivers any mobile terminated SMS to the subscriber via the IP network.

Figure 26:
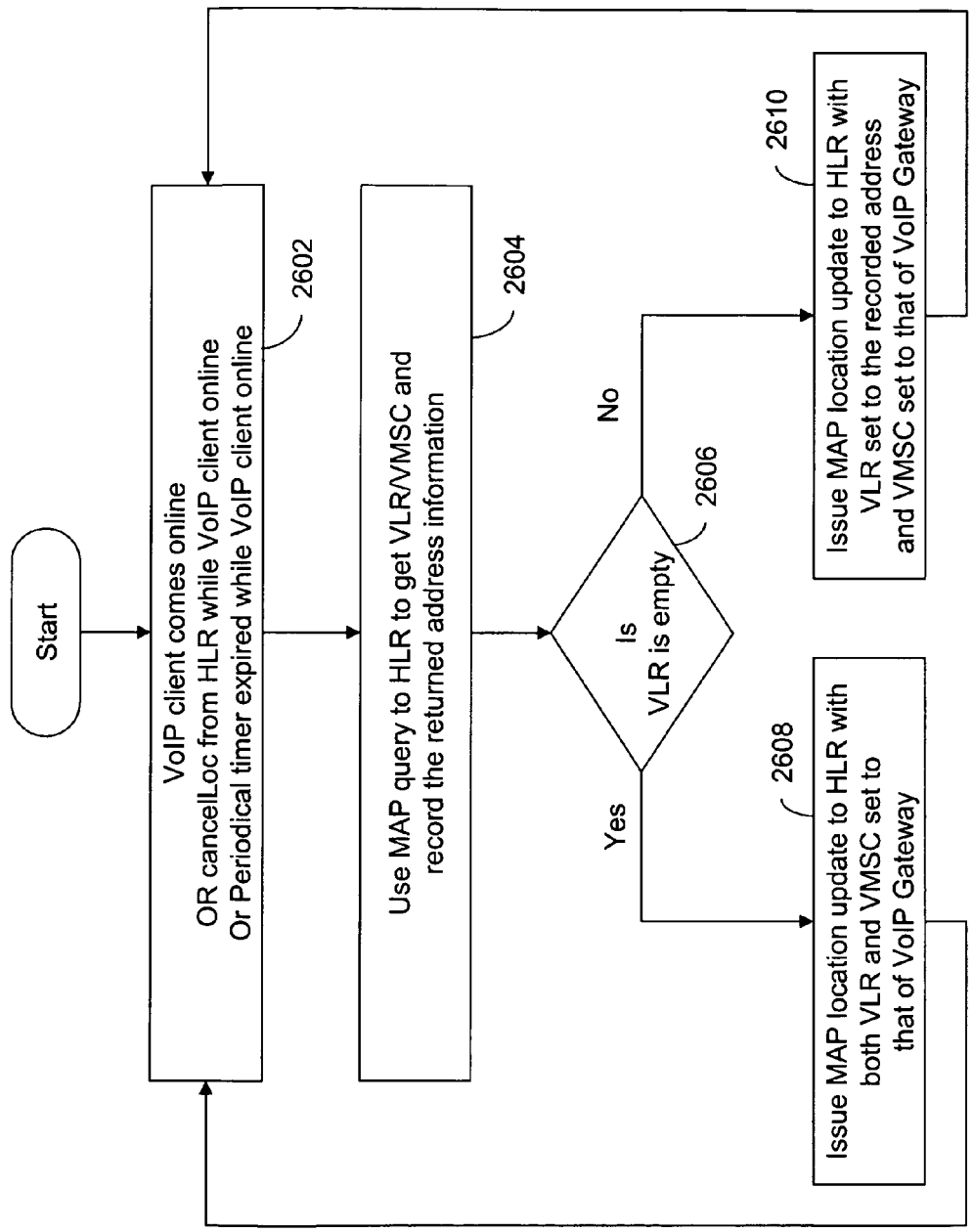
FIG. 26 represents a flow chart for SMS forwarding via a second communication network, in accordance with an embodiment of the invention.

FIG. 26 represents a flow chart for SMS forwarding via the second communication network (IP network), in accordance with an embodiment of the invention. In this embodiment of the invention, the HLR in consideration does not have mobility notification capability. In other words, whenever the subscriber changes his VMSC, the HLR does not notify the VoIP gateway of the same. Hence, whenever an IP connection is available, the VoIP gateway modifies the only VMSC address to be that of the VoIP gateway. Further, the VoIP Gateway periodically modifies (e.g. every minute) the VMSC address of the subscriber at the HLR without changing the subscriber's VLR location. At step 2602, one of the following occurs: the device associated with the subscriber notifies the VoIP Gateway of IP connection with the VoIP client; or the HLR sends a MAP Cancel Location message to the VoIP Gateway while the VoIP client is online; or a periodical timer of the VoIP Gateway's expires for the subscriber. Thereafter, at step 2604, the VoIP gateway sends a MAP SRI-SM query message to get the current VLR/VMSC address for the subscriber's location. The VoIP gateway also records the received address information. At step 2606, the VoIP gateway checks if the VLR/VMSC address is empty. In case, the VLR/VMSC location is empty, then at step 2608, the VoIP gateway issues a MAP Update Location message to the HLR to set both the VLR and VMSC address as that of the VoIP gateway. And if, the VLR/VMSC address is not empty, then at step 2610, the VoIP gateway records the address and issues a MAP Update Location message with VLR address to be the VMSC address returned from the MAP SRI-SM query (in step 2604) and the VMSC address to be same as that of the VoIP gateway. These process steps repeat to check for validity of the conditions in step 2602.

Figure 27:
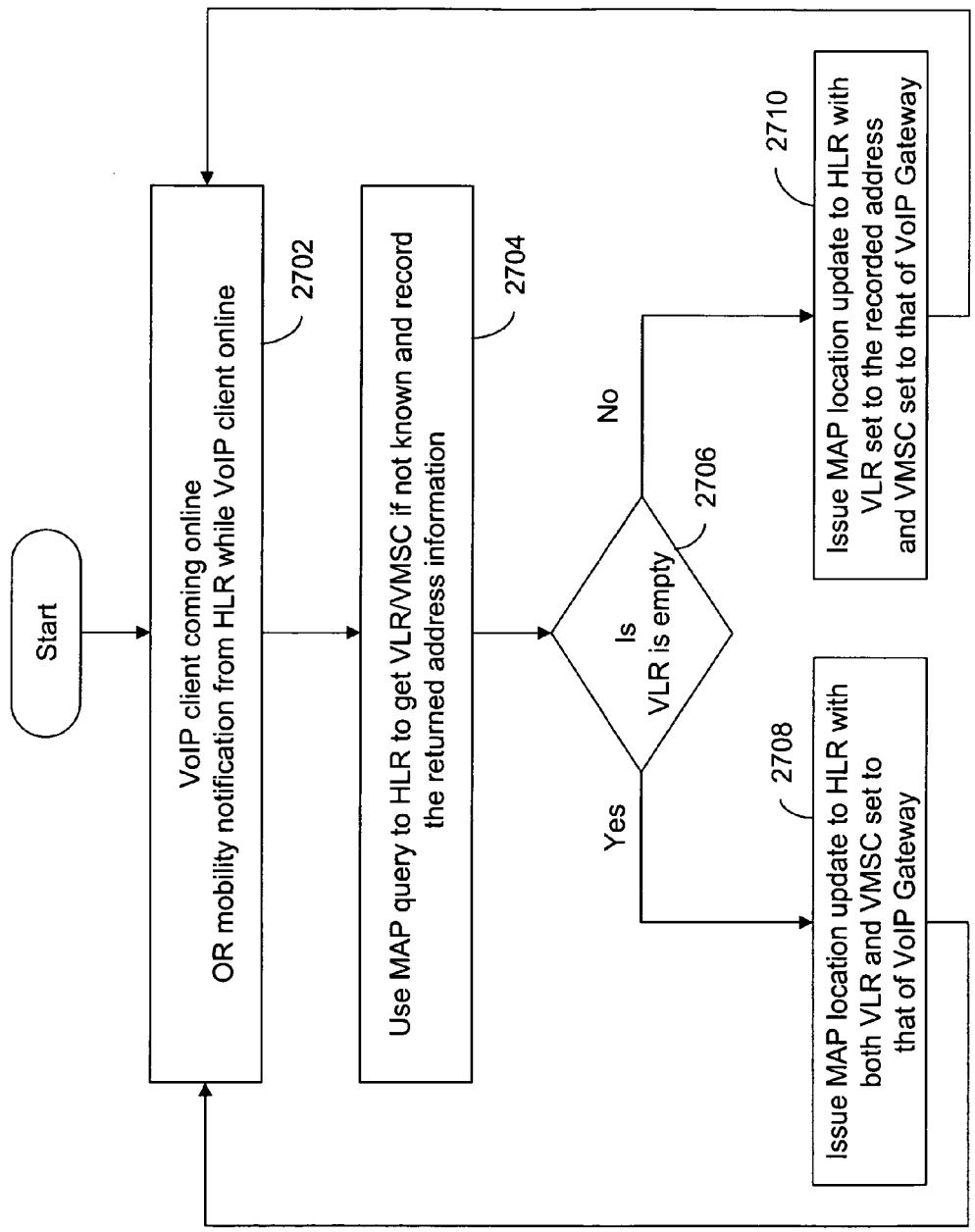
FIG. 27 represents a flow chart for SMS forwarding via a second communication network, in accordance with another embodiment of the invention.

FIG. 27 represents a flow chart for SMS forwarding via the second communication network (IP network), in accordance with another embodiment of the invention. Unlike the previous embodiment, this embodiment considers the mobility notification capability with the HLR or the Roaming Probe Device (RPD). Whenever an IP connection is available, the VoIP gateway modifies the VMSC address to be that of the VoIP gateway. Further, the subscriber notifies the VoIP Gateway when he changes his VMSC location. At step 2702, one of the following occurs: the device associated with the subscriber notifies the VoIP Gateway of IP connection with the VoIP client; or the HLR or RPD sends a mobility notification to the VoIP Gateway when the VoIP client is online. Thereafter, at step 2704, the VoIP gateway sends a MAP SRI-SM query message to get the current VLR/VMSC address for the subscriber's location. The VoIP gateway also records the received address information. At step 2706, the VoIP gateway checks if the VLR/VMSC address is empty. In case the VLR/VMSC location is empty, then at step 2708, the VoIP gateway issues a MAP Update Location message to the HLR to set both the VLR and VMSC address as that of the VoIP gateway. And if VLR/VMSC address is not empty, then at step 2710, the VoIP gateway records the address and issues a MAP Update Location message with VLR address to be the VMSC address returned from the MAP SRI-SM query (in step 2704) and the VMSC address to be same as that of the VoIP gateway. These process steps repeat to check for validity of conditions in step 2702.

In both cases, the VoIP client responds to the received SMS from the sending party. The response will reach the VoIP gateway at the HPMN. The VoIP Gateway will put the responding party's mobile number as the sending number and the original sending party as the destination number. In some cases, the original sending party may be a VoIP client or a mobile.

Figure 28:
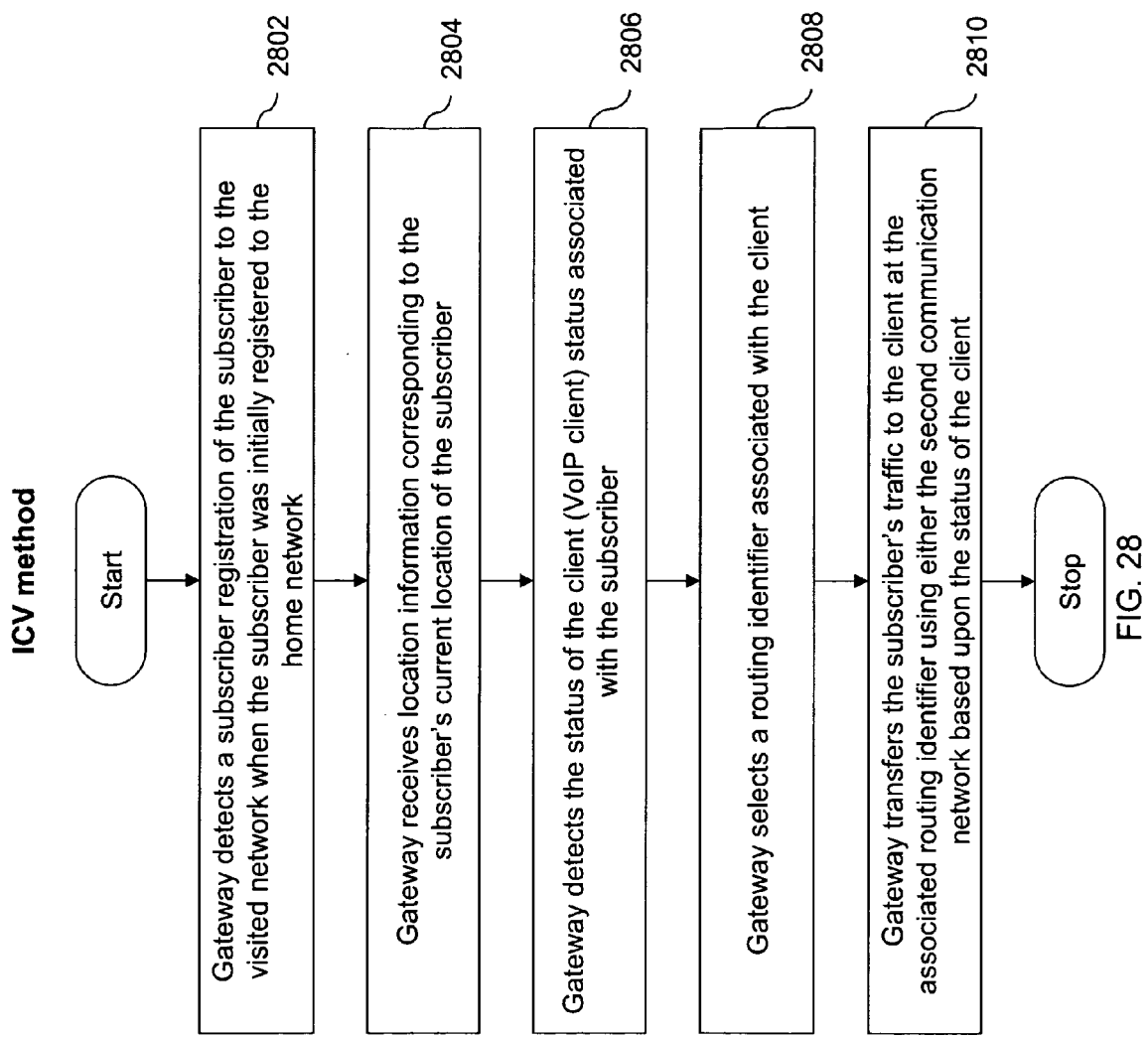
FIG. 28 represents a flow chart for implementing the ICV system, in accordance with an embodiment of the invention.

The generic method explained in one or more of the above embodiments is represented in FIG. 28 as a flow chart for implementing an ICV system, in accordance with an embodiment of the invention. At step 2802, the gateway detects a subscriber registration to the visited network when the subscriber initially registers with the home network. At step 2804, the gateway receives location information corresponding to the subscriber's current location of the subscriber by using the RPD to probe the roaming SS7 links between the home network and the visited network. At step 2806, the gateway detects the status of the client (VoIP client) associated with the subscriber. Further, at step 2808, the gateway selects a routing identifier associated with the client. The routing identifier corresponds to the subscriber's current location. Thereafter, at step 2810, the gateway transfers the subscriber's traffic to the client at the associated routing identifier, using the second communication network based upon the status of the client. In accordance with another embodiment of the invention, the VoIP gateway transfers the subscriber's traffic using the first communication network when the status of the client is seen either as offline or unreachable.

The present invention can take the form of an entirely hardware embodiment, an entirely software embodiment or an embodiment containing both hardware and software elements. In accordance with an embodiment of the present invention, software including but is not limited to firmware, resident software, and microcode, implements the invention.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CDROM), compact disk—read/write (CD-RAN) and Digital Versatile Disk (DVD).

An HPMN operator uses the Integrated Cellular VoIP (ICV) system to serve subscribers associated with its network even when they are not the coverage of home network. The ICV system connects with its subscribers via an IP network to provide call related and value added service. The subscriber may be using various VoIP clients, which may connect to the home operator via a VoIP gateway deployed at the HPMN. The ICV system may forward a call, destined to the subscriber at his mobile number, as a VoIP call to a client associated with the subscriber. The ICV system is capable of switching an ongoing call on mobile to a call on a VoIP client and vice-versa. In case of multiple VoIP clients with a subscriber, the subscriber may specify preferential order amongst multiple clients.

The components of ICV system described above include any combination of computing components and devices operating together. The components of the ICV system can also be components or subsystems within a larger computer system or network. The ICV system components can also be coupled with any number of other components (not shown), for example other buses, controllers, memory devices, and data input/output devices, in any number of combinations. In addition any number or combination of other processor-based components may be carrying out the functions of the ICV system.

It should be noted that the various components disclosed herein may be described using computer aided design tools and/or expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, it covers all of the following interpretations: any of the items in the list, all of the items in the list and any combination of the items in the list.

The above description of illustrated embodiments of the ICV system is not intended to be exhaustive or to limit the ICV system to the precise form disclosed. While specific embodiments of, and examples for, the ICV system are described herein for illustrative purposes, various equivalent modifications are possible within the scope of the ICV system, as those skilled in the art will recognize. The teachings of the ICV system provided herein can be applied to other processing systems and methods. They may not be limited to the systems and methods described above.

The elements and acts of the various embodiments described above can be combined to provide further embodiments. These and other changes can be made to the AITRS in light of the above detailed description.

Other Variations

In describing certain embodiments of the ICV system under the present invention, this specification follows the path of a telecommunications call from a calling party to a called party. For the avoidance of doubt, that call can be for a normal voice call, in which the subscriber telecommunications equipment is also capable of visual, audiovisual or motion picture display. Alternatively, those devices or calls can be for text, video, pictures or other communicated data.

In the foregoing specification, specific embodiments of the present invention have been described. However, one of ordinary skill in the art will appreciate that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

TECHNICAL REFERENCES

Each of the following is incorporated herein by reference in its entirety.
GSM 902 on MAP specification
Digital cellular telecommunications system (Phase 2+)
Mobile Application Part (MAP) Specification
(3GPP TS 09.02 version 7.9.0 Release 1998)
Digital cellular telecommunications system (Phase 2+); Security Mechanisms for the SIM application toolkit; Stage 2 (GSM 03.48 version 8.3.0 Release 1999)
Basset, Salman A. and Schulzrinne, Henning; "An Analysis of Peer-to-Peer Internet Telephony Protocol"; Department of Computer Science, Columbia University; published Sep. 15, 2004. (see: http://www1.cs.columbia.edu/~library/TR-repository/reports/reports-2004/cucs-039-04.pdf) as viewed Nov. 3, 2006.
GSM 348
International Patent Application number WO 2006/027772, entitled "Roaming Presence and Context Management," published Mar. 16, 2006

APPENDIX

| Acronym | Description |
| --- | --- |
| 3G | Third generation of mobile |
| BSC | Base Station Controller |
| BCSM | Basic Call State Model |
| CAMEL | Customized Application for Mobile Enhanced Logic |
| CDMA | Code Division Multiplexed Access |
| CLI | Calling Line Identification |
| CgPA | Calling Party Address |
| CdPA | Called Party Address |
| CAP | Camel Application Part |
| CC | Country Code |
| CB | Call Barring |
| CSI | Camel Subscription Information |
| DPC | Destination Point Code |
| GMSC | Gateway MSC |
| GPRS | General Packet Radio System |
| GLR | Gateway Location Register |
| GSM | Global System for Mobile |
| GSM SSF | GSM Service Switching Function |
| GT | Global Title |
| HLR-H | HLR from HPMN |
| HLR | Home Location Register |
| HPMN | Home Public Mobile Network |

APPENDIX-continued

| Acronym | Description |
| --- | --- |
| IMSI | International Mobile Subscriber Identity |
| ICV | Integrated Cellular VoIP |
| IN | Intelligent Network |
| ISG | International Signal Gateway |
| INAP | Intelligent Network Application Part |
| ISD | MAP Insert Subscriber Data |
| IAM | Initial Address Message |
| IDP | Initial DP IN/CAP message |
| ITR | Inbound Traffic Redirection |
| ISUP | ISDN User Part |
| LU | Location Update |
| LUP | MAP Location Update |
| MAP | Mobile Application Part |
| MCC | Mobile Country Code |
| MCC | Mobile Country Code |
| ME | Mobile Equipment |
| MNC | Mobile Network Code |
| MO | Mobile Originated |
| MSC | Mobile Switching Center |
| MSISDN | Mobile Subscriber ISDN Number |
| MSRN | Mobile Subscriber Roaming Number |
| MT | Mobile Terminated |
| MTP | Message Transfer Part |
| NP | Numbering Plan |
| NPI | Numbering Plan Indicator |
| NDC | National Dialing Code |
| ODB | Operator Determined Barring |
| OTA | Over The Air |
| O-CSI | Originating CAMEL Subscription Information |
| PRN | Provide Roaming Number |
| RNA | Roaming Not Allowed |
| RPD | Roamer Probe Database |
| RR | Roaming Restricted due to unsupported feature |
| RI | Routing Indicator |
| SPC | Signal Point Code |
| SRI | Send Routing Information |
| SCCP | Signal Connection Control part |
| STP | Signal Transfer Point |
| STP-H | HPMN STP |
| SRI-SM | Send Routing Information For Short Message |
| SSP | Service Switch Point |
| SSN | Sub System Number |
| SIM | Subscriber Identify Module |
| STK | SIM Tool Kit Application |
| SM-RP-UI | Short Message Relay Protocol User Information |
| STP | Signal Transfer Point |
| SS | Supplementary Services |
| TR | Traffic Redirection |
| T-CSI | Terminating CAMEL Service Information |
| TCAP | Transaction Capabilities Application Part |
| TP | SMS Transport Protocol |
| UDHI | User Data Header Indicator |
| UDH | User Data Header |
| UD | User Data |
| VAS | Value Added Service |
| VLR-V | VLR from VPMN |
| VoIP | Voice over Internet Protocol |
| VLR | Visited Location Register |
| VMSC | Visited Mobile Switching Center |
| VPMN | Visited Public Mobile Network |

The invention claimed is:

1. A system for routing traffic of a subscriber associated with a first communication network comprising a visited network, the system comprising:
a gateway coupled to the first communication network and a second communication network, wherein the gateway monitors roaming links of the first communication network and detects the subscriber registering a subscriber communication device with the visited network,
wherein the gateway receives location information corresponding to a location of the subscriber communication device at the first communication network and a status of a client application installed on one of the subscriber communication device and a separate communication device from the subscriber communication device, capable of receiving an incoming call, associated with the subscriber being coupled to the gateway via the second communication network, wherein the gateway, upon determining a connection of the client application to the second communication network, automatically transfers the traffic directed to the subscriber communication device via the first communication network to the client application using the second communication network, and the gateway further comprising a mechanism to determine status of at least one of the client application and the subscriber communication device, wherein the first communication network is at least one of a Plain Old Telephone System (POTS) and a cellular network, and the second communication network is an IP-based network, and wherein the gateway is further configured to switch traffic between the subscriber communication device and the client application during an ongoing call.

2. The system of claim 1, wherein that first communication network comprises a visited network and a home network.

3. The system of claim 1, wherein the gateway selects a routing identifier associated with at least one client application and transfers the traffic of the subscriber to the client application at the associated routing identifier.

4. The system of claim 1, wherein the second communication network is at least one of a VoIP network, a SIP/IMS network, a Wi-Fi network, and a Wi-Max network.

5. The system of claim 1, wherein the subscriber communication device is one selected from a group, consisting of a mobile station, a fixed line telephone, a Wi-Fi enabled mobile telephone, a personal computer, a portable computing device, a portable telephone, a portable communication device, a telephone adaptor, and a personal digital assistant.

6. The system of claim 1, wherein the client application is a VoIP client of a service provider including at least one selected from a group consisting of Skype, Vonage, Gizmon, Google, Yahoo®, and MSN.

7. The system of claim 3, wherein the routing identifier is at least one selected from a group consisting of a Skype-IN, a mobile number of the subscriber communication device, a fixed landline number, a temporary assigned routing number corresponding to the location of the subscriber, and a temporary late call forwarding number assigned to the subscriber.

8. The system of claim 1, wherein the gateway includes at least one selected from a group consisting of a VoIP gateway, a Skype gateway, an MSN gateway, a Google Talk Gateway, a Yahoo® Talk Gateway, a Gizmon Gateway for Instant Messaging, and a VoIP Gateway for an instant message and VoIP client.

9. The system of claim 1, wherein the gateway includes a SIP/IMS gateway with a directory service.

10. The system of claim 1, wherein the gateway includes a Vonage gateway with a directory service.

11. The system of claim 1 further comprising a switch when the gateway is an IM-VoIP gateway.

12. The system of claim 3, wherein the subscriber registers one or more client applications with the gateway using one or more routing identifiers.

13. The system of claim 3, wherein the subscriber registers each of the one or more client applications with the gateway using one routing identifier.

14. The system of claim 1, wherein the gateway determines if unconditional call forwarding is enabled by the subscriber at an HLR via the first communication network.

15. The system of claim 1, wherein the gateway performs redirection of the traffic to one or more client applications based on one or more application logics.

16. The system of claim 1, wherein determining the status of the client application includes identifying the client application as one of being active and in-active with the gateway.

17. The system of claim 1, wherein determining the status of the subscriber includes identifying the subscriber communication device as one of being active and in-active with the first communication network.

18. The system of claim 1, wherein the gateway transfers the traffic directed to the subscriber communication device to the routing identifier of the client application via the second communication network when the status of the subscriber is identified as in-active and the status of the client application is identified as active.

19. The system of claim 1, wherein the gateway transfers the traffic directed to the subscriber communication device to the routing identifier of the client application via the second communication network based on pre-defined criteria.

20. The system of claim 3, wherein the gateway transfers the traffic directed to the subscriber communication device to the routing identifier of the client application via the first communication network when the status of the client application is identified as in-active.

21. The system of claim 3, wherein the gateway routes the traffic of an incoming call to the subscriber at the routing identifier of the client application associated with the subscriber as a VoIP call.

22. The system of claim 1, wherein the gateway routes the traffic of an MT SMS to the subscriber as an IM to the client application associated with the subscriber.

23. The system of claim 1, wherein receiving location information further comprises acquiring at least one selected from a group consisting of an International Mobile Subscriber Identity (IMSI), a Visited Location Register (VLR), a Visited Mobile Switching Center (VMSC), and subscription information of the subscriber from a roamer probe database (RPD).

24. The system of claim 1, wherein receiving location information further comprises acquiring location information from Mobile Application Part (MAP) transaction messages between the home network and the visited network.

25. The system of claim 1, wherein selecting a routing identifier further comprises selecting a telephone number at the home network from a set of numbers.

26. The system of claim 1, wherein the gateway is coupled to one or more home networks in the first communication network.

27. The system of claim 1, wherein the gateway transfers the traffic of one or more subscribers associated with the home network in the first communication network.

28. A system comprising:
a gateway coupled to a first communication system and a second communication system; and
a client application, capable of receiving an incoming call, installed on one of a subscriber communication device and a separate communication device from the subscriber communication device, the client application detecting a coupling with the second communication system and transferring at least one message to the gateway via the coupling, the message comprising one of identification information of the client application, one or more instructions and status information,
wherein the gateway establishes an association between a subscriber and a routing identifier associated with the client application on the second communication system, wherein the gateway determines routing to the client application via the second communication system that corresponds to the routing identifier of the client application, wherein the gateway transfers the traffic received at the first communication system to the client application as a VoIP call via the second communication system using the routing and the status information, wherein the first communication network is at least one of a Plain Old Telephone System (POTS) and a cellular network, and the second communication network is an IP-based network, and wherein the gateway is further configured to switch traffic between the subscriber communication device and the client application during an ongoing call.

29. The system of claim 28, wherein header of the message contains IP routing information from the client application to the gateway.

30. The system of claim 28, wherein the status information includes at least one of call blocking and unblocking information by the client application.

31. The system of claim 28, wherein the status information defines unconditional call forwarding status of the subscriber and if so the forwarding address.

32. The system of claim 28, wherein the instructions include control instructions to the gateway using Instant Messaging.

33. The system of claim 28, wherein the instructions include control instructions to the gateway using SMS.

34. A method for routing traffic of a subscriber, the method comprising:
    detecting a registration of a subscriber communication device to a visited network, the subscriber communication device being initially registered to a home network, the home network and the visited network being a part of a first communication network;
    receiving location information corresponding to a location of the subscriber communication device at the first communication network;
    detecting, at a gateway, status of at least one client application installed on one of the subscriber communication device and a separate communication device from the subscriber communication device, capable of receiving an incoming call, associated with the subscriber, the client application being coupled to the gateway via a second communication network, wherein the gateway is coupled to the first communication network;
    selecting a routing identifier associated with the client application, the routing identifier corresponding to the location of the subscriber; and
    transferring traffic of the subscriber communication device to the client application at the associated routing identifier using the second communication network, wherein the transfer of traffic is performed based on the detected status of the client application,
    wherein the first communication network is at least one of a Plain Old Telephone System (POTS) and a cellular network, and the second communication network is an IP-based network, and
    wherein the gateway enables switching of traffic between the subscriber communication device and the client application during an ongoing call.

35. The method of claim 34, further comprising:
    determining at the gateway whether unconditional call forwarding is enabled by the subscriber at an HLR via the first communication network.

36. The method of claim 34, wherein the gateway performs redirection of the traffic to one or more client applications based on one or more application logics.

37. The method of claim 34, wherein detecting the status of the client application includes:
    identifying the client application as one of being active and in-active with the gateway.

38. The method of claim 34, wherein detecting the status of the subscriber includes:
    identifying the subscriber as one of being active and in-active with the first communication network.

39. The method of claim 34, wherein the gateway transfers the traffic of the subscriber to the routing identifier of the client application via the second communication network when the status of the subscriber is identified as in-active and the status of the client application is identified as active.

40. The method of claim 34, wherein the gateway transfers the traffic of the subscriber to the routing identifier of the client application via the second communication network based on pre-defined criteria.

41. The method of claim 34, wherein the gateway transfers the traffic of the subscriber to the routing identifier of the client application via the first communication network when the status of the client application is identified as in-active.

42. The method of claim 34, wherein receiving location information further comprises acquiring at least one selected from a group consisting of an International Mobile Subscriber Identity (IMSI), a Visited Location Register (VLR), a Visited Mobile Switching Center (VMSC), and subscription information of the subscriber from a roamer probe database (RPD).

43. The method of claim 34, wherein receiving location information further comprises:
    acquiring location information from Mobile Application Part (MAP) transaction messages between the home network and the visited network.

44. The method of claim 34, wherein selecting the routing identifier further comprises:
    selecting a telephone number at the home network from a set of numbers.

45. The method of claim 34, wherein the gateway routes the traffic of an incoming call to the subscriber at the routing identifier of the client application associated with the subscriber as a VoIP call.

46. The method of claim 34, wherein the gateway routes the traffic of an MT SMS to the subscriber as an IM to the client application associated with the subscriber.

47. The method of claim 34, wherein the gateway transfers the traffic of one or more subscribers associated with the home network in the first communication network.

48. A computer program product comprising a non-transitory computer readable medium comprising computer usable program code for causing a computer to route traffic of a subscriber, the computer program product comprising:
    computer usable program code for detecting a registration of a subscriber communication device to a visited network, the subscriber communication device being initially registered to a home network, the home network and the visited network being a part of a first communication network;
    computer usable program code for receiving location information corresponding to a location of the subscriber communication device at the first communication network;
    computer usable program code for detecting, at a gateway, status of at least one client application installed on one of the subscriber communication device and a separate communication device from the subscriber communication device, capable of receiving an incoming call, associated with the subscriber, the client application being coupled to the gateway via a second communication network, wherein the gateway is coupled to the first communication network;

computer usable program code for selecting a routing identifier associated with the client application, the routing identifier corresponding to the location of the subscriber;

computer usable program code for transferring traffic of the subscriber communication device to the client application at the associated routing identifier using the second communication network, wherein the transfer of traffic is performed based on the detected status of the client application, and computer usable program code for enabling the gateway to switch traffic between the subscriber communication device and the client application during an ongoing call.

49. The computer program product of claim 48, further comprising a computer usable program code for determining at the gateway whether unconditional call forwarding is enabled by the subscriber at an HLR via the first communication network.

50. The computer program product of claim 48, further comprising a computer usable program code for enabling the gateway to perform redirection of the traffic to one or more client applications based on one or more application logics.

51. The computer program product of claim 48, further comprising a computer usable program code for enabling the gateway to transfer the traffic of the subscriber to the routing identifier of the client application via the second communication network when the status of the subscriber is identified as in-active and the status of the client application is identified as active.

52. The computer program product of claim 48, further comprising a computer usable program code for enabling the gateway to transfer the traffic of the subscriber to the routing identifier of the client application via the second communication network based on pre-defined criteria.

53. The computer program product of claim 48, further comprising a computer usable program code for enabling the gateway to transfer the traffic of the subscriber to the routing identifier of the client application via the first communication network when the status of the client application is identified as in-active.

54. The computer program product of claim 48, further comprising a computer usable program code for enabling the gateway to route the traffic of an incoming call to the subscriber at the routing identifier of the client application associated with the subscriber as a VoIP call.

55. The computer program product of claim 48, further comprising a computer usable program code for enabling the gateway to route the traffic of an MT SMS to the subscriber as an IM to the client application associated with the subscriber.

56. The computer program product of claim 48, wherein receiving location information further comprises acquiring at least one selected from a group consisting of an International Mobile Subscriber Identity (IMSI), a Visited Location Register (VLR), a Visited Mobile Switching Center (VMSC), and subscription information of the subscriber from a roamer probe database (RPD).

57. The computer program product of claim 48, wherein receiving location information further comprises acquiring location information from Mobile Application Part (MAP) transaction messages between the home network and the visited network.

58. The computer program product of claim 48, wherein selecting the routing identifier further comprises selecting a telephone number at the home network from a set of numbers.

* * * * *